(12) United States Patent
Deering

(10) Patent No.: US 6,525,722 B1
(45) Date of Patent: Feb. 25, 2003

(54) GEOMETRY COMPRESSION FOR REGULAR AND IRREGULAR MESH STRUCTURES

(75) Inventor: Michael F. Deering, Los Altos, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/332,322

(22) Filed: Jun. 14, 1999

Related U.S. Application Data

(63) Continuation-in-part of application No. 09/095,777, filed on Jun. 11, 1998, which is a continuation-in-part of application No. 08/988,202, filed on Sep. 18, 1997, now abandoned, which is a continuation-in-part of application No. 08/885,279, filed on Jun. 30, 1997, which is a continuation-in-part of application No. 08/511,294, filed on Aug. 4, 1995, now Pat. No. 5,793,371.

(51) Int. Cl.$^7$ .............................................. G06T 17/00
(52) U.S. Cl. ........................................ 345/419; 382/241
(58) Field of Search ................................ 345/419, 420, 345/423, 427, 428; 382/232, 233, 241, 242, 243, 248, 251

(56) References Cited

U.S. PATENT DOCUMENTS

| | | |
|---|---|---|
| 4,881,067 A | 11/1989 | Watanabe et al. |
| 4,930,092 A | 5/1990 | Reilly |
| 5,142,635 A | 8/1992 | Saini |
| 5,216,726 A | 6/1993 | Heaton |
| 5,296,235 A | 3/1994 | Newman |

(List continued on next page.)

FOREIGN PATENT DOCUMENTS

| | | |
|---|---|---|
| EP | 0 536 801 | 4/1993 |
| EP | 0 594 304 | 4/1994 |
| EP | 0 757 332 | 2/1997 |
| GB | 2 302 002 | 12/1996 |
| WO | 88/07293 | 9/1988 |
| WO | 90/06647 | 6/1990 |
| WO | 93/09623 | 5/1993 |
| WO | 98/27515 | 6/1998 |

OTHER PUBLICATIONS

Durkin et al., "Nonpolygonal Isosurface Rendering for Large Volume Data Sets", IEEE, 1994, pp. 293–300.

Fleming, "Sun Breaks the Bottlenecks," BYTE, Nov. 1993, pp. 218, 222, 224.

(List continued on next page.)

Primary Examiner—Almis R. Jankus
(74) Attorney, Agent, or Firm—Jeffrey C. Hood

(57) ABSTRACT

A method for compressing 3D geometry data that is capable of compressing both regularly tiled and irregularly tiled surfaces is disclosed. In one embodiment, the method comprises examining 3D geometry data to detect the presence of regularly tiled surface portions. The 3D geometry data is then compressed by: (1) encoding any regularly tiled surface portion using a first encoding method, and (2) encoding any irregularly tiled surface portions using a second encoding method, wherein the second encoding method is different from the first encoding method. The first encoding method may encode the regularly tiled surface portions as vertex rasters, while the second method may encode the irregularly tiled surface portions by geometry compression using a generalized triangle mesh.

81 Claims, 55 Drawing Sheets

U.S. PATENT DOCUMENTS

| | | |
|---|---|---|
| 5,363,107 A | 11/1994 | Gertz et al. |
| 5,408,605 A | 4/1995 | Deering |
| 5,440,682 A | 8/1995 | Deering |
| 5,485,559 A | 1/1996 | Sakaibara et al. |
| 5,517,611 A | 5/1996 | Deering |
| 5,537,551 A | 7/1996 | Denenberg et al. |
| 5,613,102 A | 3/1997 | Chiang et al. |
| 5,671,401 A | 9/1997 | Harrell |
| 5,694,531 A | 12/1997 | Golin et al. |
| 5,736,987 A | 4/1998 | Drucker et al. |
| 5,740,281 A | 4/1998 | Hirai |
| 5,751,865 A | 5/1998 | Micco et al. |
| 5,760,716 A | 6/1998 | Mathews et al. |
| 5,793,371 A * | 8/1998 | Deering .................... 345/418 |
| 5,798,762 A | 8/1998 | Sfarti et al. |
| 5,801,711 A | 9/1998 | Koss et al. |
| 5,842,004 A | 11/1998 | Deering et al. |
| 5,867,167 A | 2/1999 | Deering |
| 5,870,094 A | 2/1999 | Deering |
| 5,905,502 A * | 5/1999 | Deering ...................... 345/420 |
| 5,933,153 A | 8/1999 | Deering et al. |

OTHER PUBLICATIONS

Deering, "The Triangle Processor and Normal Vector Shader: A VLSI System for High Performance Graphics," Computer Graphics, vol. 22, No. 4, Aug. 1988, 5 pgs.

Danskin, "Higher Bandwidth," copyright ACM 1994, pp. 89–96.

Deering, "Geometry Compression," Computer Graphics Proceedings, 1995, pp. 13–20.

Bass, "Using the Video Lookup Table for Reflectivity Calculations: Specific Techniques and Graphic Results," Computer Graphics and Image Processing, vol. 17, 1981, pp. 249–261.

Evans, "Realtime Lighting Manipulation in Color via Lookup Tables," Graphics Interface 1984, pp. 173–177.

* cited by examiner vertex setNormal setColor mbr (meshBufferReference)

setState setTable nop

| Special | NX | NY | NZ | Comment |
|---|---|---|---|---|
| 0000 | 1.0 | 0.0 | 0.0 | +X axis |
| 0010 | -1.0 | 0.0 | 0.0 | -X axis |
| 0100 | 0.0 | 1.0 | 0.0 | +Y axis |
| 0110 | 0.0 | -1.0 | 0.0 | -Y axis |
| 1000 | 0.0 | 0.0 | 1.0 | +Z axis |
| 1010 | 0.0 | 0.0 | -1.0 | -Z axis |
| 0001 | $1/\sqrt{3}$ | $1/\sqrt{3}$ | $1/\sqrt{3}$ | +X+Y+Z |
| 0011 | $1/\sqrt{3}$ | $1/\sqrt{3}$ | $1/\sqrt{3}$ | +X+Y-Z |
| 0101 | $1/\sqrt{3}$ | $1/\sqrt{3}$ | $1/\sqrt{3}$ | +X-Y+Z |
| 0111 | $1/\sqrt{3}$ | $1/\sqrt{3}$ | $1/\sqrt{3}$ | +X-Y-Z |
| 1001 | $1/\sqrt{3}$ | $1/\sqrt{3}$ | $1/\sqrt{3}$ | -X+Y+Z |
| 1011 | $1/\sqrt{3}$ | $1/\sqrt{3}$ | $1/\sqrt{3}$ | -X+Y-Z |
| 1101 | $1/\sqrt{3}$ | $1/\sqrt{3}$ | $1/\sqrt{3}$ | -X-Y+Z |
| 1111 | $1/\sqrt{3}$ | $1/\sqrt{3}$ | $1/\sqrt{3}$ | -X-Y-Z |

FIG. 10R

| | |
|---|---|
| 00 | Position |
| 01 | Color/Color2 |
| 10 | Normal |
| 11 | Texture map coordinate/d |

FIG. 10S

| Address/range | Semantics | Implicit tag length |
|---|---|---|
| $1a_5a_4a_3a_2a_1a_0$ | set table entry $a_5a_4a_3a_2a_1a_0$ | 6 |
| $01a_5a_4a_3a_2a_1$ | set table entry $a_5a_4a_3a_2a_10$ through $a_5a_4a_3a_2a_11$ | 5 |
| $001a_5a_4a_3a_2$ | set table entry $a_5a_4a_3a_200$ through $a_5a_4a_3a_211$ | 4 |
| $0001a_5a_4a_3$ | set table entry $a_5a_4a_3000$ through $a_5a_4a_3111$ | 3 |
| $00001a_5a_4$ | set table entry $a_5a_40000$ through $a_5a_41111$ | 2 |
| $000001a_5$ | set table entry $a_500000$ through $a_511111$ | 1 |
| $0000001$ | set table entry 000000 through 111111 | 0 |

FIG. 10T setVertexRasterStart ixyz
setVertexRasterStart 1rgba

SetVertexRaster

| 0 | 0 | 0 | 0 | 0 | 0 | 1 | 0 | _raster of vertex data_ execute VertexRaster raster of vertex data_

FIG. 32A

ExecuteVertexRasterIndirect

| 0 | 0 | 0 | 0 | 0 | 0 | 1 | 1 | 32-bit address execute VertexRasterIndirect Address

FIG. 32B

ExecuteVertexRaster32Indirect

| 0 | 0 | 0 | 0 | 0 | 1 | 0 | 0 | 32-bit address 32-bit stride execute VertexRaster32Indirect Address Stride

FIG. 32C

SetState

| 0 | 0 | 0 | 1 | 1 | 0 | dde | bnv |

| bcv | cap | qsp |

FIG. 33A

SetState2

| 0 | 0 | 0 | 1 | 1 | 1 | 1 | 0 |

| scp | tex | tx2 | psrc | vr1 | vr2 | vr3 | vr4 |

FIG. 33B

StepVertexRaster

| 0 | 0 | 0 | 1 | 1 | 1 | 1 | 1 |

| dir |

StepVertexRaster dir

FIG. 34

SetEdgeHalfRez

| 0 | 0 | 0 | 1 | 1 | 1 | 0 | 0 |

| el | et | er | eb | setEdgeHalfRez el et er eb

GEOMETRY COMPRESSION FOR REGULAR AND IRREGULAR MESH STRUCTURES

CONTINUATION DATA

This application is a continuation-in-part of, the following U.S. patent applications:

(1) U.S. patent application Ser. No. 09/095,777, entitled "Compression of Three-Dimensional Geometry Data Representing a Regularly Tiled Surface Portion of a Graphical Object" by Michael F. Deering, filed on Jun. 11, 1998, and assigned to the assignee of this application, which is itself a continuation-in-part of: U.S. patent application Ser. No. 08/988,202, entitled "Compression of Three-Dimensional Geometry Data Representing a Regularly Tiled Surface Portion of a Graphical Object" by Michael F. Deering, filed Sep. 18, 1997 abandoned and assigned to assignee of this application, which is a continuation-in-part of co-pending U.S. application Ser. No. 08/885,279, entitled "System and Method for Generalized Geometric Compression of Three-Dimensional Graphics Data Having Regular Vertex Structures" by Michael F. Deering, filed on Jun. 30, 1997, and assigned to the assignee of this application, which is a continuation-in-part of application Ser. No. 08/511,294, entitled "Method And Apparatus For Geometric Compression Of Three-Dimensional Graphics Data" by Michael F. Deering, filed Aug. 4, 1995 U.S. Pat. No. 5,793,371 and assigned to the assignee of this application.

INCORPORATION BY REFERENCE

The following U.S. patent applications are hereby incorporated by reference as though fully and completely set forth herein: (1) U.S. application Ser. No. 08/511,294, filed Aug. 4, 1995, entitled "Method And Apparatus For Geometric Compression Of Three-Dimensional Graphics Data" by Michael F. Deering, and assigned to the assignee of this application; and (2) U.S. application Ser. No. 08/988,202, filed on Sep. 18, 1997, entitled "Compression Of Three-Dimensional Geometry Data Representing A Regularly Tiled Surface Portion Of A Graphical Object" by. Michael F. Deering, filed on Sep. 18, 1997, and assigned to the assignee of this application.

FIELD OF THE INVENTION

The present invention relates generally to compressing and decompressing three-dimensional graphics data, and more particularly to compressing and decompressing three-dimensional geometry data corresponding to regularly and irregularly tiled surface portions of graphical objects.

DESCRIPTION OF THE RELATED ART

Three-dimensional (3D) computer graphics systems employing large geometric models find wide use in applications such as computer-aided design (CAD), virtual reality environments, training and simulation programs, games, and location-based entertainment. Such systems typically include a 3D graphics accelerator with a specialized rendering subsystem designed to off-load graphics processing functions from the host processor and thereby improving system performance. In a system with a 3D graphics accelerator, an application program executing on the host processor generates data which defines three-dimensional graphics elements for output on a display device. The application program causes the host processor to transfer this data to the graphics accelerator. The graphics accelerator then receives the data and renders the corresponding graphics elements on the display device.

To improve rendering speed and increase the realism of rendered images, techniques such as level of detail (LOD) switching may be used. LOD switching typically involves using more detailed images or textures for objects in the foreground of a scene and using less detailed images of textures for objects in the background.

For example, when a wall that is in foreground, surface texture details such as a pattern of brick may be used. In contrast, for a wall that is in the distant background, less detail may be used. The details of the background wall may be removed to mimic the actual blurred appearance of distance walls in the real world. One way to implement LOD switching is to use polygon simplification. Polygon simplification involves reducing the number of polygons used to represent an object.

To further improve rendering speeds, many graphics accelerators implement a technique called visibility culling. Visibility culling involves removing invisible objects or portions of objects from the scene being rendered. This technique, however, is not efficient when most objects are visible. In such cases, the full amount of geometry data are transferred from the host processor to the rendering hardware on the graphics accelerator.

This transmission of graphics primitives and commands from the host processor to the graphics accelerator over the system bus is one of the major bottlenecks in computer graphics. This bottleneck is becoming more problematic as users of graphics applications programs require an ever-increasing amount of complexity (and hence, size) in the geometric models used to produce visualization effects. The result is that slow memory subsystems or slow bus subsystems may not be able to adequately supply geometry data to the relatively fast real-time rendering hardware. This compromises system performance. In addition, the size requirements for a large set of geometric data may also cause memory constraints.

For example, rendering a large geometric data set with one million triangles at 30 Hz may require a system bus throughput of approximately 720 MB/sec (at a ratio of 24 bytes/triangle). While such high bus bandwidths may be attainable for high-end systems, low-end to mid-range systems typically have bandwidths on the order of 250–320 MB/sec. The performance of lower cost systems is thus affected by the throughput of the system bus as geometry processing requirements increase.

Many prior art systems utilize algorithms that reduce the number of vertices present in the geometric data One such algorithm is vertex decimation. Vertex decimation attempts to reduce the total number of polygons in a surface portion without loss of important detail. A paper by Schroeder, William J. and Jonathan A. Zarge, and William E. Lorensen entitled, "Decimation of Triangle Meshes," *Proceedings of SIGGRAPH '92* (Chicago, Ill., Jul. 26–31, 1992), in *ACM Computer Graphics*, vol. 26, no. 2, pp. 65–70, July 1992, describes one form of vertex decimation in greater detail, and is hereby incorporated by reference in its entirety. However, the compression achievable by reducing the number of vertices is limited. In particular, once the number of vertices drops below a certain level, image quality may drop quickly. Thus, graphics professionals have sought ways to compress the graphics data remaining after the number of vertices have been reduced to desired levels.

Applicant's above-referenced parent patent applications disclose two such methods for compressing three-dimensional graphics data. The first application (Ser. No. 08/511,294) discloses a method and system for compression of 3D geometry, preferably compression of strips of three-dimensional triangles. The second application (Ser. No. 08/988,202) discloses a method and system optimized for geometry compression of regular surface portions in the 3D geometry data With either system, if the compression is performed as a pre-process, the geometry may be stored in main memory of the computer system in a compressed format. The geometry data is then transferred to the computer system's graphics hardware in compressed format to reduce memory and bus bandwidth requirement. Decompression may then be performed by the graphics hardware either off-line (e.g., using software decompression) or in real-time (e.g., using hardware or software decompression).

Applicant's above-referenced parent patent applications disclose two different methods for compressing geometry data, one optimized for regular surfaces and one optimized for irregular surfaces. However, no provisions are made for dealing with three-dimensional graphics data that comprises both regularly tiled and irregular tiled surfaces. For example, FIG. 1 illustrates a 3D object (a refrigerator) having mostly regularly tiled surfaces, while FIG. 2 illustrates a 3D object (a lion) having mostly irregularly tiled surfaces. FIG. 3, however, illustrates a 3D object (a bear) having a mixture of regularly tiled and irregularly tiled surfaces.

Due to the mixture of both regularly tiled and irregularly tiled surfaces in FIG. 3, neither method disclosed in the parent applications is optimized for this data. Thus, a new method for efficiently compressing 3D geometric data comprising both regular and irregular surfaces is needed.

SUMMARY OF THE INVENTION

The problems outlined above may in part be solved by a method for compressing 3D geometry data that is capable of efficiently compressing both regularly tiled and irregularly tiled surfaces. In one embodiment, the method comprises examining 3D geometry data to detect the presence of regularly tiled surface portions. The regularly tiled surface portions may then be compressed using a first encoding method, while the remaining irregularly tiled surface portions may be compressed using a second encoding method, wherein the second encoding method is different from the first encoding method. Advantageously, the first encoding method may be optimized for regularly tiled surface portions, while the second encoding method may be optimized for irregularly-tiled surface portions. Note as used herein the term "irregularly tiled" refers to any tiled surface portion that does not meet predetermined qualifications for being classified as a regularly tiled surface portion.

In one embodiment, the first encoding method may encode the regularly tiled surface portions as vertex rasters. Thus, the vertices are arranged in a scan pattern (e.g., in rows and columns that form a rectangular array of vertices) which is scanned in a predetermined pattern (e.g., from side to side in lines from top to bottom). As part of the vertex raster, an "extent value" may be encoded for each regularly tiled surface portion. The extent values may be used to define the particular arrangement of the vertices within the regularly tiled surface portion. For example, the extent value may indicate that the vertices in the raster from a 8×4 rectangular array.

In one embodiment, the first encoding method may comprise: (1) specifying an extent value for the vertex raster, (2) specifying initial values for selected interpolatable parameters for one or more of the vertices, and (3) specifying delta values indicative of how the selected parameters vary across the vertex raster. Per-vertex information may be specified for certain vertices within the raster that have vertex parameters which deviate from the specified delta values. Per-vertex information for vertices that do not deviate from the specified delta values, but have additional information not represented by the delta values, may also be explicitly specified. In one embodiment, the per-vertex information may also be compressed (e.g., by reducing the number of bits used to represent the constituent vertex parameter values) to reduce the overall size of the graphics data even further. Note, as used herein, vertex parameter values may include, but need not be limited to, position information, normal information, color information, lighting information, specular reflectivity information, material information, and texture information.

The second encoding method may encode the irregularly tiled surface portions by using geometry compression. A number of different geometry compression techniques may be utilized (e.g., normal compression, and mesh buffers).

In one embodiment, the compression method may embed opcodes within the compressed graphics data to indicate how the each vertex is encoded (i.e., either as part of a regularly tiled surface or as part of an irregularly tiled surface). Alternatively, opcodes may be embedded that are indicative of whether the surface following the opcode in the compressed geometry data is encoded using the first method or the second method. In either case, the opcodes may be either fixed- or variable-length. For example, in one embodiment the variable-length opcode may comprise a header and a body, wherein the header indicates the length of the opcode, and wherein the body contains information regarding the following vertices and/or surfaces. In other embodiments, different indicators may be used instead of opcodes. For example, tags or indicator bits may be used to demarcate changes in compression method within the stream of compressed geometry data.

Optionally, error checking and correction (ECC) and encryption information may also be generated for (or as part of) the compressed 3D geometry information. Once compressed, the 3D geometry information may be stored on computer readable media and distributed for future decoding. Alternatively, the compressed data may be transmitted across a computer network.

In one embodiment, the compression may detect regularly tiled surfaces by scanning the geometry data for groups of vertices (e.g., rectangular arrays of 32 vertices or greater) that each have one or more parameters that change in a predictable manner (e.g., parameters that may be delta encoded using a predetermined maximum number of bits). These pluralities of selected vertices may be encoded using the encoding method optimized for regular surfaces (e.g., using delta encoding or delta-delta encoding). Note the groups of vertices (i.e., the vertex rasters) need not be limited to two-dimensional array of evenly spaced vertices. For example, the vertices may be spaced according to a small number of different polygons. For example, the polygons may be rectangles, rhombuses, triangles, hexagons, or parallelograms.

In another embodiment, the method for compressing 3D geometry data may comprise encoding different surface portions at different compression rates depending upon each surface portion's individual attributes. For example a surface portion that has little variation in vertex parameters may be compressed using delta encoding with only a few bits allocated for the delta values to achieve high compression rations. Surface portions that have larger variations in vertex parameters may be delta encoded with a larger number of bits allocated for delta values.

In another embodiment, the method may comprise converting the geometry data into a mesh format. The mesh format may include at least one irregular polygonal mesh portion, and at least one regular polygonal mesh portion. The regular polygonal mesh portion may be characterized by having a regular arrangement of vertices defining polygons. The irregular polygonal mesh portions may be compressed using a first compression method. The regular polygonal mesh portions may be compressed using a second compression method. The second compression method, however, may be configured to utilize the regular arrangement of the vertices to achieve a second level of compression different than the level of compression achieved by the first compression method. The regular polygonal mesh portions may be characterized by having a regular arrangement of homogeneous polygonal mesh portions.

In one embodiment, a software program for compression of three-dimensional graphics data is also contemplated. The software may comprise a plurality of instructions configured to detect regular surface portions within three-dimensional graphics data. The regular surface portions may have vertices with one or more properties that change in a predictable manner. The instructions may be further configured to compress irregular surface portions using a first compression method, and to compress irregular surface portions using a second compression method which achieves a different compression rate than the first compression method. The software program may be further configured to embed opcodes within the compressed data, wherein the opcodes are indicative of which type of compression was used on the corresponding surface portion or portions.

BRIEF DESCRIPTION OF THE DRAWING

FIG. 10R depicts one embodiment of special normal encoding;

FIG. 10S depicts one embodiment of bit encoding;

FIG. 10T depicts one embodiment of address encoding;

FIGS. 32A–C depict one embodiment of a format for commands which specify streams of per-vertex data, FIGS. 33A–B depict one embodiment of a format for commands which set mode bits used in geometry compression and decompression;

FIG. 34 depicts one embodiment of a format for a step vertex raster command;

DETAILED DESCRIPTION OF SEVERAL EMBODIMENTS

A graphics compressor according to the present invention may be used to reduce the space needed to store three-dimensional graphics object, e.g., on a CD-ROM or DVD disc, or the like, as well as to reduce the time needed to transmit a compressed three-dimensional graphics object, for example over a network. Before describing the method for three-dimensional graphics compression in detail, the overall environment in which the present invention may be practiced will be described.

Figure 4:
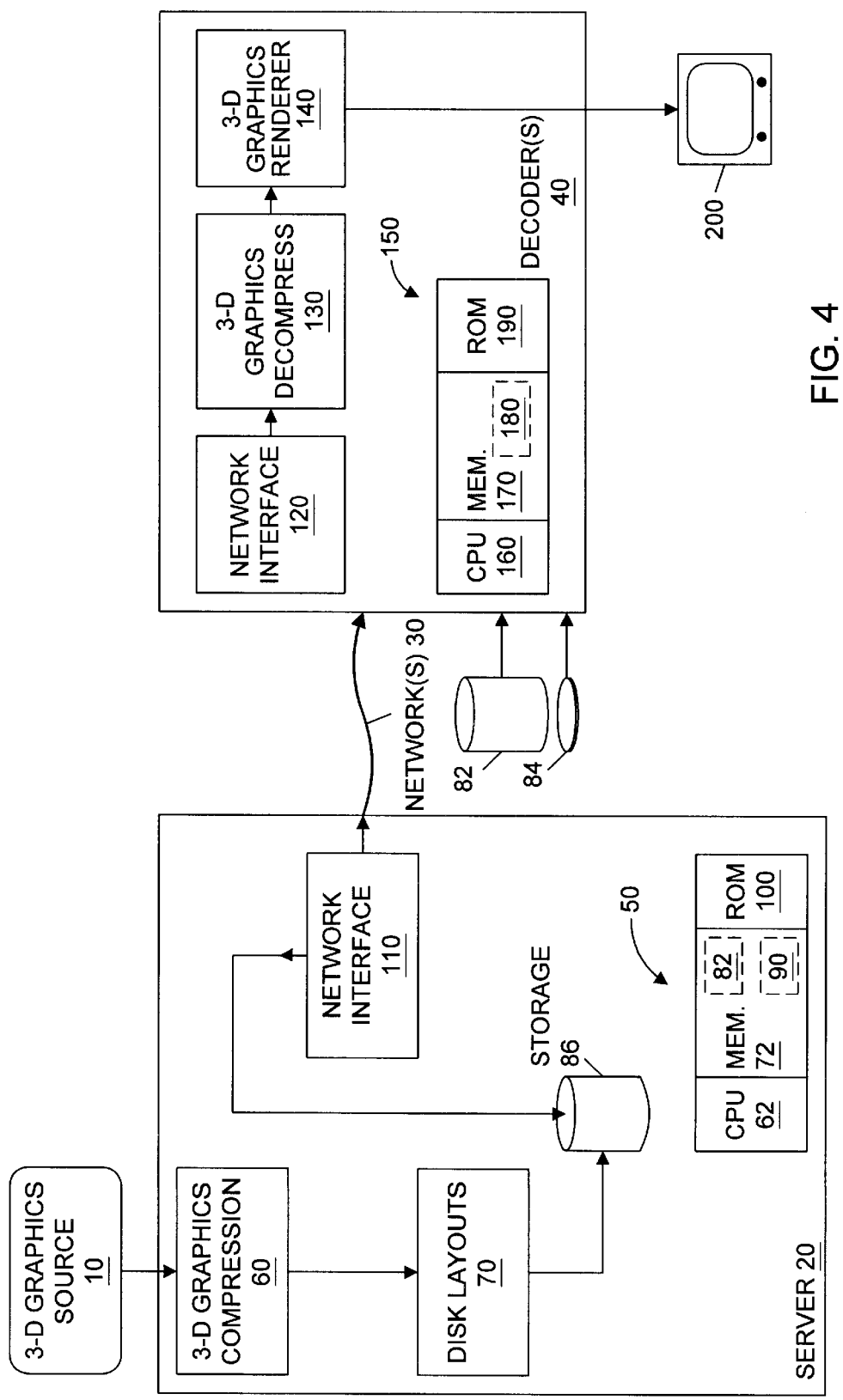
FIG. 4 depicts a generalized network system over which three-dimensional graphics compressed may be transmitted, and decompressed for user viewing.

Turning now to FIG. 4, one embodiment of a generalized network is depicted. Advantageously, the network may implement three-dimensional compression according to the present invention to decrease storage space, decrease transmission times, and potentially increase rendering speeds for three-dimensional graphics objects. Of course, three-dimensional graphics compression according to the present invention may be used in other environments as well. For example, it may be used to reduce storage requirements when storing three-dimensional graphics on CD-ROMs, when transmitting data across a network, when storing data in memory in a graphics system, and to compress data in real-time (e.g., in an interactive 3D television environment).

As shown in FIG. 4, a source of three-dimensional graphics data 10 may be coupled to a server or encoder system 20 whose processed and compressed output is coupled over one or more networks 30 to one or more target clients or decoder systems 40. The network may be homogeneous, heterogeneous, or point-to-point. Server 20 includes a central processing unit 50 that includes a central processor unit ("CPU") 62 with associated main memory 72, a mesh buffer 80, a memory portion 90 that preferably contains an algorithm used to implement compression according to the present invention, and a region of read-only-memory ("ROM") 100. Alternatively, compression according to the present invention may be carried out in hardware, software, or a combination thereof Server 20 also includes a three-dimensional graphics compression unit 60, whose compressed output data is arranged by a disk layout unit 70 for storage onto storage disk unit 86, which may include one or more CD-ROMs. The server communicates over the network(s) 30 via network interface unit 110. Those skilled in the art will appreciate that server 20 may include a mechanism for arbitrating between a plurality of client-decoder requests for compressed data.

It is to be understood that the compressed three-dimensional graphics data on storage unit 86 need not be transmitted over a network. A diskette or CD-ROM 84 may, for example, be mailed to a user wishing to access the compressed three-dimensional graphics information stored thereon. However, if transmitted, e.g., over a network, transmission time will be advantageously reduced because the compression substantially reduces the bit-size of the file to be transmitted. Depending upon the implementation and the data, lossy compression of three-dimensional geometric data can typically produce ratios of about 20:1 to 50:1 in some embodiments with little loss in displayed object quality. Loss-less compression may achieve compression ratios of about 3:1 to 10:1, depending upon the data being compressed. Further, the corresponding decompression function can be included at relatively low cost into three-dimensional rendering hardware, or can instead be implemented using purely software techniques. Specialized real-time or near real-time compression hard-ware can also be implemented, although it may be more expensive.

In a network environment, at the receiving end, decoder systems(s) 40 include a central processing system 150 that includes a CPU 160, a memory 170, a portion of which (block 180) may include decompression software, and ROM 190. Three-dimensional graphics data that has been compressed may advantageously be decompressed using software, hardware, or a combination thereof (e.g., in real-time, near real-time, or offline).

Decoder 40 further includes a network interface unit 120, a unit 130 that decompresses three-dimensional graphics data, and whose output is coupled to a three-dimensional graphics rendering unit 140. The decompressed three-dimensional graphics image(s) may then be conveyed to a monitor 200, or to another system requiring the decompressed graphics. Of course, unit 40 may be a standalone unit, into which three-dimensional graphics data, precompressed according to the present invention, may be coupled for decompression. Unit 40 may, for example, comprise a computer or workstation, a set-top box, a digital or 3D television, a holographic kiosk, an intelligent data projector, or a VR device (e.g., a room or workstation).

Compression

Figure 1:
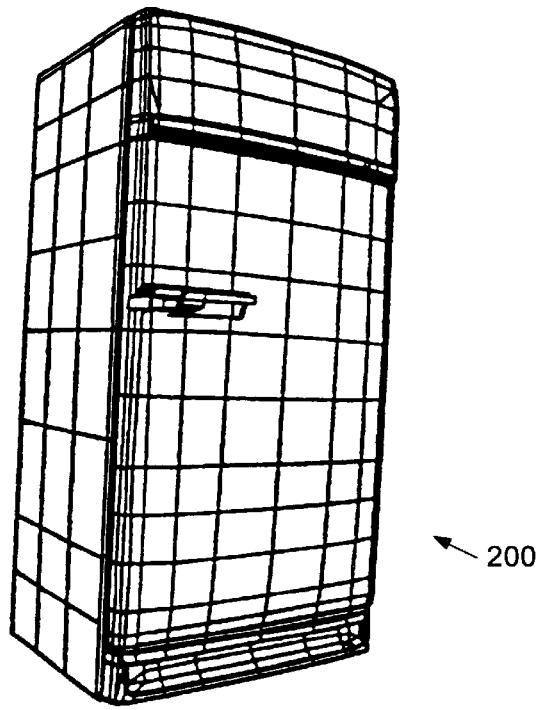
FIG. 1 is an illustration of a three-dimensional object having mostly regularly tiled surfaces.
Figure 2:
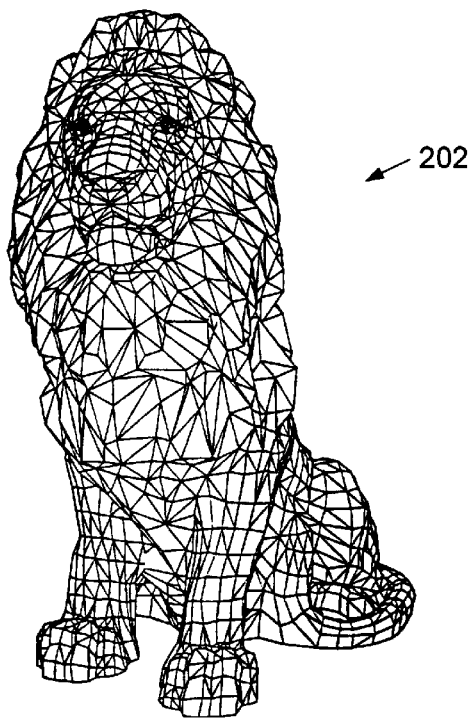
FIG. 2 is an illustration of a three-dimensional object having mostly irregularly tiled surfaces.
Figure 3:
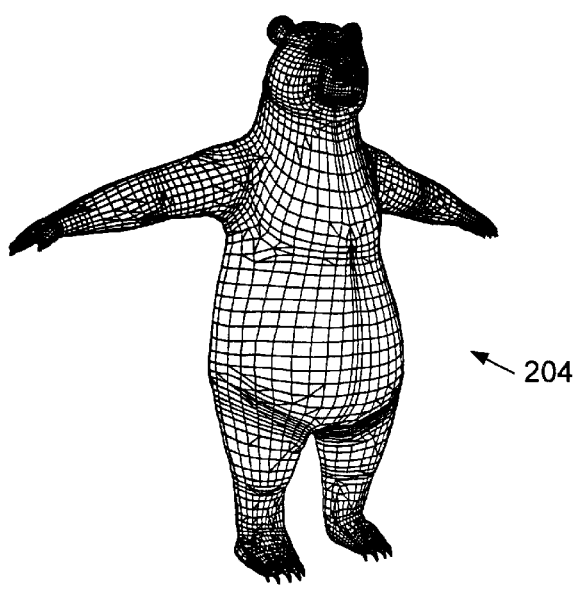
FIG. 3 is an illustration of a three-dimensional object having a mixture regularly and irregularly tiled surfaces.
Figure 5:
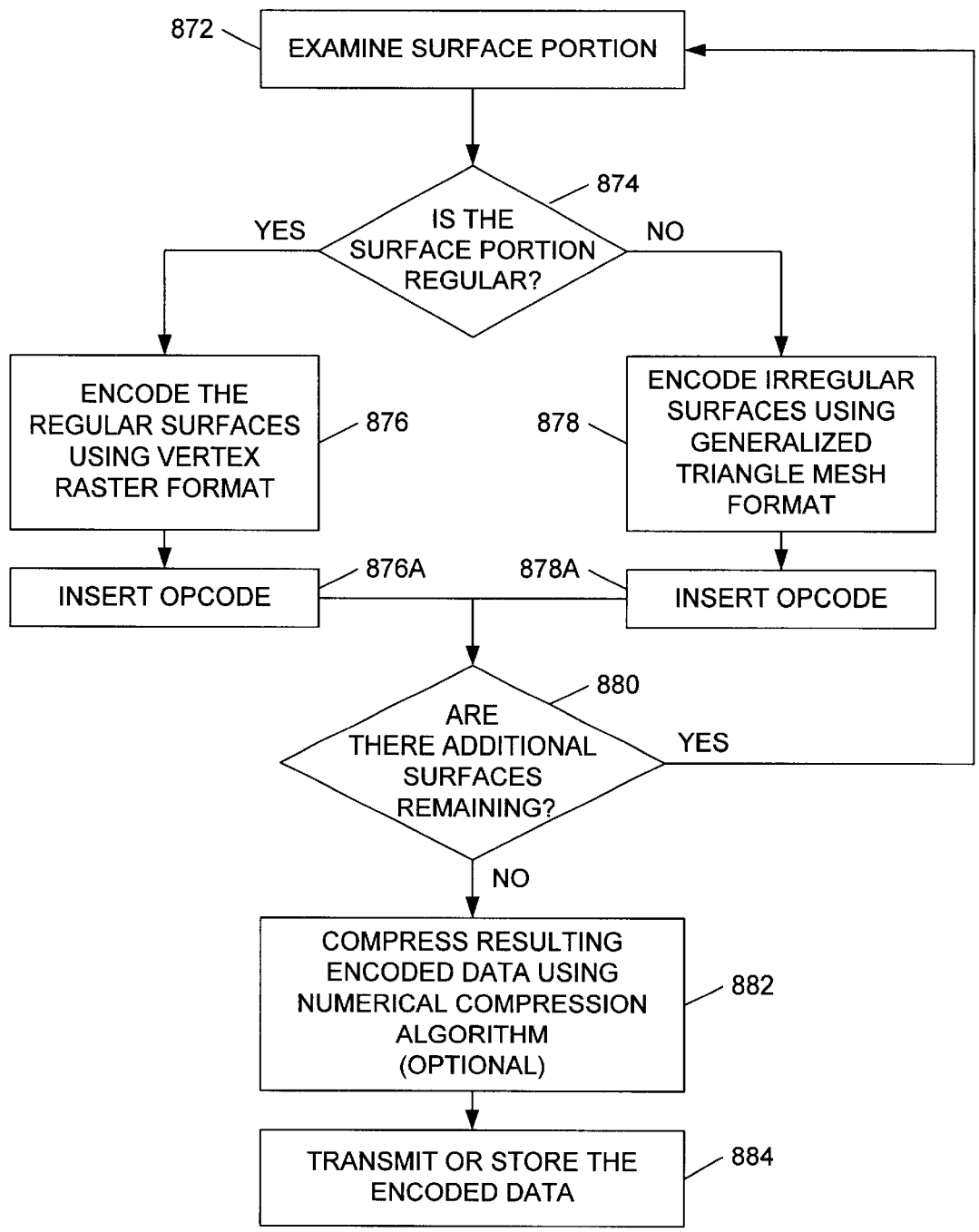
FIG. 5 depicts one embodiment of a method for compressing three-dimensional geometry data comprising both regular and irregular surfaces.

Turning now to FIG. 5, a flowchart of one embodiment of a method for compressing three-dimensional graphics data having both regular and irregular surface portions is shown. This method may be implemented within three-dimensional graphics compression unit 60. In this embodiment, surface portions within the 3D graphics data are examined (step 872). As used herein, the term "surface portion" refers to a group of vertices that share one or more common attributes. For example, the vertices on the door of refrigerator 200 (see FIG. 2) may comprise a surface portion because they have xyz coordinates within a predetermined range. Portions of data streams representing 3D objects may also be referred to herein as surface portions. A regular surface portion of the mesh format data may be characterized by a regular arrangement of vertices defining the polygons used in the mesh. While triangles are the most prevalent polygon, other polygons may also be used, e.g., quadrilaterals, squares, rectangles, rhombuses, hexagons, and parallelograms. The surface portions are examined to determine if they are regularly tiled or irregularly tiled (step 874). Note, while regularly tiled portions are most easily visualized as portions having vertices that are uniformly or predictably spaced, other types of regularly tiled surface portions are also possible. For example, in embodiment, a regularly tiled surface may have vertices with color information that is uniform or changes in a predictable manner. For example, the vertices comprising lion 202's mane (see FIG. 2), while not having regularly spaced xyz coordinates, may have other uniform (or predictably changing) vertex parameters (e.g., color, normal, material information, or texture information). Thus, portions of lion 202's mane may qualify as a regular surface, depending upon the particular criterion used when examining the surface portion in steps 872–874.

If the particular surface portion in question is regular (step 874), then the surface portion is encoded using an encoding method that takes advantage of the regular nature of the vertices (step 876). As shown in the figure, one possible technique for exploiting the regularity of the surface portion is to use a vertex raster format for compression. This type of compression is described in greater detail below (see Vertex Raster Format below).

If, on the other hand, the particular surface portion in question is irregular (step 874), then the surface portion is encoded using an encoding method optimized for irregular surfaces (step 878). As shown in the figure, one possible technique for compressing irregular surfaces is to use a generalized triangle mesh format. This type of compression is also described in greater detail below (see Generalized Triangle Mesh Format below).

Advantageously, the present invention allows two or more different methods of compression to be utilized. Each different method may be optimized for a particular type of 3D graphic data, and each different method may generate different compression ratios.

In some embodiments, opcodes may be inserted within the compressed data stream to indicate which type of compression is being used (steps 876A and 878A).

For example, the data comprising each compressed surface portion may be preceded by an opcode indicating that a.vertex raster format is being used. Conversely, the data comprising compressed irregular surface portions may be preceded by a different opcode indicating that a generalized triangle mesh format is being used. Note, using this method, a number of different compression methods may be used in combination, each with its own opcode. Any number of formats may be used for the opcodes.

In one embodiment, the opcodes may be embedded within the data of the preceding compressed surface portion. Advantageously, this may provide a "lookahead" feature while decoding. For example, while decoding a first surface portion the decoder may detect an opcode indicating that the next surface portion in the data stream is decoded using a different method. By detecting this information before the decoder has reached the following surface portion, the decoder may begin preparations for decoding the following surface portions using the different decompression scheme. These preparations may be performed in parallel with the decoding of the final portions of the first surface portion. Thus, in some embodiments embedding opcodes within the data of the preceding surface portion may enable efficient pipelining of decompression operations.

This process of examining and compressing each surface portion may be continued until all surface portions have been compressed (step 880). Once each surface portion has been compressed, the resulting data file may be further compressed using additional compression algorithms (step 882). For example, the resulting compressed graphics data may then be compressed using one of the following compression algorithms: arithmetic coding, pulse code modulation, differential pulse code modulation, run-length coding, Shannon-Fano coding, Huffman coding, or dictionary methods (i.e, LZ77, LZSS, LZ78, LZW, etc.). Note, different variations and combinations of the listed algorithms may also be used. However, this additional compression is optional. In some embodiments, the additional time and processing resources required to encode and decode the data will not warrant the potentially limited gain afforded by applying additional compression algorithms. In addition to (or in lieu of) the compression performed in step 588, error checking and correction (ECC) information may optionally be calculated and inserted into the compressed 3D graphics data.

Finally, the compressed 3D graphics data is transmitted to its destination or stored onto computer readable media (step 884). Note, the method outlined above may be optimized for any number of different uses. For example, in one embodiment the method is optimized for compressing 3D graphics data in a non-real time format for distribution by a computer network (e.g., the Internet) or by CD-ROM (compact disk read only memory). In other embodiments, the method may be optimized for performing real-time compression. In such an embodiment, the methods used to detect regular surface portions and the compression methods used for compressing both regularly tiled and irregularly tiled surfaces may be selected with response time in mind.

Note, in other embodiments the steps described above may be combined or performed in a different order or in parallel. For example, step 876A may be performed before step 876.

In yet another embodiment, surface portions may be compressed in parallel using both methods (steps 876 and 878). Then, the compressed surface portion that uses the least amount of space is selected. Note, all the methods described herein may be implemented as software (i.e., with pluralities of instructions performing each step), hardware, or a combination thereof. The software may be part of an application program, an operating system, a device driver, or microcode stored in read-only memory (ROM).

Figure 6:
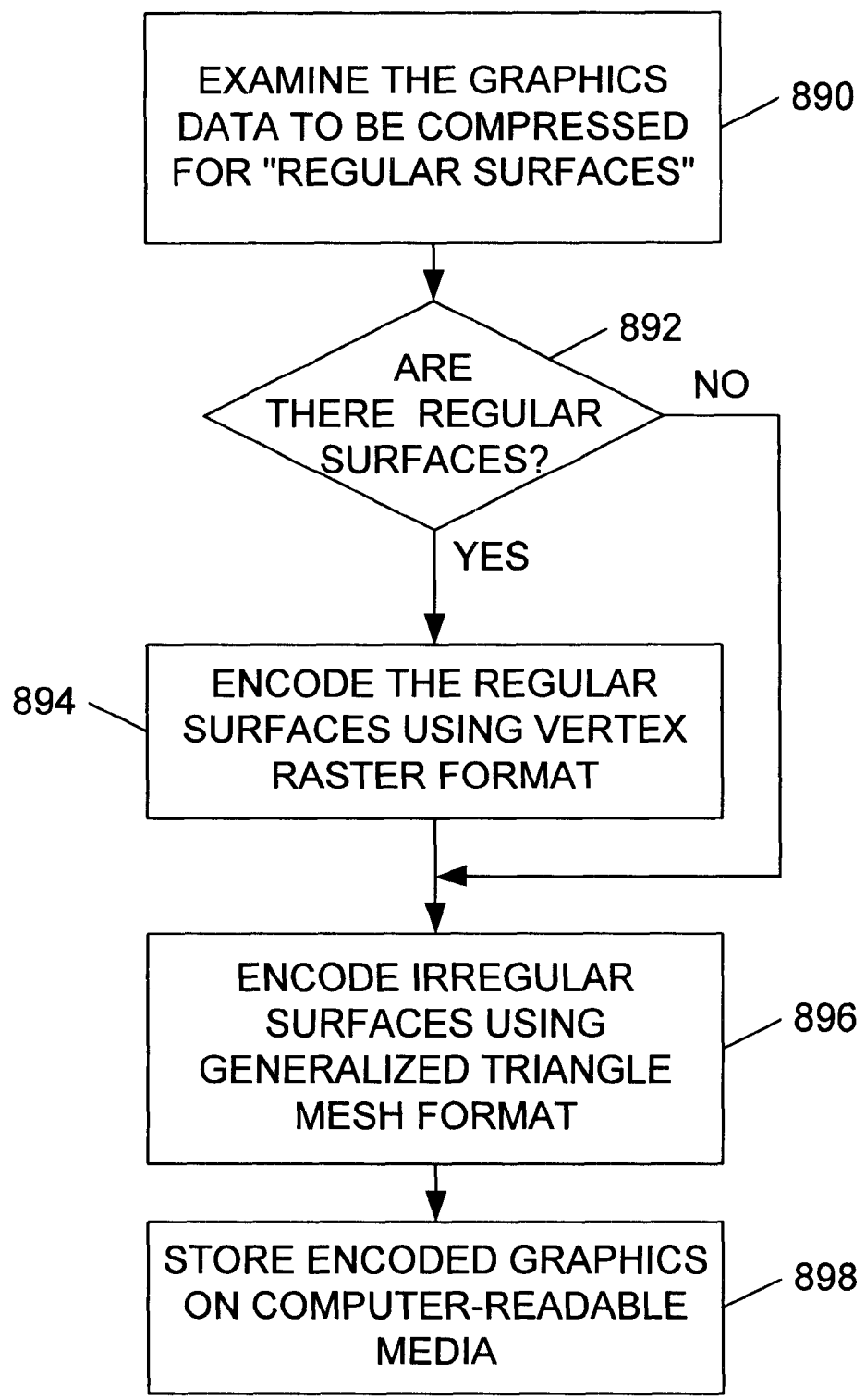
FIG. 6 depicts another embodiment of a method for compressing three-dimensional geometry data comprising both regular and irregular surfaces.

Turning now to FIG. 6, another embodiment of a method to compress 3D graphics data comprising both regularly tiled and irregularly tiled surface portions is shown. In this embodiment, the 3D graphics data to be compressed is examined for regular surface portions (step 890). If there are surface portions that are regularly tiled (step 892), then they are encoded using a format that exploits the regularity, e.g., using a vertex raster format for compression (step 894). Once the regularly tiled surfaces have been encoded, the remaining 3D data (comprising irregularly tiled surface portions) may then be compressed using a geometry compression method that does not rely upon tile regularity and that is optimized for irregularly tiled surface portions, e.g., using a generalized triangle mesh format (step 896). Finally, the compressed 3D graphics data is stored on computer-readable media or transmitted across a computer network (step 898).

Figure 7:
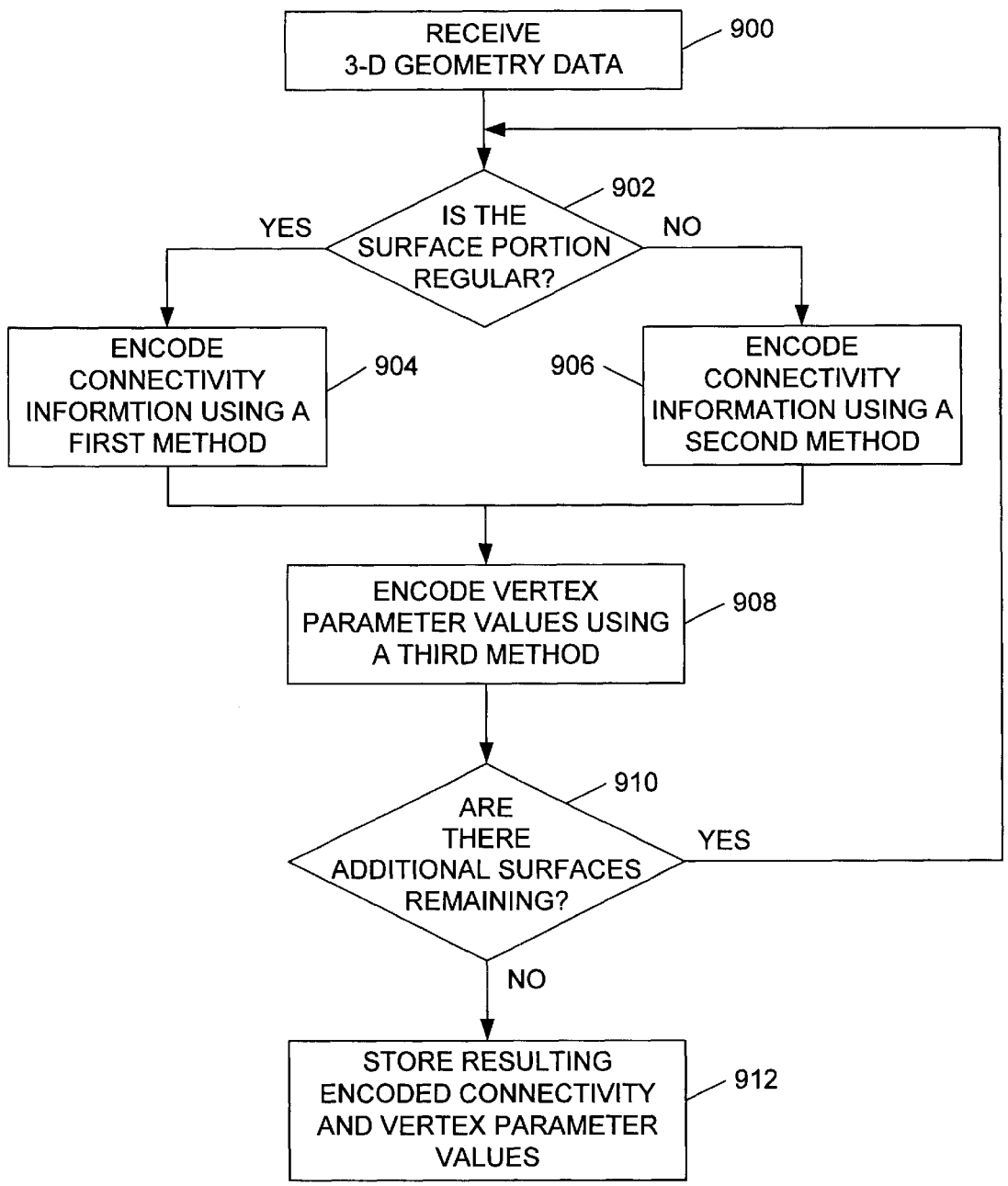
FIG. 7 depicts yet another embodiment of a method for compressing three-dimensional geometry data comprising both regular and irregular surfaces.

Turning now to FIG. 7, yet another embodiment of a method to compress 3D graphics data comprising both regularly tiled and irregularly tiled surface portions is shown. First, the 3D geometry data is received (step 900). Next, each surface portion is examined to determine whether or not it is regular (step 902). If the surface portion is regular, a first method for compression exploiting the regularity is used to encoded the surface's connectivity information (step 904). In one embodiment, this first method may utilize a vertex raster format. Note, as used herein the term "connectivity information" refers to information that describes the relative order in which vertices are organized within the surface portion. Alternatively, if the surface portion is irregular, then a second method of compression optimized for irregular surface portions is used to encode the surface's connectivity information (step 906). In one embodiment, this second method may utilize a generalized triangle mesh. Once the connectivity information is encoded, the corresponding per-vertex information is encoded using a third compression method (step 908). As previously noted, per-vertex information may comprise xyz coordinates, normals, color information, material information, lighting information, translucency information, surface information, and other characteristics. This process may be repeated for each surface portion (step 910). Once all the 3D graphics information has been compressed, it may be stored to computer-readable media or it may be transmitted across a computer network (step 912).

Generalized Triangle Mesh

As previously noted, one possible method for compressing surface portions (including irregular surface portions) is to convert the surface portion's triangle data into an efficient linear strip form, namely a generalized triangle mesh. More details regarding compression using a generalized triangle mesh will now be discussed.

Figure 8:
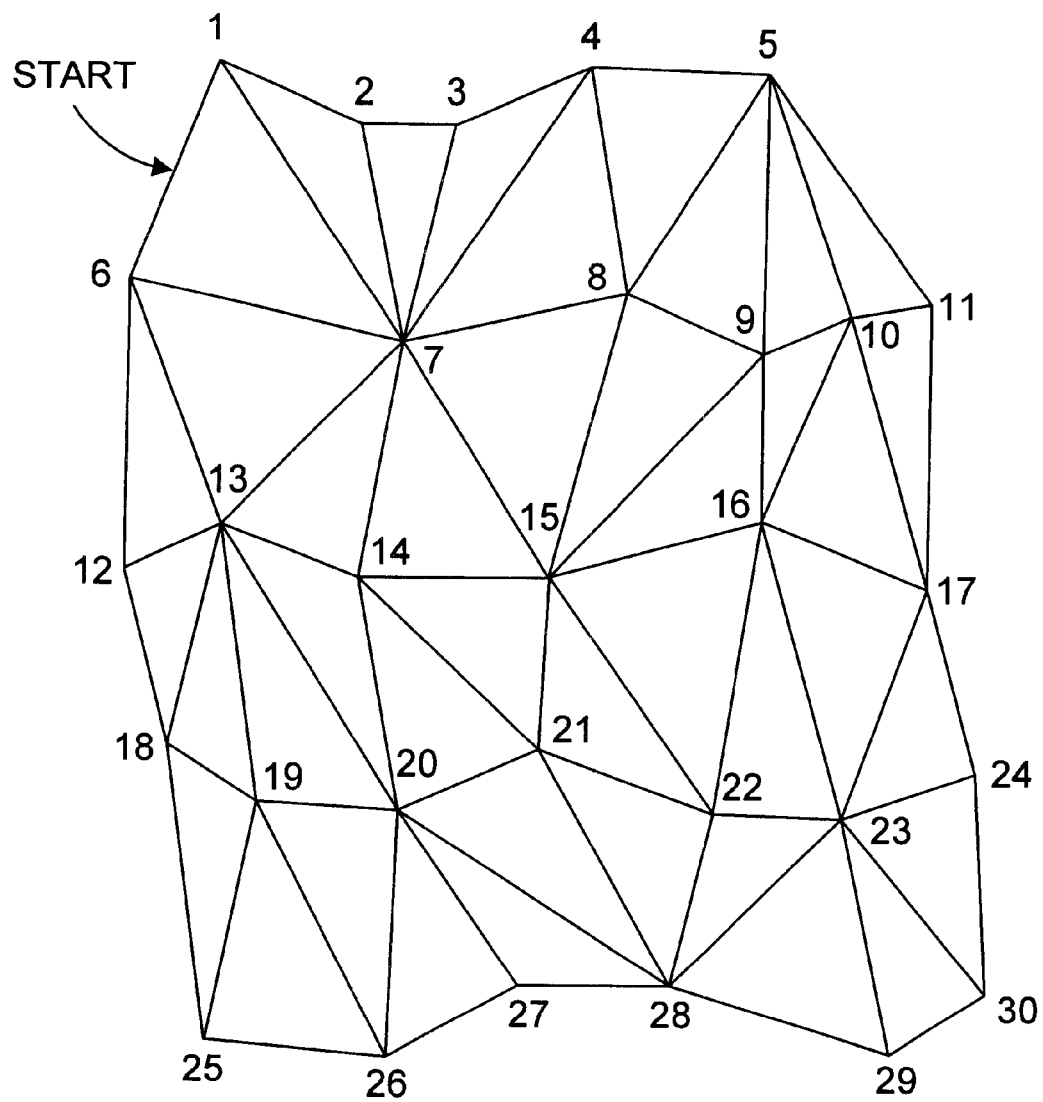
FIG. 8 depicts a generalized triangular mesh data structure, and generalized mesh buffer representation of surface geometry.

Turning now to FIG. 8, one embodiment of a generalized triangle mesh data structure of a sample surface geometry region is shown. Storing or transmitting the triangles individually leads to unnecessary repetition of vertices. For example, vertices 1,6,7 may be transmitted to form the first triangle, then vertices 1,7,2 for the second triangle. In this example, vertices 1 and 7 are repeated unnecessarily. To reduce repetitious vertices, some compressors force the transmitted vertices into triangle strips. For example, the triangles may be transmitted in the following order: 6,1,7, 2,3, and so on. Any vertex after the first three simply replaces the oldest vertex. For example, the first triangle is 6,1,7. The second triangle discards the oldest vertex (i.e., vertex 6) and adds the next vertex (i.e., vertex 2) to form 1,7,2. This process continues to the end of the triangle strip.

While using linear strips is a large improvement over explicitly specifying each vertex for every triangle, there is still repetition of some vertices. For example, vertex 7 will be repeated twice (i.e., once when the first triangle is formed, and then once when triangle 8,15,7 is formed as the triangle strip winds its way back and forth through the surface mesh.

A generalized triangle strip stores the three vertices into a buffer and allows new vertices to selectively replace existing vertices. In other words, the triangle strip is "generalized" because the new vertices may replace the other vertices (i.e., not just the oldest as in the previous example).

In FIG. 8, a generalized triangle strip may be defined as follows, where the R denotes restart, O denotes replace oldest, M denotes replace middle, and a trailing letter p denotes push into mesh buffer:

R6, O1, O7, O2, O3, M4, M8, O5, O9, O10, M11
M17, M16, M9, O15, O8, O7, M14, O13, M6,
O12, M18, M19, M20, M14, O21, O15, O22, O16,
O23, O17, O24, M30, M29, M28, M22, O21, M20,
M27, O26, M19, O25, O18

In this notation, the number following a capital letter is a vertex number, and a negative number is the mesh buffer reference, in which −1 denotes the most recent pushed vertex.

A generalized triangle mesh and a mesh buffer may be used to reduce the repetitions of internal vertices. Vertices that will be eventually be reused may be explicitly pushed (i.e., stored) in the mesh buffer for storage until they are needed. At that time they are popped (i.e., read) to form the next triangle.

Using the same nomenclature as above, a generalized triangle mesh may be defined as follows:

R6p, O1, O7p, O2, O3, M4, M8p, O5, O9p, O10,
M11, M17p, M16p, M-3, O15p, O-5, O6, M14p,
O13p, M9, O12, M18p, M19p, M20p, M-5, O21p,
O-7, O22p, O-9, O23, O-10, O-7, M30, M29, M28,
M-1, O-2, M-3, M27, O26, M-4, O25, O-5

It is to be noted that a vertex reference (e.g., a 4-bit number that identifies a location within the mesh buffer)

advantageously can be considerably more compact (e.g., be represented by fewer bits) than a full vertex specification. For example, a vertex may include 24 bits of color information, xyz position information, texture mapping coordinates, and other information).

Geometry compression may explicitly push old vertices (e.g., vertices with a trailing letter "p" above) into a queue associated with mesh buffer memory 80 (see FIG. 4). These old vertices will later be explicitly referenced when the old vertex is desired again. This approach provides a fine control that supports irregular meshes of nearly any shape. In practice, buffer memory 80 has finite length, and in one embodiment a maxium fixed queue length of 16 is used with a 4-bit index. As used herein, the term "mesh buffer" shall refer to this queue, and the expression "generalized triangle mesh" will refer to a combination of generalized triangle strips and mesh buffer references.

The fixed size of mesh buffer 80 may, in some embodiment, require all tessellators/re-strippers for compressed geometry to break-up any runs longer than sixteen unique references. However, as geometry compression typically will not be programmed directly at the user level but rather by sophisticated tessellators/reformatters, this restriction is not onerous. Sixteen old vertices can in fact permit avoiding re-specification of up to about 94% of the redundant geometry.

In one embodiment, the geometry compression language may support four vertex replacement codes of generalized triangle strips, namely: replace oldest, replace middle, restart clockwise, and restart counterclockwise. Furthermore, in some embodiments the language may add an additional bit in each vertex header to indicate whether or not this vertex should be pushed into the mesh buffer. This, however, is optional. In one embodiment, the mesh buffer reference command has a 4-bit field to indicate which old vertex should be re-referenced, along with the 2-bit vertex replacement code. Note however, that only one and a half bits of the 2-bit vertex replacement code may be used. Other code formats and lengths are also possible and contemplated. Mesh buffer reference commands need not contain a mesh buffer push bit since old vertices are typically only recycled once.

In practice, geometry data is rarely is comprised purely of positional data. In general, a normal, and/or color, and/or texture map coordinate are also specified per-vertex. Accordingly, in one embodiment, entries into mesh buffer 80 contain storage for additional per-vertex information including, for example, normal and color and/or texture map coordinates, material properties. In addition, some embodiments may utilize control surfaces for NURBS (Non-Uniform Rational B-Splines), parametric surfaces, NURBS surfaces, sub-division surfaces, dots, and voxels (volume elements) in place of or in addition to traditional vertex information.

Figure 10A:
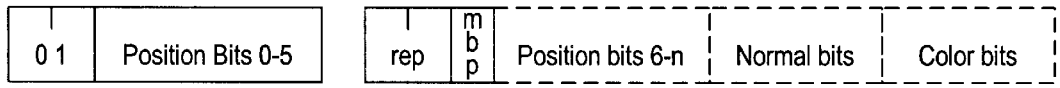
FIG. 10A depicts one embodiment of a vertex command in a geometry compression instruction set.
Figure 10G:
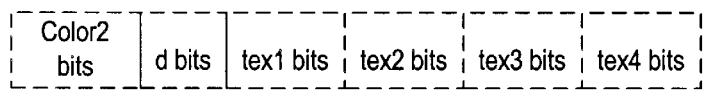
FIG. 10G depicts one embodiment of a nop command instruction in a geometry compression instruction set.

For maximum storage space efficiency, when a vertex is specified in the data stream, per-vertex normal and/or color information may be directly bundled with the position information. Such bundling may be controlled by a number of state bits, e.g., a bundle normals with vertices bit (BNV), and a bundle colors with vertices bit (BCV). FIG. 10E depicts a command structure including these bits, among others. When a vertex is pushed into the mesh buffer, these bits control if its bundled normal and/or color are pushed as well.

It should be noted that compression according to the present invention is not limited to triangles, and that vectors, dots, control surfaces, NURBS surfaces, voxels, and other types of graphics data may also be compressed. Lines, for example, are a subset of triangles, in which replacement bits are MOVE and DRAW. An output vertex is then a vertex that represents one end point of a line whose other vertex is the most recently, previously omitted vertex. For dots, the replacement bits are DRAW, and an output vertex is the vertex.

When CPU 50 executes a mesh buffer reference command, this process is reversed. That is, the two bits specify whether a normal and/or color should be inherited, or read, from the mesh buffer storage 80, or obtained from the current normal or current color. Software may include explicit commands for setting these two current values. An exception to this rule exists, however, when an explicit "set current normal" command is followed by a mesh buffer reference, with the BNV state bit active. In this situation, the former overrides the mesh buffer normal, to allow compact representation of hard edges in surface geometry. Analogous semantics are also defined for colors, allowing compact representation of hard edges in surface colors.

Compression of image xyz positions will now be described. Use of the 8-bit exponent associated with 32-bit IEEE floating-point numbers allows positions to range in size from sub-atomic particles to billions of light years. But for any given tessellated object, the exponent is actually specified just once by a current modeling matrix, and object geometry is effectively described within a given modeling space using only a 24-bit fixed-point mantissa. In many cases far fewer bits are needed for visual acceptance. Thus applicant's geometry compression language supports variable quantization of position data down to one bit.

At the other extreme, empirical visual tests as well as well as consideration of semiconductor hardware implementation indicate that in many embodiments no more than 16 bits of precision per component of position is necessary for nearly all cases.

Assume, however, that the position and scale of local modeling space per object are specified by full 32-bit or 64-bit floating-point coordinates. Using sufficient numerical care, multiple such modeling spaces may be combined together to form seamless geometry coordinate systems with much greater than 16-bit positional precision.

Most geometry is local. Thus, within a 16-bit (or less) modeling space for each object, the difference ($\Delta$) between adjacent vertices in the generalized mesh buffer stream is likely to be less than 16 bits in significance. If desired, one may construct a histogram representing bit length of neighboring position delta's in a batch of geometry, and based upon this histogram assign a variable length code to compactly represent the vertices. As will be described, customized Huffman coding may be used to encode for the positional delta's in the geometry compression.

Compression of red-green-blue-alpha ("RGBA") colors will now be described. Color data are treated similarly to positions, but with a smaller maximum accuracy. Thus, in some embodiments RGBA color data is first quantized to 16-bit unsigned fractional values. For example, the values may represent absolute linear reflectivity (in which 1.0 represents 100% reflectivity). Other formats may also be used (e.g., a 1.15 format or 0.15 format). An additional parameter allows color data effectively to be quantized to any amount less than 15 bits. By way of example, colors may all be within a 5-5-5 RGB color space, as shown in FIG. 10C. The optional alpha field is controlled by a color a present ("CAP") state bit shown in FIG. 10E. On the final rendered image individual pixel colors are still interpolated between the quantized vertex colors, and also typically are subject to lighting.

As a design decision, it was decided to use the same delta-coding for color components as is used for positions. The area of color data compression is where geometry compression and traditional image compression confront the most similar problems. However, many advanced image compression techniques were avoided for geometry color compression because of the difference in focus.

For example, the JPEG image compression standard relies upon assumptions about viewing of the decompressed data that cannot be made for geometry compression. For example, in image compression, it is known a priori that the pixels appear in a perfectly rectangular array, and that when viewed, each pixel subtends a narrow range of visual angles. By contrast, in geometry compression, the relationship between the viewer and the rasterized geometry may be unpredictable.

In image compression, it is known that the spatial frequency of the displayed pixels upon on the viewer's eyes is likely higher than the color acuity of the human visual system. For this reason, colors are commonly converted to YUV space so that the UV color components can be represented at a lower spatial frequency than the Y (intensity) component.

Usually, digital bits representing sub-sampled UV components are divided among two or more pixels. However, geometry compression may not be able to take advantage of this because there is no fixed display scale of the geometry relative to the viewer's eye. Further, given that compressed triangle vertices are connected to four to eight or more other vertices in the generalized triangle mesh, there may be no simple consistent way of sharing "half" the color information across vertices.

Similar arguments apply for the more sophisticated transforms used in traditional image compression, such as the discrete cosine transform. These transforms assume a regular (rectangular) sampling of pixel values, and may use a large amount of random access during decompression.

It is known in the art to use pseudo-color look-up tables, but such tables. typically require a fixed maximum size, thereby representing a relatively expensive resource for real-time processing. While pseudo-color indices could yield slightly higher compression ratios for certain scenes, the RGB model is more generalized and considerably less expensive to implement.

In the RGB model, RGB values may be represented as linear reflectance values. Theoretically, if all effects of lighting could be known a priori, one or two representation bits could be dropped if the RGB components had been represented in a nonlinear, or perceptually linear space (sometime referred to as gamma corrected space). In practice, lighting effects tend not to be predictable, and on-the-fly conversion from nonlinear light to linear light could require considerable hardware resources.

The compression of surface normals will now be described. Traditionally 96-bit normals (three 32-bit IEEE floating-point numbers) were used in calculations to determine 8-bit color intensities. Theoretically, 96 bits of information could be used to represent $2^{96}$ different normals, spread evenly over the surface of a unit sphere. The resultant extremely high accuracy represents a normal projecting in any direction every $2^{-46}$ radians.

But for IEEE floating-point normalized normals, the exponent bits are effectively unused. Given the constraint $N_x^2+N_y^2+N_z^2=1$, at least one of $N_x$, $N_y$, or $N_z$ is in the 0.5 to 1.0 range. During rendering, this normal will be transformed by a composite modeling orientation matrix:

$$N'_x=N_x \times T_{0,0}+N_y \times T_{0,1}+N_z \times T_{0,2}$$

$$N'_y=N_x \times T_{1,0}+N_y \times T_{1,1}+N_z \times T_{1,2}$$

$$N'_z=N_x \times T_{2,0}+N_y \times T_{2,1}+N_z \times T_{2,2}$$

Assuming a typical implementation in which lighting is performed in world coordinates, the view transform is not involved in the processing of normals. If the normals have been pre-normalized, then to avoid redundant re-normalization of the normals, the composite modeling transformation matrix T is typically pre-normalized to divide out any scale changes. Thus:

$$T_{0,0}^2+T_{1,0}^2+T_{2,0}^2=1, \text{ etc.}$$

During normal transformation, floating-point arithmetic hardware effectively truncates all additive arguments to the accuracy of the largest component. The result is that for a normalized normal undergoing transformation by a scale preserving modeling orientation matrix, the numerical accuracy of the transformed normal value is reduced to no more than 24-bit fixed-point accuracy in all but a few special cases.

By comparison, even 24-bit normal components would still provide higher angular accuracy than the repaired Hubble space telescope. In practice, some systems utilize only 16-bit normal components are used. In empirical tests with 16-bit normal components, applicant determined that results from an angular density of 0.01 radians between normals were not visually distinguishable from finer representations. This was about 100,000 normals distributed over a unit sphere. In rectilinear space, these normals may require high representation accuracy for some applications. As a result, 16-bit components including one sign and one guard bit may be used in one embodiment. This results in a length of 48 bits to represent a normal, but since only 100,000 specific normals are of interest, theoretically a single 17-bit index could denote any of these normals. Other lengths are also possible and contemplated, depending upon the exact implementation.

The use of normals as indices, and the resultant advantages provided will now be described. One method of converting an index of a normal on the unit sphere back into a $N_x$, $N_y$, $N_z$ value is with a table look-up, the table being loaded into memory 70 perhaps. Although table size is potentially large, the requisite size can be substantially reduced by taking advantage of a 48-way symmetry present in the unit sphere.

Figure 9:
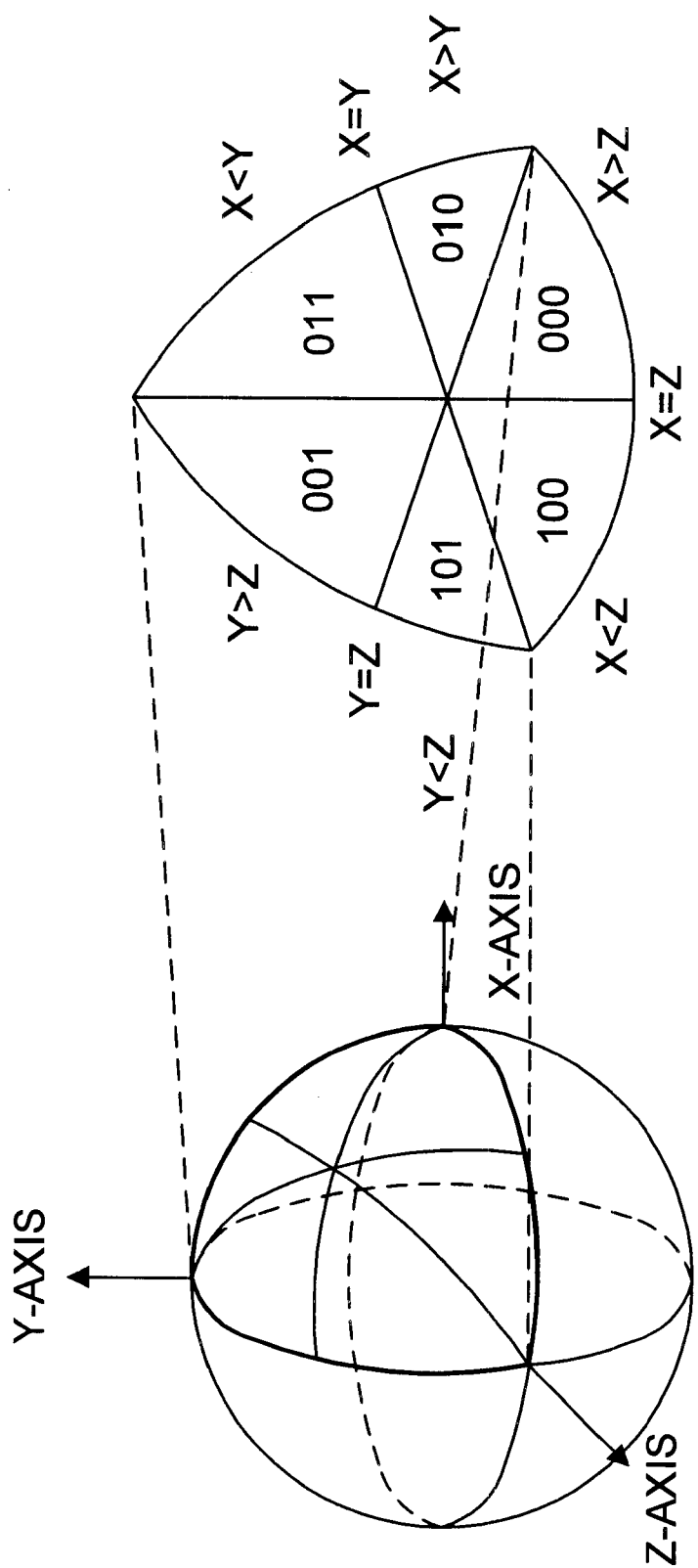
FIG. 9 depicts six-way sign-bit and eight-way octant symmetry in a unit sphere, used to provide forty-eight way reduction in table look-up size.

More particularly, as shown by FIG. 9, the unit sphere is symmetrical by sign bits in the eight quadrants by sign bits. By allowing three of the normal representation bits to be the three sign bits of the xyz components of a normal, it may then only be necessary to represent one eighth of the unit sphere.

As shown by FIG. 9, each octant of the unit sphere can be divided into six identical components by folding about the planes x=y, x=z, and y=z. The six possible sextants are encoded with another three bits, which leaves only 1/48 of the sphere remains to be represented.

Utilizing the above-noted symmetry reduces the look-up table size by a factor of 8×6=48. Instead of storing 100,000 entries, the look-up table may instead store only about 2,000 entries, a size small enough to be an on-chip ROM look-up table, stored perhaps within ROM 59 (see FIG. 4). Indexing into the look-up table uses 11 address bits, which when added to the previously described two 3-bit fields results in a 17-bit field to describe all three normal components.

Representing a finite set of unit normals is equivalent to positioning points on the surface of the unit sphere. Although no perfectly equal angular density distribution exists for large numbers of points, many near-optimal distributions exist. Theoretically, a distribution having the above-described type of 48-way symmetry could be used for the decompression look-up table associated with the three-dimensional geometry decompression unit 130 (see FIG. 4).

However, several additional constraints mandate a different choice of encoding. First, a scalable density distribution is desired, e.g., a distribution in which setting in the look-up table more low order address bits to "0" still results in fairly even normal density on the unit sphere. Otherwise a different look-up table for every encoding density would be used. Secondly, a Δ-encodable distribution is desired in that adjacent vertices in geometry statistically have normals that are nearby on the surface of the unit sphere. Nearby locations on the two-dimensional space of the unit-sphere surface are most succinctly encoded by a two-dimensional offset. It is desirable to have a distribution in which such a metric exists. Finally, although computational costs associated with the normal encoding process are not critically important, distributions having lower encoding costs are still preferred.

For these reasons, a distribution having a regular grid in the angular space within one sextant of the unit sphere may be used. As such, rather than a monolithic 11-bit index, all normals within a sextant are advantageously represented with two 6-bit orthogonal angular addresses. This configuration then revises the previous bit-total to 18-bits. As was the case for positions and colors, if more quantization of normals is acceptable, these 6-bit indices can be reduced to fewer bits, and thus absolute normals can be represented using anywhere from 18 to as few as 6 bits. However, as described below, this space is Δ-encoded to further reducing the number of bits used for high quality representation of normals.

Normal encoding parameterization will now be described. Points on a unit radius sphere are parameterized using spherical coordinates by angles Q(θ) and f(φ), where Q is the angle about the y axis and f is the longitudinal angle from the y=0 plane. Equation (1) governs mapping between rectangular and spherical coordinates as follows:

$$xx = \cos\theta \cdot \cos\phi \quad y = \sin\phi \quad z = \sin\theta \cdot \cos\phi \quad (1)$$

Points on the sphere are folded first by octant, and then by sort order of xyz into one of six sextants. All table encoding takes place in the positive octant in the region bounded by the half spaces:

$$x \geq z \quad z \geq y \quad y \geq 0$$

As shown in FIG. 9, the described triangular-shaped patch runs from 0 to π/4 radians in θ, and from 0 to a maximum 0.615479709 radians in φ.

$$(\hat{\theta}_n) = \arcsin\tan\frac{(\phi_{max} \cdot (n - \hat{\theta}_n))}{2^n}$$

$$\phi(\hat{\phi}_n) = \frac{\phi_{max} \cdot \phi}{2^n}$$

(2)

This spherical encoding applies to points. First, the point is folded into the positive octant. Then, it is folded into the sextant where x>y>2. Then θ and φ are generated.

Quantized angles are represented by two n-bit integers $\hat{\theta}_n$ and $\hat{\phi}_n$, where n is in the range of 0 to 6. For a given n, the relationship between indices θ and φ is:

Equations (2) show how values of $\hat{\theta}_n$ and $\hat{\phi}_n$ can be converted to spherical coordinates θ and φ, which in turn can be converted to rectilinear normal coordinate components via equation (1).

To reverse the process, e.g. to encode a given normal N into

θ

$\hat{}_n$ and

φ

$\hat{}_n$, one cannot simply invert equation (2). Instead, N is first folded into the canonical octant and sextant, resulting in N'. Then dot products are computed for all quantized normals in the sextant and N'. For a fixed n, the values of

θ

$\hat{}_n$ and $\phi\hat{}_n$ that result in the largest (nearest unity) dot product define the proper encoding of N. Other, more efficient methods for finding the correct values of $\hat{\theta}_n$ and $\hat{\phi}_n$ exist, for example indexing through the table to set φ, and then jumping into θ.

At this juncture, the complete bit format of absolute normals can be given. The uppermost three bits specify the sextant, the next three bits specify the octant, and the final two n-bit fields specify

θ

$\hat{}_n$ and

φ

$\hat{}_n$. The 3-bit sextant field takes on one of six values, the binary codes for which are shown in FIG. 9.

Some further details are in order. Fourteen special absolute normals may be encoded with the two unused settings within the three sextant bits. This is indicated by specifying the angle fields to have a length of zero (not present), and the first two bits of the sextant field to both have a value of 1. FIG. 10R lists one embodiment of encodings for the 14 special normals.

This representation of normals is amenable to Δ-encoding, at least within a sextant, although with some additional work, this can be extended to sextants that share a common edge. The Δ code between two normals is simply the difference in $\hat{\theta}_n$ and $\hat{\phi}_n$, namely $\Delta\hat{\theta}_n$ and $\Delta\hat{\phi}_n$.

Applicant's use of compression tags will now be described. Many techniques are known for minimally representing variable-length bit fields. One particularly useful technique is a variation of a conventional Huffman algorithm The Huffman compression algorithm takes in a set of symbols to be represented, along with frequency of occurrence statistics (e.g., histograms) of those symbols. From this, variable length, uniquely identifiable bit patterns are generated that allow these symbols to be represented with a near-minimum total number of bits, assuming that symbols do occur at the frequencies specified.

Many compression techniques, including JPEG, create unique symbols as tags to indicate the length of a variable-length data-field that follows. This data field is typically a specific-length delta value. Thus, the final binary stream consists of (self-describing length) variable length tag symbols, each immediately followed by a data field whose length is associated with that unique tag symbol.

Depending upon the implementation, the binary format for geometry compression may use this technique to represent position, normal, and color data fields. For geometry compression, these <tag, data> fields are immediately preceded by a more conventional computer instruction set op-code field. These fields, along with potential additional operand bits, will be referred to as geometry instructions (see FIGS. 10A–10K).

Traditionally, each to be compressed value is assigned its own associated label, e.g. an xyz Δ position would be represented by three tag-value pairs. But since the Δxyz values are not uncorrelated, a denser, simpler representation can be attained. In general, the xyz Δ's statistically point equally in all directions in space. Thus, if n is the number of bits needed to represent the largest of the Δ's, then statistically the other two Δ values use an average of n−1.4 bits for their representation. The preferred embodiment may therefore use a single field-length tag to indicate the bit length of Δx, Δy, and Δz, although other design choices could have been made.

Unfortunately, using this approach prevents taking advantage of another Huffman technique to save somewhat less than one more bit per component. However, the implemented embodiment outweighs this disadvantage by not having to specify two additional tag fields (for Δy and Δz). A further advantage is that using a single tag field permits a hardware decompression engine to decompress all three fields in parallel, if desired.

Similar arguments hold for Δ's of RGBα values, and accordingly a single field-length tag is used to indicate bit-length of the R, G, B and, if present, α, fields.

Absolute and Δ normals are also parameterized by a single value (n) that can be specified by a single tag. To facilitate high-speed, low-cost hardware implementations, the length of the Huffman tag field was limited to six bits, a relatively small value. A 64-entry tag look-up table allows decoding of tags in one clock cycle. Tables exists for position, normal, color, and texture coordinates. Some of the tables may contain the length of the tag field, the length of the data field(s), a data normalization coefficient, and an absolute/relative bit.

For many hardware implementations, an additional complication may be addressed. As described below, instruction may be broken-up into a six- or eight-bit header, and a variable length body, sufficient information being present in the header to determine the body length. But the header of one instruction is placed in the data stream before the body of the previous instruction to give the hardware time to process the header information. For example, the sequence . . . B0 H1B1 H2B2 H3 . . . has to be encoded as . . . H1 B0 H2 B1 H3 B2 . . . .

The geometry compression instruction set used in one embodiment will now be described with respect to FIGS. 10A–10Q. FIG. 10A depicts a vertex command that specifies a Huffman compressed Δ-encoded position, as well as possibly a normal and/or color, depending on bundling bits (BNV and BCV). Two additional bits specify a vertex replacement code (REP), and another bit controls mesh buffer pushing of this vertex (MBP). The vertex command has a two-bit opcode, a two-bit vertex replacement field, a mesh buffer push bit, and any combination of the following optional subcommands: position, normal, color, color2, d, tex1, tex2, tex3, tex4, depending on the current setting of the state bundling bits. (Note, if tex<n> is bundled, then tex<n−1> . . . tex<1> are also bundled).

Figure 10B:
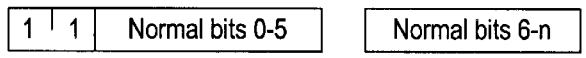
FIG. 10B depicts one embodiment of a normal command in a geometry compression instruction set.
Figure 10C:
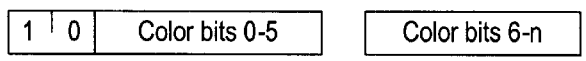
FIG. 10C depicts one embodiment of a color command in a geometry compression instruction set.

As shown in FIG. 10B, a normal command specifies a new current normal and the color command shown in FIG. 10C depicts a new current color. The normal command and color command each use Huffman encoding of Δ values.

Figure 10D:
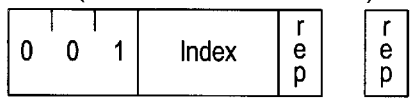
FIG. 10D depicts one embodiment of a mesh buffer reference command in a geometry compression instruction set.
Figure 10E:
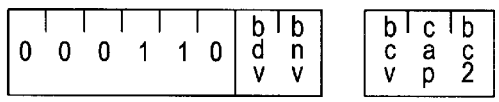
FIG. 10E depicts one embodiment of a set state instruction in a geometry compression instruction set.

The mesh buffer reference command structure is shown in FIG. 10D. The mesh buffer reference command allows any of the sixteen most recently pushed vertices (and associated normals and/or colors) to be referenced as the next vertex. As further shown in FIG. 10D, a 2-bit vertex replacement ("REP") code is also specified.

FIG. 10E depicts the set state instruction that updates the five state bits: BDV, BNV, BCV, CAP, and BC2.

Figure 10F:
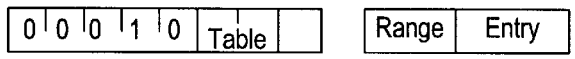
FIG. 10F depicts one embodiment of a set table command instruction in a geometry compression instruction set.
Figure 10G:
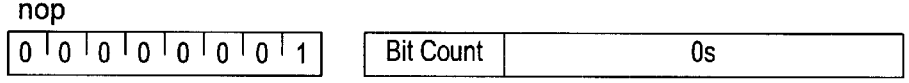
Figure 10G:
Figure 10G:
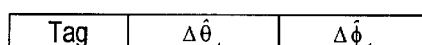
Figure 10G:
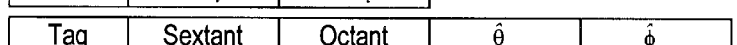
Figure 10G:
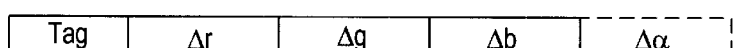

FIG. 10F depicts a set table command. The setTable command has a five bit op code, a two bit table field, a seven bit address/range field, a four bit data length field, an absolute/relative bit, and a four bit up-shift field. The total instruction length is fixed at 23 bits. The table and address/range field specify which decompression table entries to update; the remaining fields comprise the update values for the table entries. The two-bit table in FIG. 10S specifies which of the three decompression tables is targeted. The seven-bit address/range field table in FIG. 10T specifies which entries in the specified table are to be set.

Table settings are made in aligned powers of two. The position of the first '1' bit in the address/range field indicates how many entries are to be consecutively set, and the remaining bits after the first '1' are the upper address bits of the base of the table entries to be set. This also sets the length of the "tag" that this entry defines as equal to the number of address bits (if any) after the first '1' bit.

The data length specifies how large the delta values to be associated with this tag are. For example, a data length of 12 implies that the upper 4 bits are to be sign extensions of the incoming delta value. Note that the data length does not describe the length of the delta value coming in, but rather the final position of the delta value for reconstruction. In other words, the data length field is the sum of the actual delta bits to be read-in plus the up-shift amount. For the position, color and texture map coordinate tables, the data length value of 1–15 correspond to length of 1–15, but the data length value of 0 encodes an actual length of 16 (a length of zero does not make sense for positions or colors). For normals, a length of zero is sometimes appropriate, and the maximum length in this embodiment is only 10. Thus for normals, the value 0–10 map through 0–10, and 11–15 are not used. The up-shift value is the number of bit that the delta values described by these tags will be shifted up before being added to the current value.

The absolute/relative flag indicates if this table entry describes values that are to be interpreted as an absolute reference or a relative delta Note that for normals, absolute references will have an additional six leading bits describing the absolute octant and sextant (special normals are also absolute).

FIG. 10G depicts a no-op ("NOP") command that allows fields within the bit stream to be aligned to 32-bit word boundaries. This permits aligned fields to be efficiently patched at run-time by the general CPU 52.

Figure 10H:
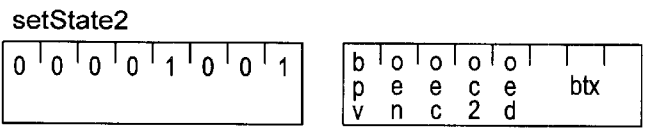
FIG. 10H depicts one embodiment of a setstate2 instruction in a geometry compression instruction set.

FIG. 10H depicts a setState2 command. Additional input and output bundling and state bits include: bpv (positions will be bundled per vertex), oen (enable output of normal), oec (enable output of color), oc2 (enable output of color2), and oed (enable output of d), and btx (how many texture coordinate pairs).

There is no enable output bit for positions because positions are output if they are bundled. This is why the position bundling bit is included in the setState2 command rather than in the setState command, i.e., so that software can be signaled to expect position information. The same holds true for the texture parameters. The encoding of the btx field is as follows: 0—bundle no texture coordinates; 1—bundle only texture coordinate pair; 2—bundle texture coordinate pairs: tex1 and tex2; 3—bundle texture coordinate pairs: tex1, tex2, and tex3; 4—bundle all texture coordinate pairs: tex1, tex2, tex3, and tex4; and 5,6,7—reserved for future use.

Figure 10I:
FIG. 10I depicts one embodiment of a setcolor2 instruction in a geometry compression instruction set.

FIGS. 10I depicts one embodiment of a setColor2 instruction. The setColor2 command has an eight-bit opcode, and a color2 subcommand. If a setColor2 command is present immediately before a mbr (meshBufferReference) command, then the new color value overrides the color2 data present in the mesh buffer for that particular mesh buffer reference. Because setColor2 is an extended command, rather than the usual break-up of the command into a forwarded header and a contiguous body, setColor2 is broken up into three sections: a forwarded 8-bit header only containing the opcode; a 6-bit forwarded Huffman-tag/first bits portion, and the contiguous body.

Figure 10J:
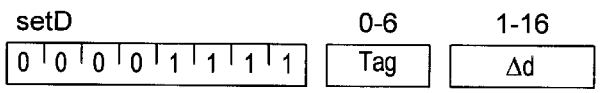
FIG. 10J depicts one embodiment of a setD instruction in a geometry compression instruction set.

FIG. 10J depicts one embodiment of a setD instruction. The setD command has an eight-bit opcode, and a d subcommand. If a setD command is present immediately before a mbr (meshBufferReference) command, then the new color value overrides the d data present in the mesh buffer for that particular mesh buffer reference. Because setD2 is an extended command, rather than the usual break-up of the command into a forwarded header and a contigious body, setD2 is broken up into three sections: a forwarded 8-bit header only containing the opcode; a 6-bit forwarded Huffman-tag/first bits portion, and the contiguous body.

Figure 10K:
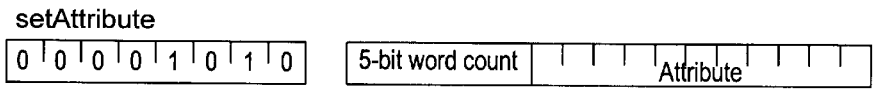
FIG. 10K depicts one embodiment of a setAttribute instruction in a geometry compression instruction set.

FIG. 10K depicts one embodiment of a setAttribute instruction. The setAttribute instruction is the general instruction for setting certain graphics state attributes. The 11-bit attribute number and 1–32 data words are passed to the CPUs.

Figure 10L:
FIG. 10L depicts one embodiment of a setAttributeI instruction in a geometry compression instruction set.

FIG. 10L depicts one embodiment of a setAttributeI instruction. The setAttributeI instruction is the general instruction for indirectly setting graphics state attributes. The token is meant to semantically be the equivalent of the software concept of a stack frame argument offset in a complied subroutine. Hardware doesn't have to care about the semantics of the token; its job is to pass it on unmodified. The geometry decompression format may specify specific semantics to the tokens, e.g., as an explicit byte or word offset into an argument stack.

Figure 10M:
FIG. 10M depicts one embodiment of a gosub instruction in a geometry compression instruction set.
Figure 10N:
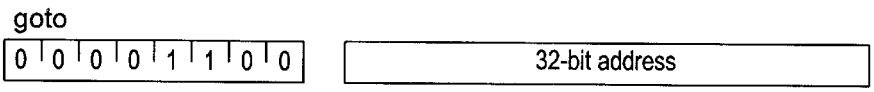
FIG. 10N depicts one embodiment of a goto instruction in a geometry compression instruction set.
Figure 10P:
FIG. 10P depicts one embodiment of an eos instruction in a geometry compression instruction set.
Figure 10Q:
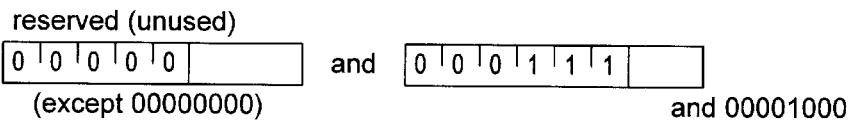
FIG. 10Q depicts one embodiment of a reserved instruction in a geometry compression instruction set.
Figure 10Q:
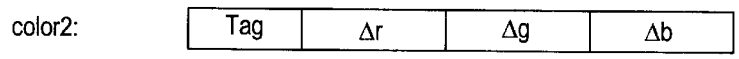
Figure 10Q:
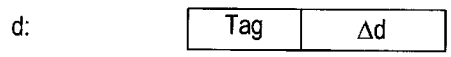
Figure 10Q:

FIG. 10M depicts one embodiment of a gosub instruction that executes the commands starting at the specified address until encountering an EOS instruction (depicted in FIG. 10P). In one embodiment, the lower two bits of the address field are always zero so that the address target is always 32-bit word-aligned. Similarly, FIG. 10N depicts one embodiment of a goto instruction. FIG. 10Q depicts possible reserved instructions for future versions of the geometry compression instruction set.

Those skilled in the art will recognize that instruction sets other than what has been described above may instead be used to implement the present invention.

The ratio of the time used for compression relative to decompression is an important measure for many forms of compression. In practice, it is acceptable for off-line image compression to take up to perhaps sixty-times more time than decompression, but for real-time video conferencing, the ratio should be one.

Advantageously, may implementations of geometry compression do not have this real-time requirement. Even if geometry is constructed on the fly, most geometry creating techniques, e.g., CSG, require orders of magnitude more time than needed for displaying geometry. Also, unlike continuous images found in movies, in most applications of geometry compression a compressed three-dimensional object will be displayed for many sequential frames before being discarded. Should the three-dimensional object require animating, animation is typically done with modeling matrices. Indeed for a CD-based game, it is quite likely that an object will be decompressed billions of times by customer-users, but will have been compressed only once by the authoring company.

Like some other compression systems, geometry compression algorithms can have a compression-time vs. compression-ratio trade-off. For a given quality target level, as allowable time for compression increases, the compression ratio achieved by a geometry compression system increases. There exists a corresponding "knob" for quality of the resulting compressed three-dimensional object, and lower the quality knob, the better the compression ratio achieved.

Aesthetic and subjective judgment may be applied to geometry compression. Some three-dimensional objects will begin to appear bad when target quantization of normals and/or positions is slightly reduced, whereas other objects may be visually unchanged even with a large amount of quantization. Compression can sometimes cause visible artifacts, but in other cases may only make the object look different, not necessarily lower in quality. In one experiment by applicant, an image of an elephant actually begin to appear more realistic, with more wrinkle-like skin, as the image normals were quantized more. Once a model has been created and compressed, it can be put into a library, to be used as three-dimensional clip-art at the system level.

While many aspects of geometry compression are universal, the above-described geometry compression instruction set has been somewhat tailored to permit low-cost, high-speed hardware implementations. (It is understood that a geometry compression format designed purely for software decompression would be somewhat different.). The preferred geometry compression instruction set is especially amenable to hardware implementation because of the one-pass sequential processing, limited local storage requirements, tag look-up (as opposed to a conventional Hamming bit-sequential processing), and use of shifts, adds, and look-ups to accomplish most arithmetic steps.

Figure 11:
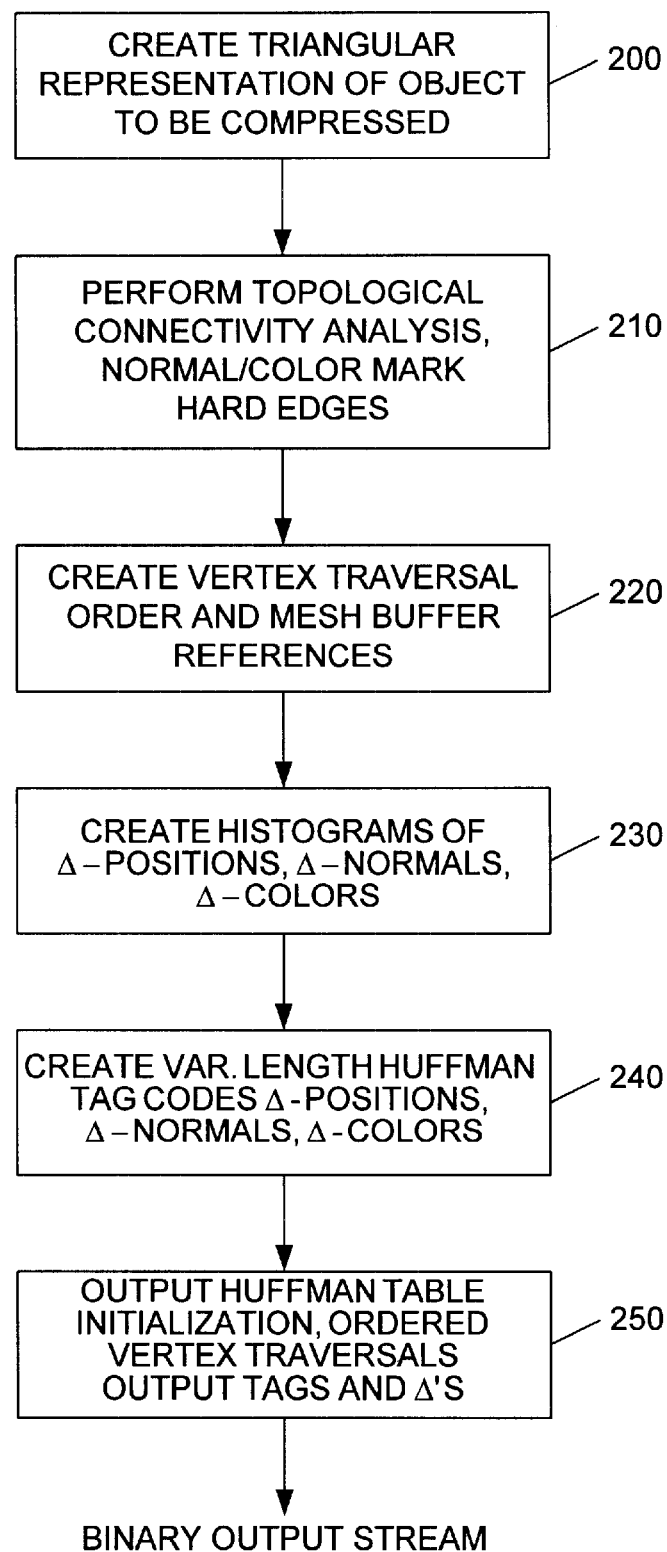
FIG. 11 is a flowchart of method steps in a geometry compression algorithm.

FIG. 11 is a flowchart outlining method steps in a geometry compression algorithm routine. Such routine may be stored in memory 80 and executed under control of CPU 62 (see FIG. 4).

At step 200, an object is represented by an explicit group of triangles to be compressed, along with quantization thresholds for positions, normals, and colors. At step 210, a topological analysis of connectivity is made, and hard edges are marked in normals and/or color, if such information is not already present.

At step 220, vertex traversal order and mesh buffer references are created, and at step 230 histograms of $\Delta$-positions, $\Delta$-normals, and $\Delta$-colors is created. At step 240, separate variable length Huffman tag codes are assigned for the $\Delta$-positions, $\Delta$-normals, and $\Delta$-colors, based upon histographs.

At step 250, a binary output stream is generated by first outputting Huffman table initialization, after which the vertices are traversed in order. Appropriate tags and $\Delta$'s are output for all values. In another embodiment, customized table portions may be output (i.e., the tables need not remain fixed for all objects). This is described in "Optimized Geometry Compression for Real-time Rendering" by Michael Chow in the proceedings of *IEEE Visualization* 97.

Applicant has implemented a Wavefront OBJ format compressor that supports compression of positions and normals, creates full generalized triangle strips, and implement a full meshifying algorithm. Future embodiments will explore variable precision geometry, including fine structured updates of the compression tables. The present compressor expends time calculating geometric details already known to the tessellator, and ultimately it is hoped to generate compressed geometry directly. However, even its present unoptimized state, applicant's software can compress about 3,000 or more triangles per second in many cases.

At the user end, it is of course desirable to decompress the compressed data, and the above-referenced patent application describes one manner of such decompression. An applicable geometry decompression algorithm is outlined below:

(1) Fetch the rest of the next instruction, and the first 8 bits of the following instruction (note, with a vertex command there can be additional subcommands);

(2) Using the tag table, expand any compressed value fields to full precision;

(3A) If values are relative, add to current value; otherwise replace;

(3B) If mesh buffer reference, access old values;

(3C) If other command; do housekeeping.

(4) If normal, pass index through ROM table to obtain full values.

(5) Output values in generalized triangle strip form to next stage.

Figure 12:
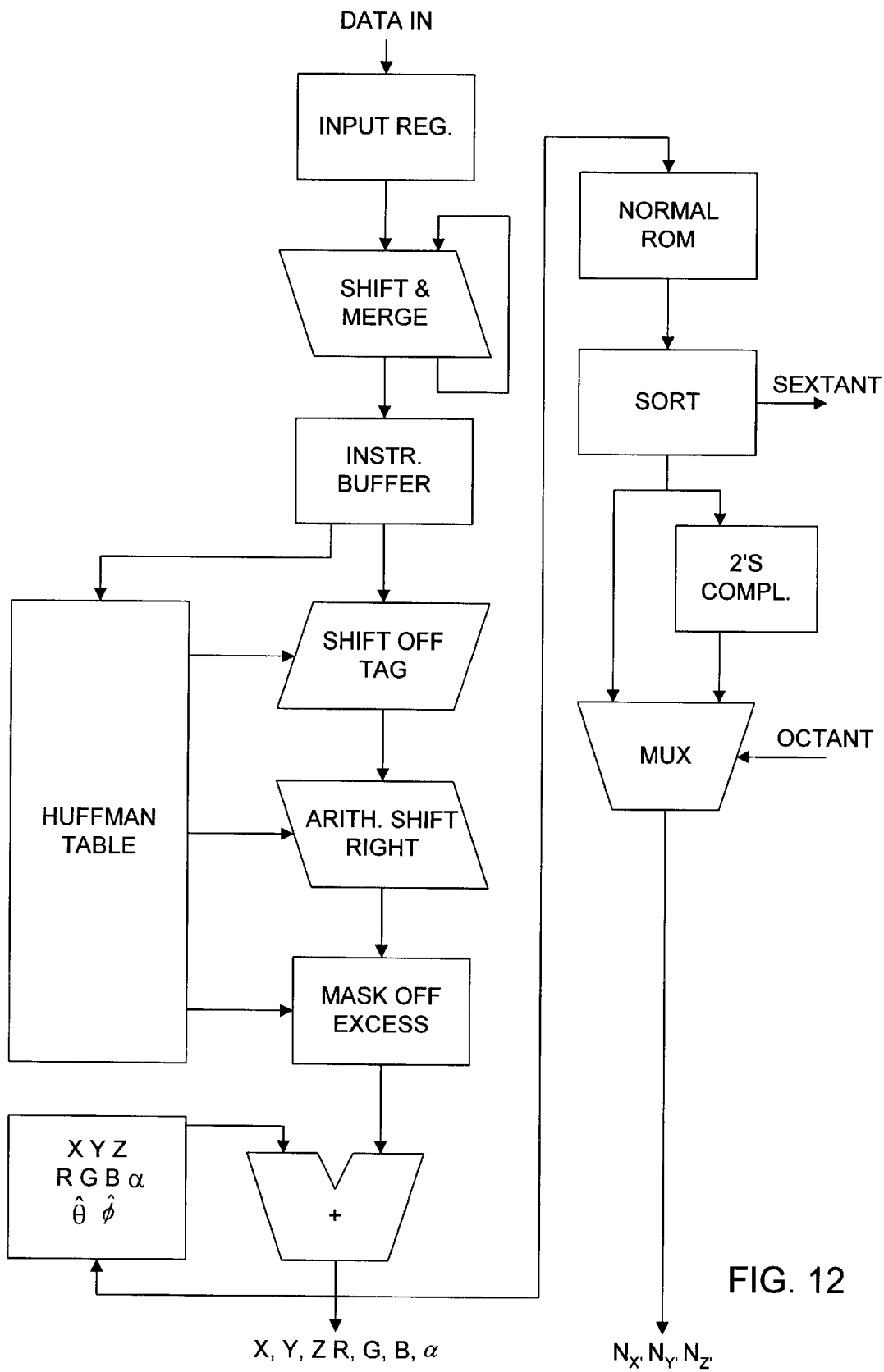
FIG. 12 is a block diagram of one embodiment of decompressor hardware.

Applicant has implemented a software decompressor that successfully decompresses compressed geometry at a rate of about 10,000 triangles/second. A simplified block diagram of one embodiment of a hardware design can be seen in FIG. 12. Currently, the hardware may decompress in excess of 6 million triangles per second, and future designs are underway that may be able to decompress several times faster than this.

Figure 13A:
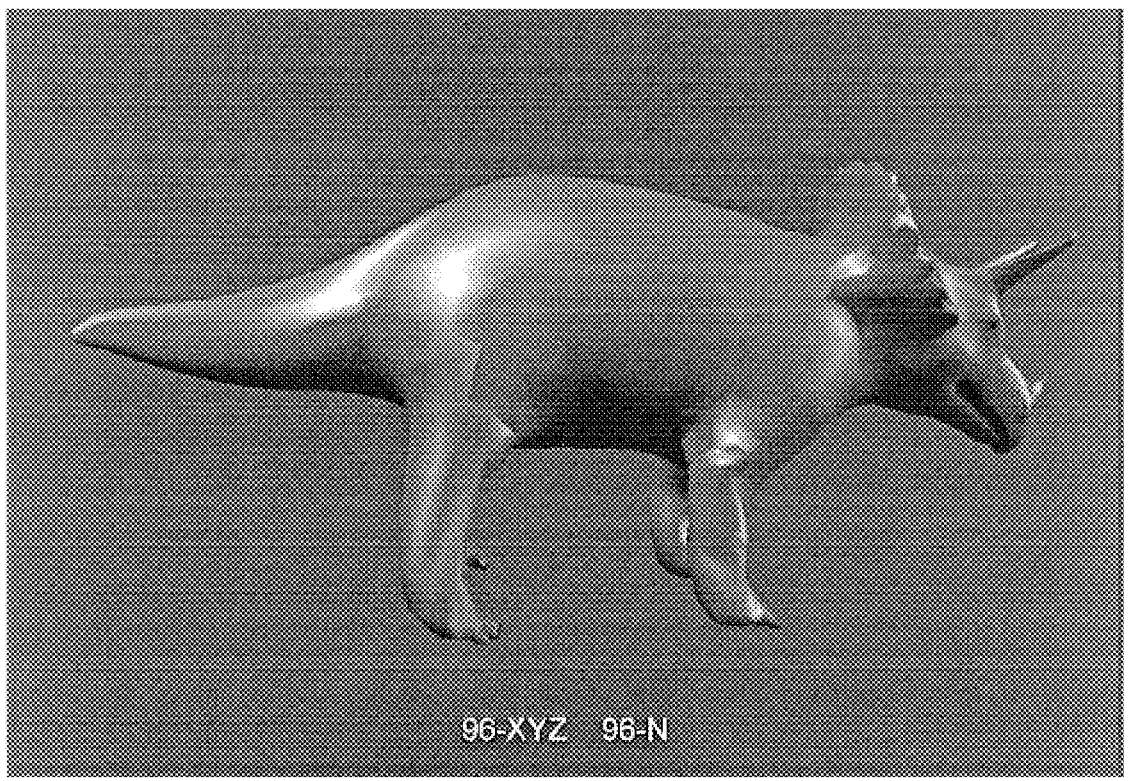
FIGS. 13A–13L depict objects compressed under different conditions.
Figure 13B:
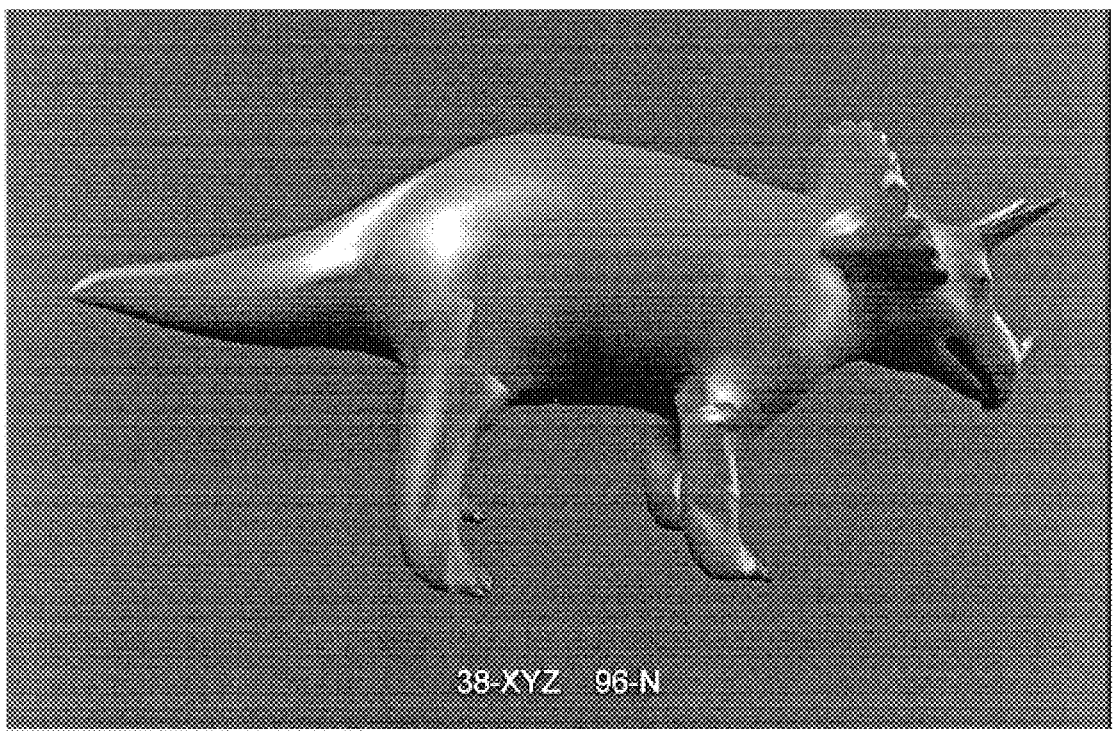
Figure 13C:
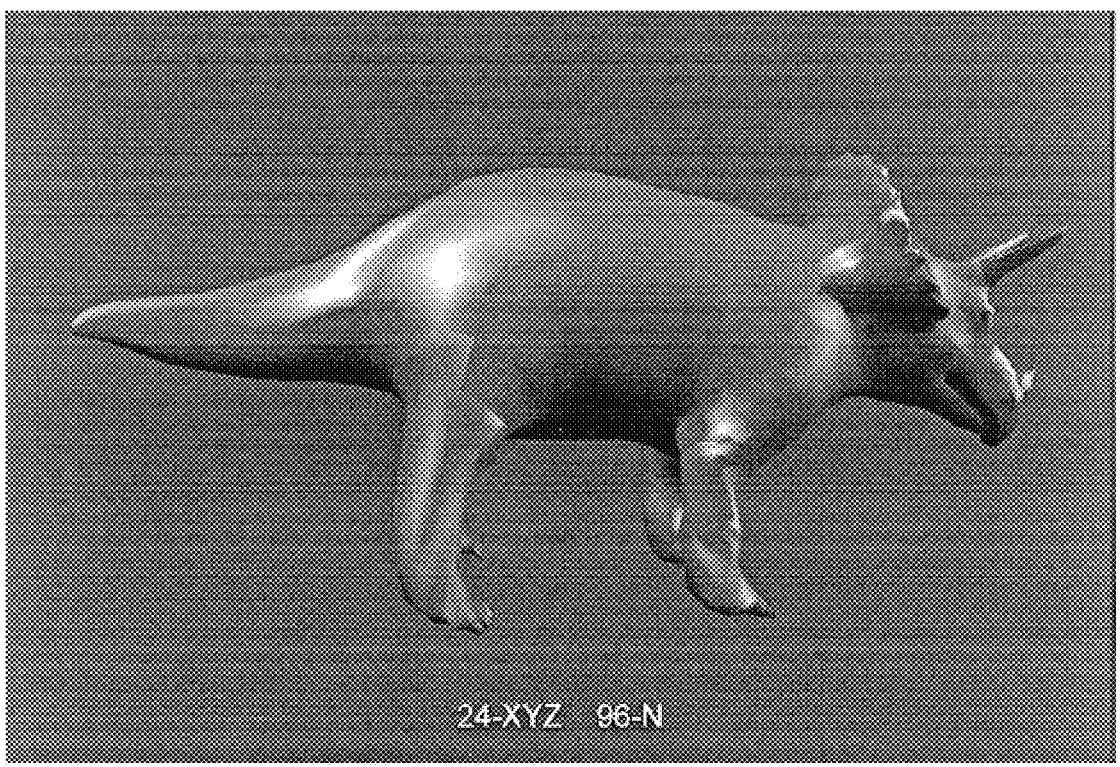
Figure 13D:
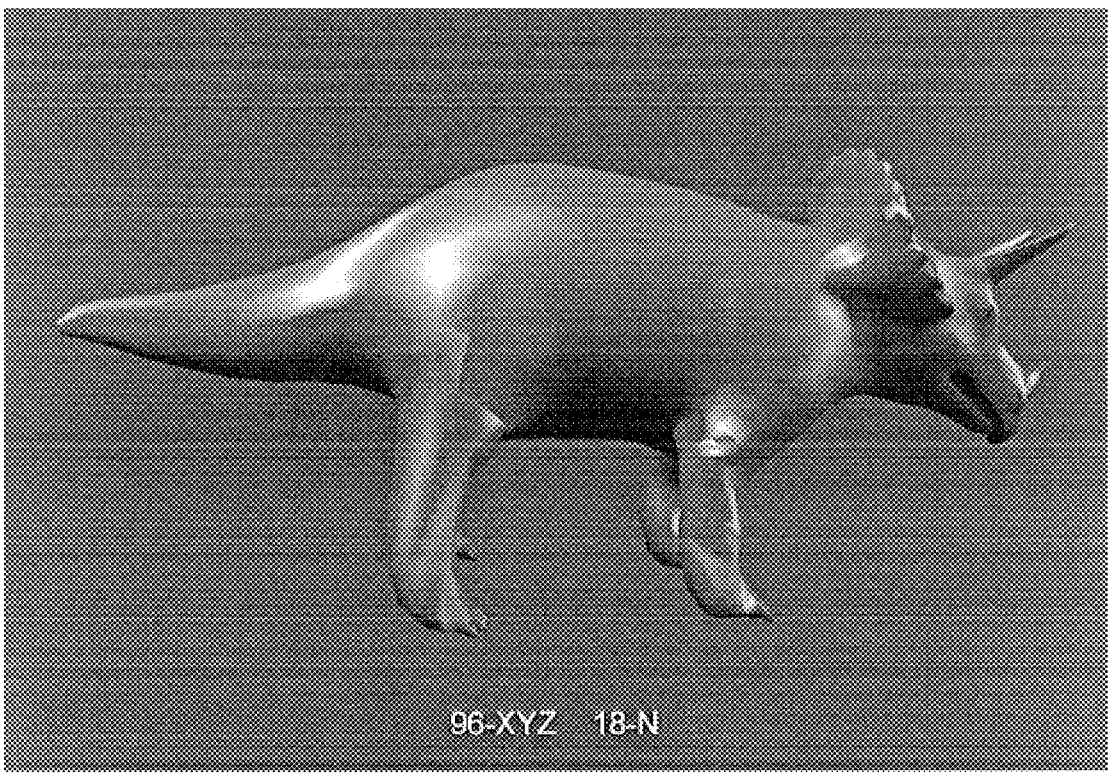
Figure 13E:
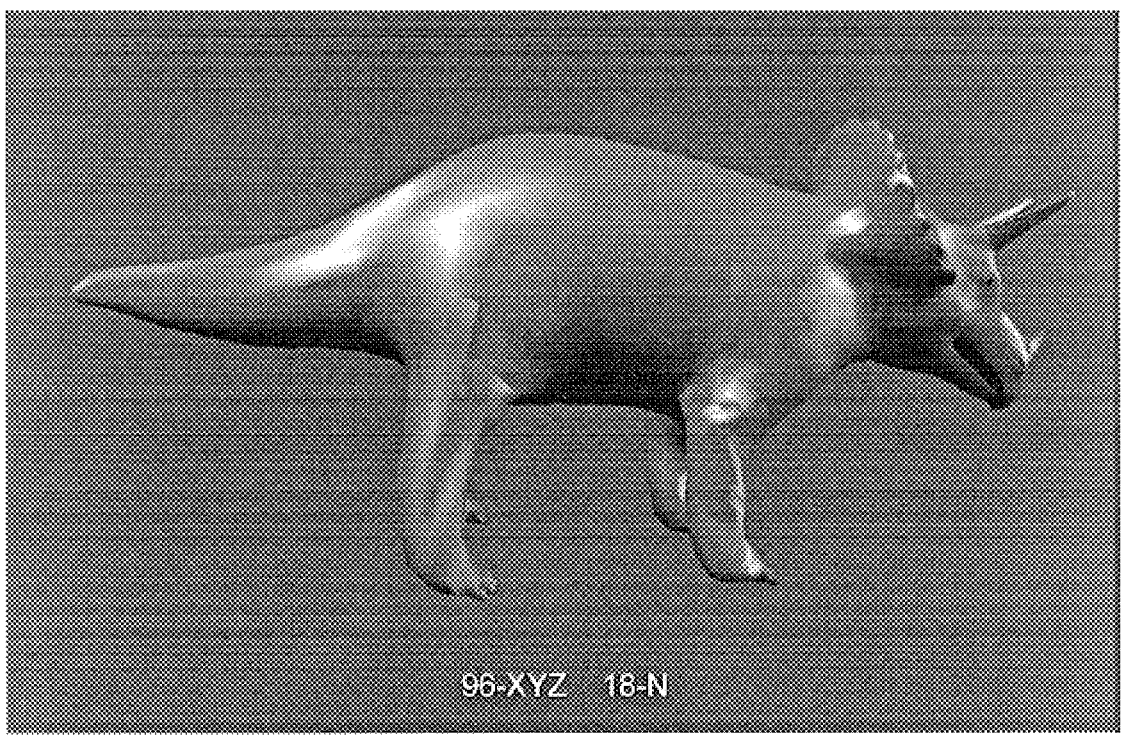
Figure 13F:
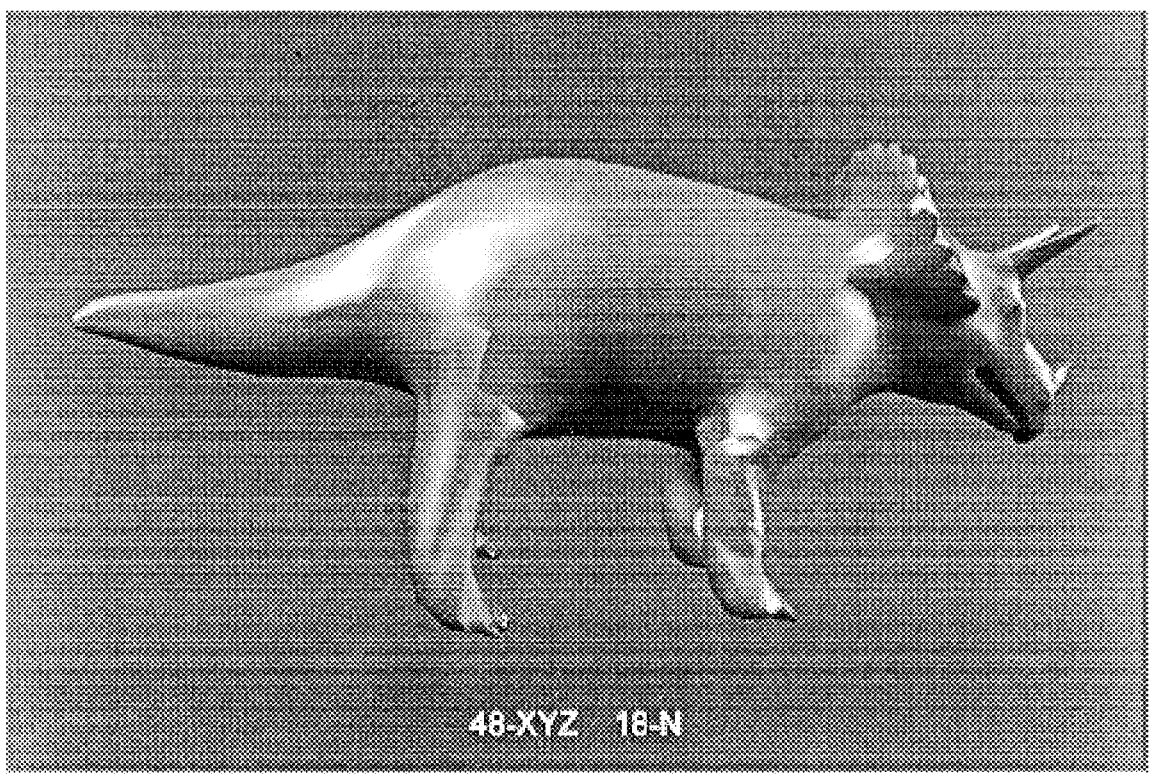
Figure 13G:
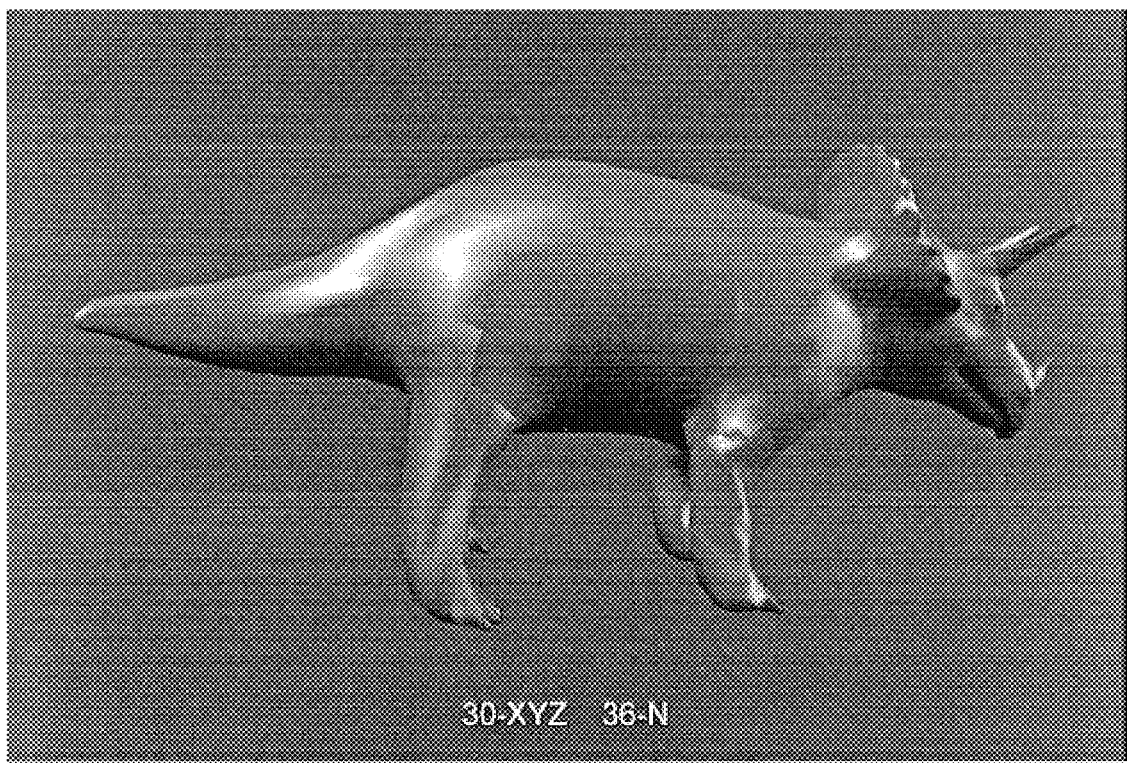
Figure 13H:
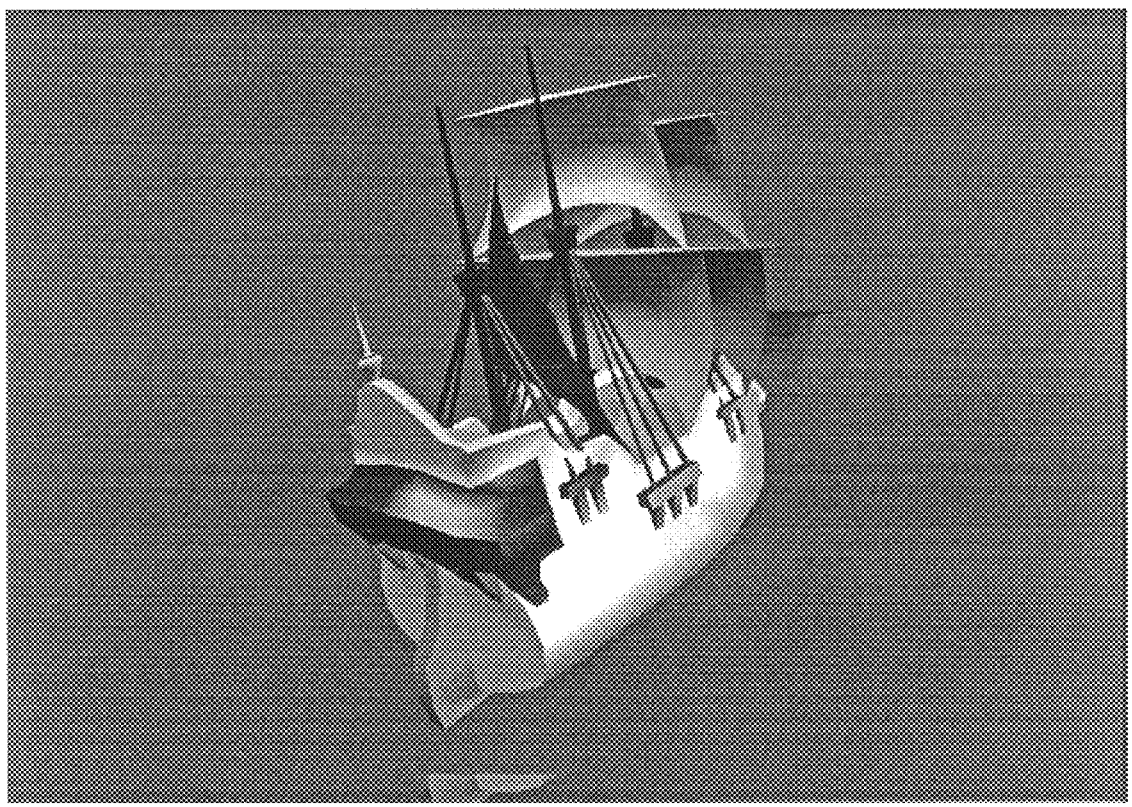
Figure 13I:
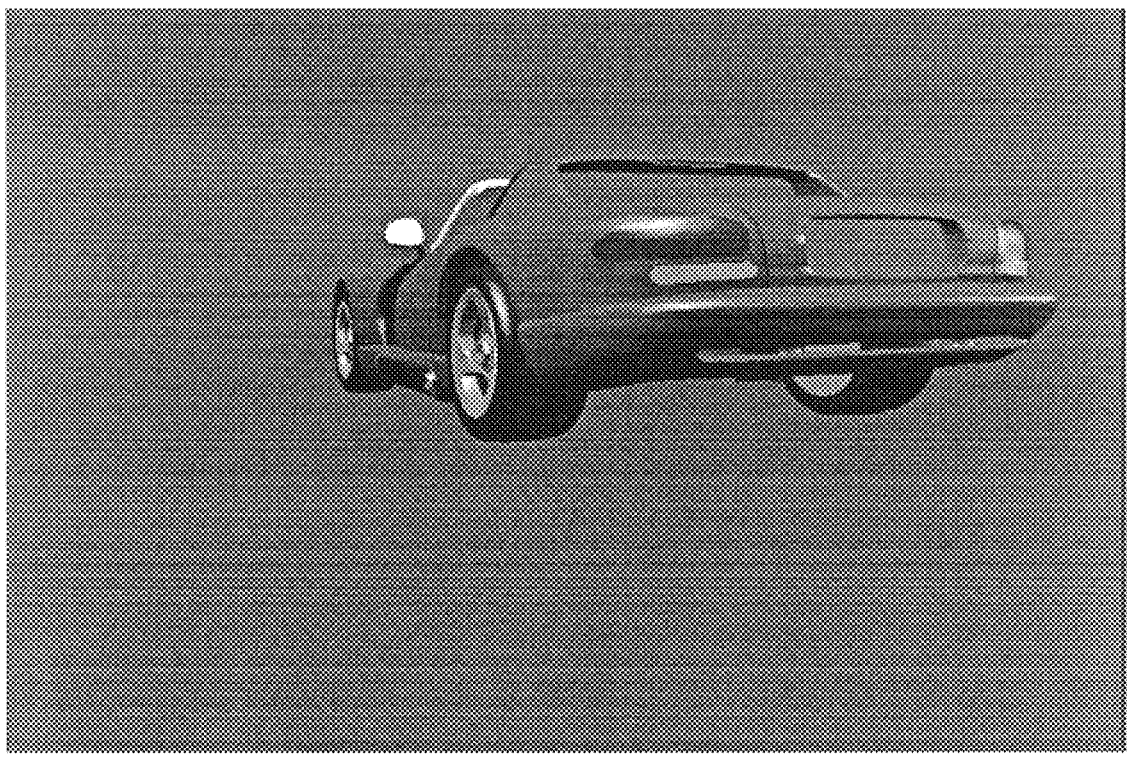
Figure 13J:
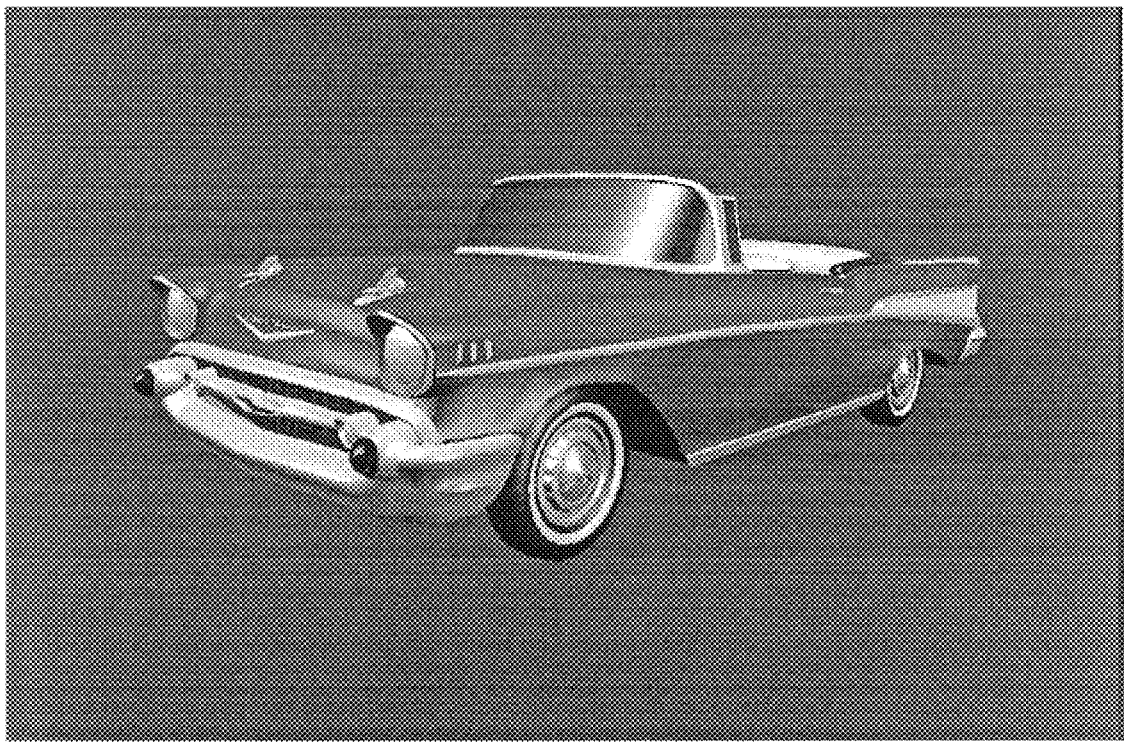
Figure 13K:
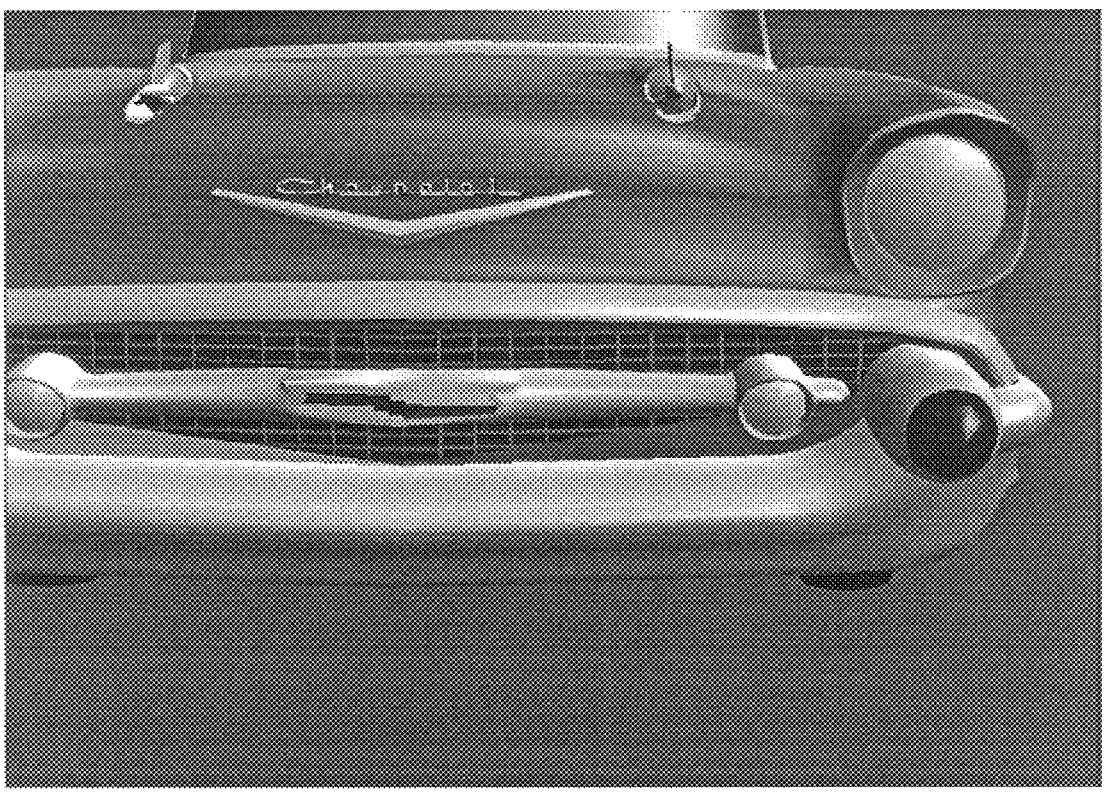
Figure 13L:
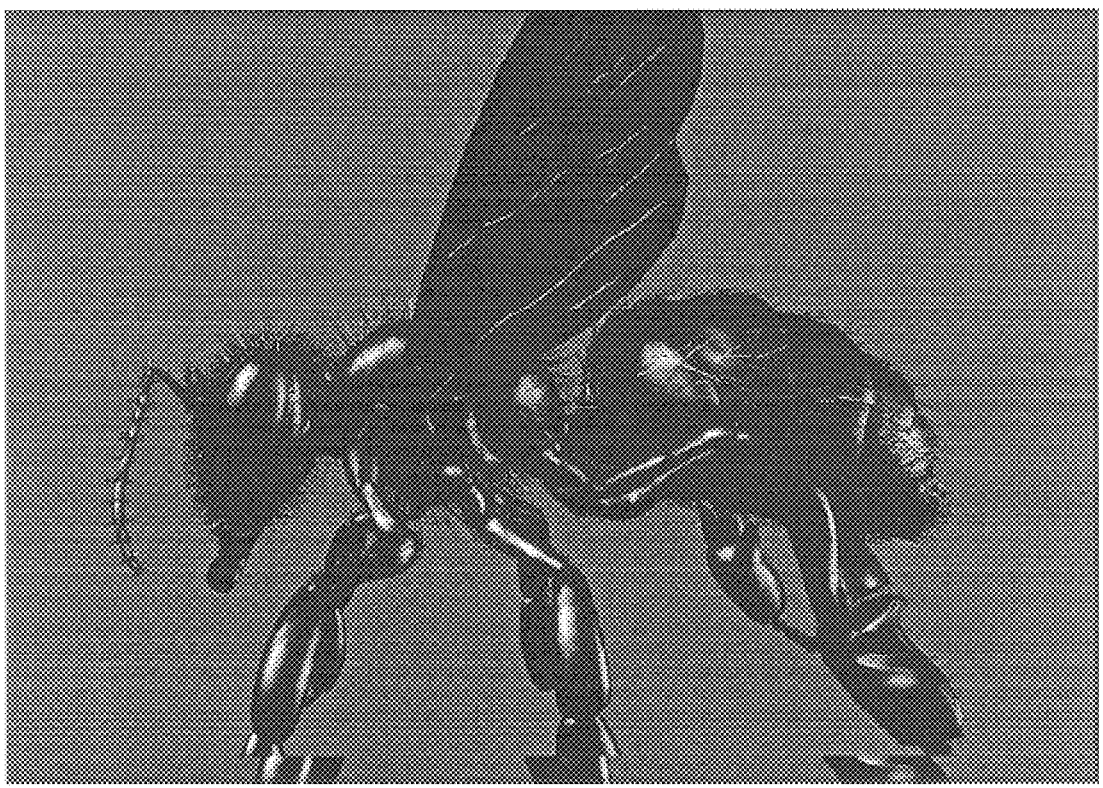
Figure 14:
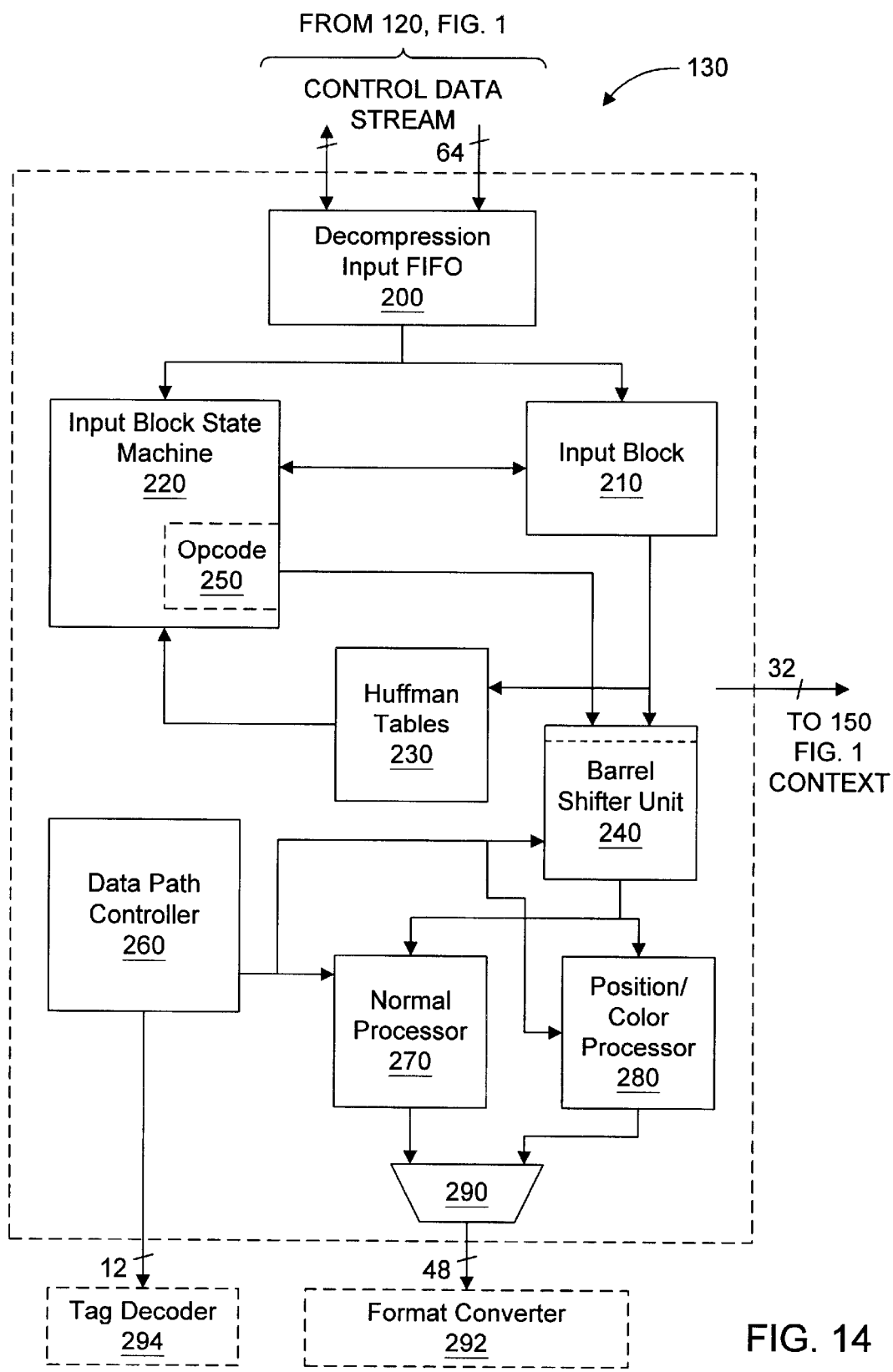
FIG. 14 is a detailed overall block diagram of one embodiment of a decompressor unit suitable for decompressing data compressed.

Comparative uncompressed and compressed image results are shown in FIGS. 13A–14 and in Table 1, below. FIGS. 13A–13G depicts the same base object, a triceratops, but with different quantization thresholds on positions and normals. FIG. 13A is the original full floating-point representation, using 96-bit positions and 96-bit normals, denoted by the nomenclature P96/N96. FIGS. 13B and 13C depicts the effects of purely positional quantization P36/N96 and P24/N96, respectively, while FIGS. 13D and 13E depict only normal quantization, P96/N18 and P96/N12. FIGS. 13F and 13G show combined quantization, P48/N18 and P30/N36.

FIGS. 13H–13L depict only quantized results for different objects, including a galleon (P30/N12), a Dodge Viper (P36/N14), two views of a '57 Chevy (P33/N13), and an insect (P39/N15).

Without zooming into the object, positional quantization much above 24-bits (per component) has essentially no significant visible effect. As the normal quantization is reduced, the positions of specular highlights on the surfaces are offset slightly. However, it is not visually apparent that such changes are reductions in quality, at least above 12 bits per normal. The quantization parameters were photographed with the objects, and otherwise even applicant could not distinguish between the original and most compressed versions of the same object.

Table 1 summarizes compression and other statistics for these objects. Column 1 notes the object in question, column 2 represents the number of $\Delta$'s, and column three the $\Delta$-strip length. The fourth column represents system overhead per-vertex (overhead being everything beyond position tag/data, and normal tag/data). The "xyz quant" column denotes quantization thresholds, and the sixth column depicts the number of bits/xyz. "Bits/tri" ninth column depicts bits per triangle.

The results in Table 1 are measured actual compression data except for estimated mesh buffer results, which are shown in parenthesis. No actual mesh buffer results were present in that applicant's prototype software compressor did not yet implement a full meshifying algorithm. The estimate (in parenthesis) assumes a 46% hit ratio in the mesh buffer.

In Table 1, the right-most column shows compression ratio performance achieved over existing executable geometry formats. Although total byte count of the compressed geometry is an unambiguous number, in stating a compression ratio some assumptions are made about the uncompressed executable representation of the object. Applicant assumed optimized generalized triangle strips, with both positions and normals represented by floating-point values to calculate "original size" data for Table 1.

To demonstrate the effect of pure 16-bit fixed point simple strip representation, Table 1 also shows byte count for the mode of OpenGL. As shown, average strip length decreased in the range of 2–3. Few if any commercial products take advantage of generalized triangle strips, and thus Table 1 considerably understates potential memory space savings.

TABLE 1

| Obj. name | #$\Delta$'s | $\Delta$stp len. | ovrhd/ vertex | xyz quant | bits/ xyz | norm quant | bits/ norm | bits/ tri | org'l size (bytes) | comp. size (bytes) | comp. ratio |
|---|---|---|---|---|---|---|---|---|---|---|---|
| tricer-atops | 6,039 | 15.9 | 7.5 | 48 | 30.8 | 18 | 16.8 | 55.9 (35.0) | 179,704 | 42,190 (26,380) | 4.3x (6.9x) |
| tricer-atops | 6,039 | 15.9 | 7.5 | 30 | 17.8 | 12 | 11.0 | 36.0 (24.4) | 179,704 | 27,159 (18,368) | 6.7x (9.8x) |
| galleon | 5,577 | 12.1 | 7.5 | 30 | 21.9 | 12 | 10.8 | 41.0 (27.2) | 169,064 | 28,536 (18,907) | 6.0x (9.0x) |
| Viper | 58,203 | 23.8 | 7.5 | 36 | 20.1 | 14 | 10.9 | 37.5 (25.0) | 1,698,116 | 272,130 (181,644) | 6.3x (9.4x) |
| 57 Chevy | 31,762 | 12.9 | 7.5 | 33 | 17.3 | 13 | 10.9 | 35.8 (24.3) | 958,160 | 141,830 (96,281) | 6.8x (10.0x) |
| insect | 263,783 | 3.0 | 7.5 | 39 | 22.8 | 15 | 11.0 | 51.5 (33.9) | 9,831,528 | 1,696,283 (1,115,534) | 5.8x (8.9x) |

While certainly statistical variation exists between objects with respect to compression ratios, general trends are nonetheless noted. When compressing using the highest quality setting of the quantization knobs (P48/N18), compression ratios are typically about six. As ratios approach nearly ten, most objects begin to show visible quantization artifacts.

In summation, in some embodiments geometry compression can represent three-dimensional triangle data with a factor of six to ten times fewer bits than required with conventional techniques. Applicant's geometry compression algorithm may be implemented in hardware, in software, or in a combination thereof For a fixed number of triangles, compression can minimize the total bit-size of the representation, subject to quality and implementation trade-offs. The resultant geometry-compressed image suffers only slight losses in object quality, and may be decompressed using software or hardware implementations. If three-dimensional rendering hardware contains a geometry decompression unit, application geometry may be stored in memory in compressed format. Further, data transmission may use the compressed format, thus improving effective bandwidth for a graphics accelerator system, including shared virtual reality display environments. The resultant compression can substantially increase the amount of geometry cacheable in main memory.

To promote a fuller understanding of geometry compression, especially in a compression-decompression system, decompression of data that have been compressed will now be described in detail. The following description of decompression is taken from applicant's earlier-referenced patent application.

FIG. 14 is a detailed block diagram of the decompressor unit 130, shown in FIG. 4. As shown in FIG. 14, unit 130 includes a decompression input first-in-first-out register ("FIFO") 200 whose inputs include control signals and a 32-bit or 64-bit data stream, which signals and data stream preferably come from an accelerator port data FIFO ("APDF") in interface unit 120 (see FIG. 4). The APDF portion of interface 120 includes a controller that signals the size of the incoming data stream to decompressor unit 130. FIFO 200 provides output to an input block state machine 220 and to an input block 210, state machine 220 and input block unit 210 communicating with each other.

Output from block 210 is coupled to a barrel shifter unit 240 and to a Huffman table set 230, the output from the Huffman look-up being coupled to state machine 220. Opcode within state machine 220 processes the values provided by the Huffman tables 230 and outputs data to the barrel shifter unit 240. State machine 220 also provides an output to data path controller 260, which outputs a 12-bit wide signal to a tag decoder unit 294 and also outputs data to the barrel shifter unit 240 and to a normal processor 270, and a position/color processor 280.

Barrel shifter unit 240 outputs to the normal processor 270 and to a position/color processor 280. The outputs from processors 270 and 280 are multiplexed by output multiplexer unit 290 into a preferably 48-bit wide signal that is provided to a format converter 292.

Decompression unit 130 generates a preferably 12-bit tag that is sent to tag decoder 294 in parallel with either 32-bits or 48-bits (for normals), that are sent to the format converter 292. These data streams provide instructions that generate output to format converter 292. A preferably 32-bit read-back path is used to read-back the state of the unit.

Table 2, below, shows interface signals used to implement a preferred embodiment of a decompression unit 130:

TABLE 2

| Signal Name | Signals | I/O | Description |
| --- | --- | --- | --- |
| id_data | 64 | I | Data inputs from APDF |
| id_tag | 12 | I | Data on inputs is valid from APDF |
| fd_stall | 1 | I | Stall signal from format converter |
| di_busy | 1 | O | Busy signal to status register |
| di_faf | 1 | O | Fifo-almost-full signal-to-input FIFO |
| df_data | 48 | O | Data output to formal converter |
| df_tag | 12 | O | Tag output to tag decoder |
| du_context | 32 | O | Context output to UPA section |

Table 3, below, shows output data formats provided by unit 130. As described herein, vertex, mesh buffer reference, and passthrough instructions generate transactions from decompression unit 130. Vertex and mesh buffer reference instructions send data to the format converter, and each generates a header indicating vertex replacement policy for the current vertex, followed by component data Each of these instructions always generates position data and, depending upon the value of the state register, may contain color or normal data. All three of the normal components preferably are sent in parallel, whereas each position and color component is separately sent. A passthrough instruction sends preferably 32-bits of data to the collection buffer.

TABLE 3

| COMPONENTS | FORMAT |
| --- | --- |
| Header | 32. |
| Position | s.15 |
| Color | 1.15 or s.1.14 |
| Normal | s1.14(x3) |
| Passthrough | 32. |

Figure 15:
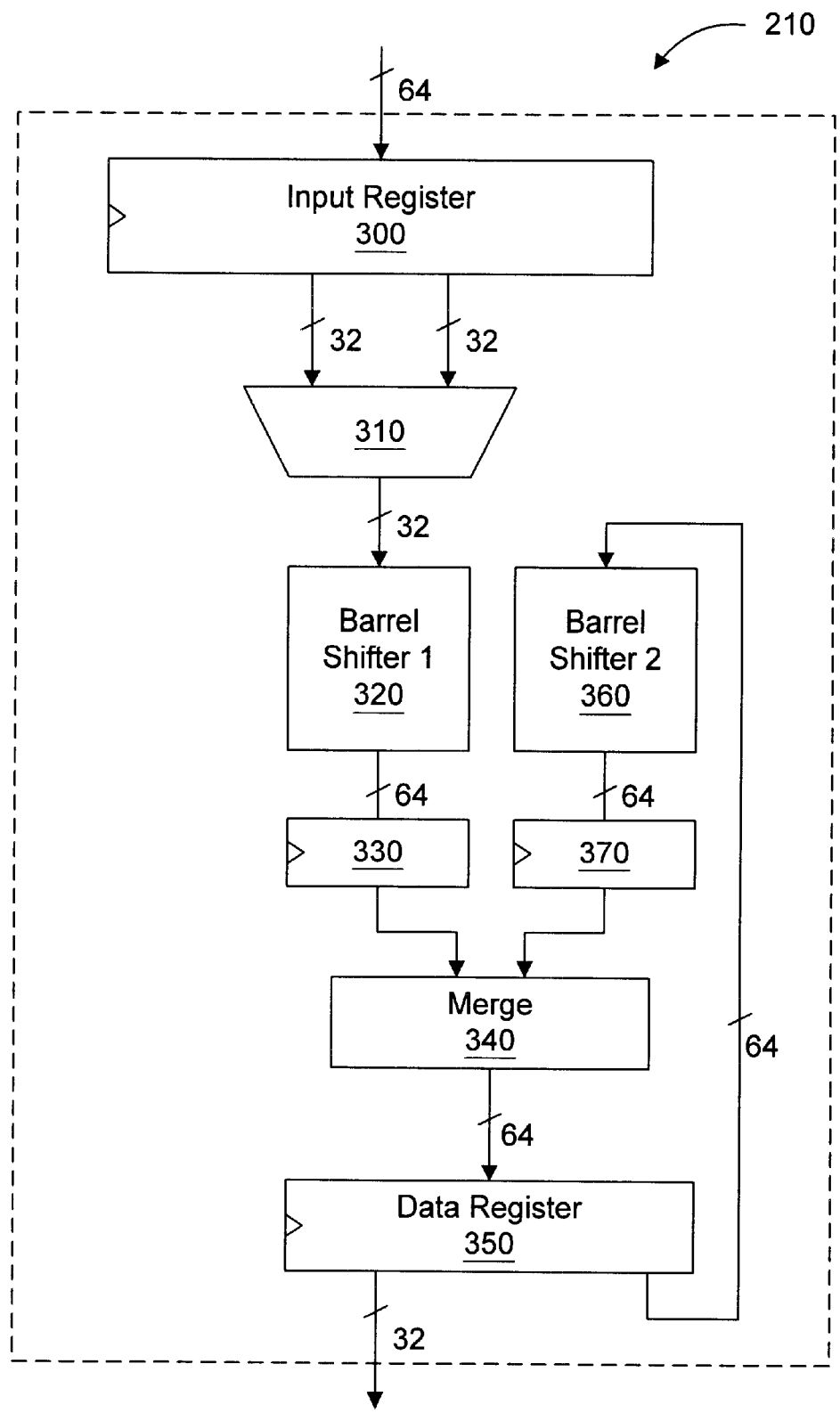
FIG. 15 is a detailed block diagram of one embodiment of the input block shown in FIG. 14.

FIG. 15 is a detailed block diagram of the input block 210 depicted in FIG. 14. A preferably 64-bit input register 300 receives data from the APDF portion of interface 130, with 32-bits or 64-bits at a time being loaded into register 300. Register 300 outputs preferably 32-bits at a time via multiplexer 310 to a first barrel shifter 320 whose output passes through a register 330 into a merge unit 340. The 64-bit output from merge unit 340 is input to data register 350, part of whose output is returned as input to a second barrel shifter 360. The output from second barrel shifter 360 is passed through a register 370 and is also input to merge unit 340. First barrel shifter 320 aligns data to the tail of the bit-aligned data stream being recycled from data register 350 through second barrel shifter 360. The second barrel shifter 360 shifts-off the used bits from data register 350.

Figure 16:
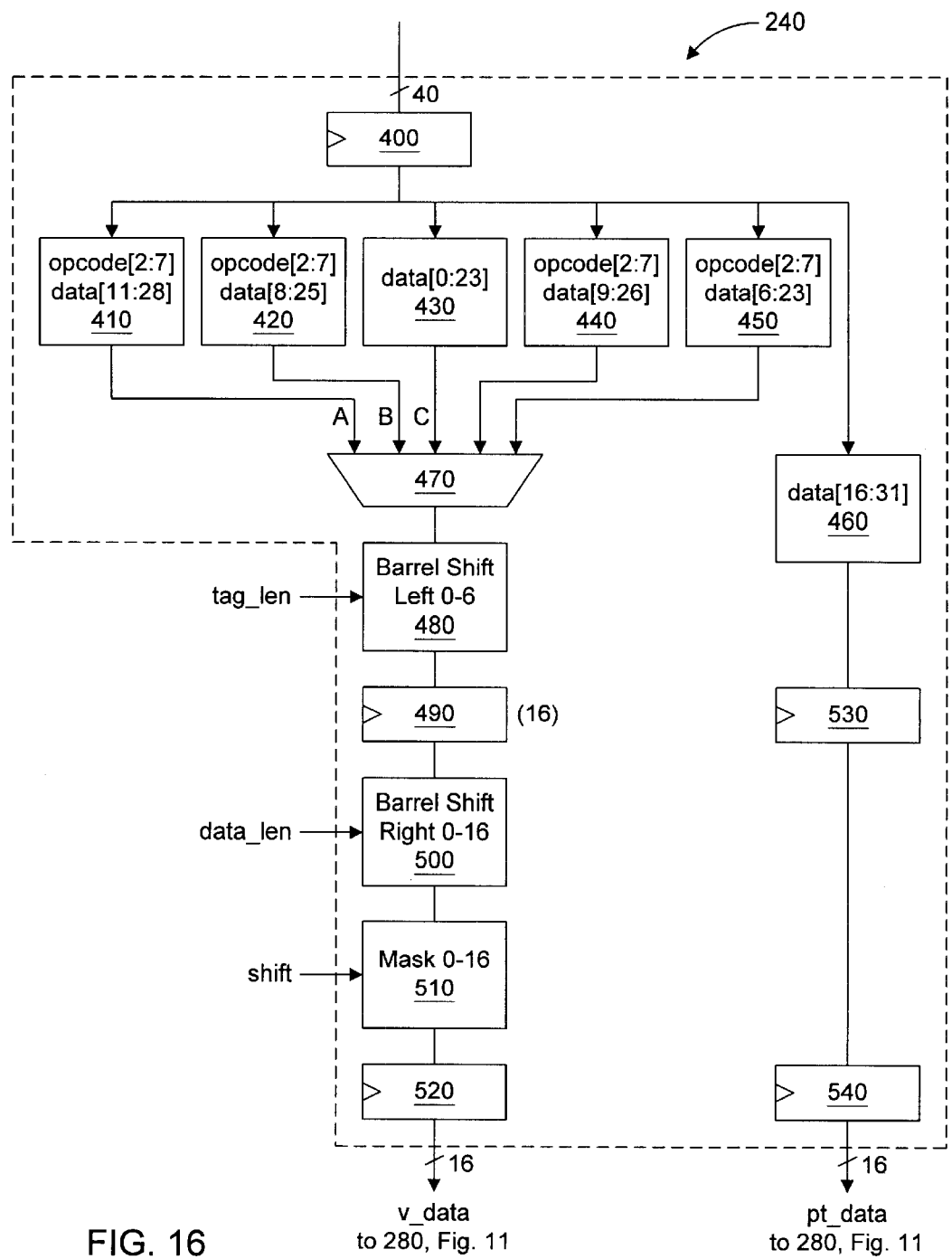
FIG. 16 is a detailed block diagram of one embodiment of the barrel shifter unit shown in FIG. 14.

FIG. 16 is a detailed block diagram of barrel shifter unit 240, shown in FIG. 14. In overview, barrel shifter unit 240 expands the variable-length position, color, and normal index components to their fixed-point precisions. Data into unit 240 from unit 210 and/or 220 is input to a register 400 whose output is shown as defining opcode and/or data units 410, 420, 430, 440, 450, and 460, which are input to a multiplexer unit 470.

Multiplexer unit 470 input A is used for the X component of the vertex instruction, input B is used for the set normal instruction and the first component of the set color instructions, and input C is used for the remaining components of the vertex and set color instructions. Unit 240 further includes a barrel shift left register 480 coupled to receive tag_len data and to output to register 490, whose output in turn is input to a barrel shift right register 500 that is coupled to receive data_len data. Register 500 outputs to a mask unit 510 that is coupled to receive shift data and whose output is coupled to register 520, which outputs v_data. The output of data block 460 is coupled to a register 530 whose output is coupled to a second register 540, which outputs pt_data.

An appropriate table within Huffman tables 230 (see FIG. 14) provides values of tag_len, data_len, and shift into units 480, 500 and 510, respectively. Barrel shift left unit 480 shifts the input data left by 0 to 6 bits (tag_len), thus shifting off the Huffman tag. By contrast, barrel shift right register 500 shifts the data to the right by 0 to 16 bits (16—data_len), and sign extends the data, thus bringing the data to its full size. Mask unit 510 masks off the lower shift bits to clamp the data to the correct quantization level.

Figure 17:
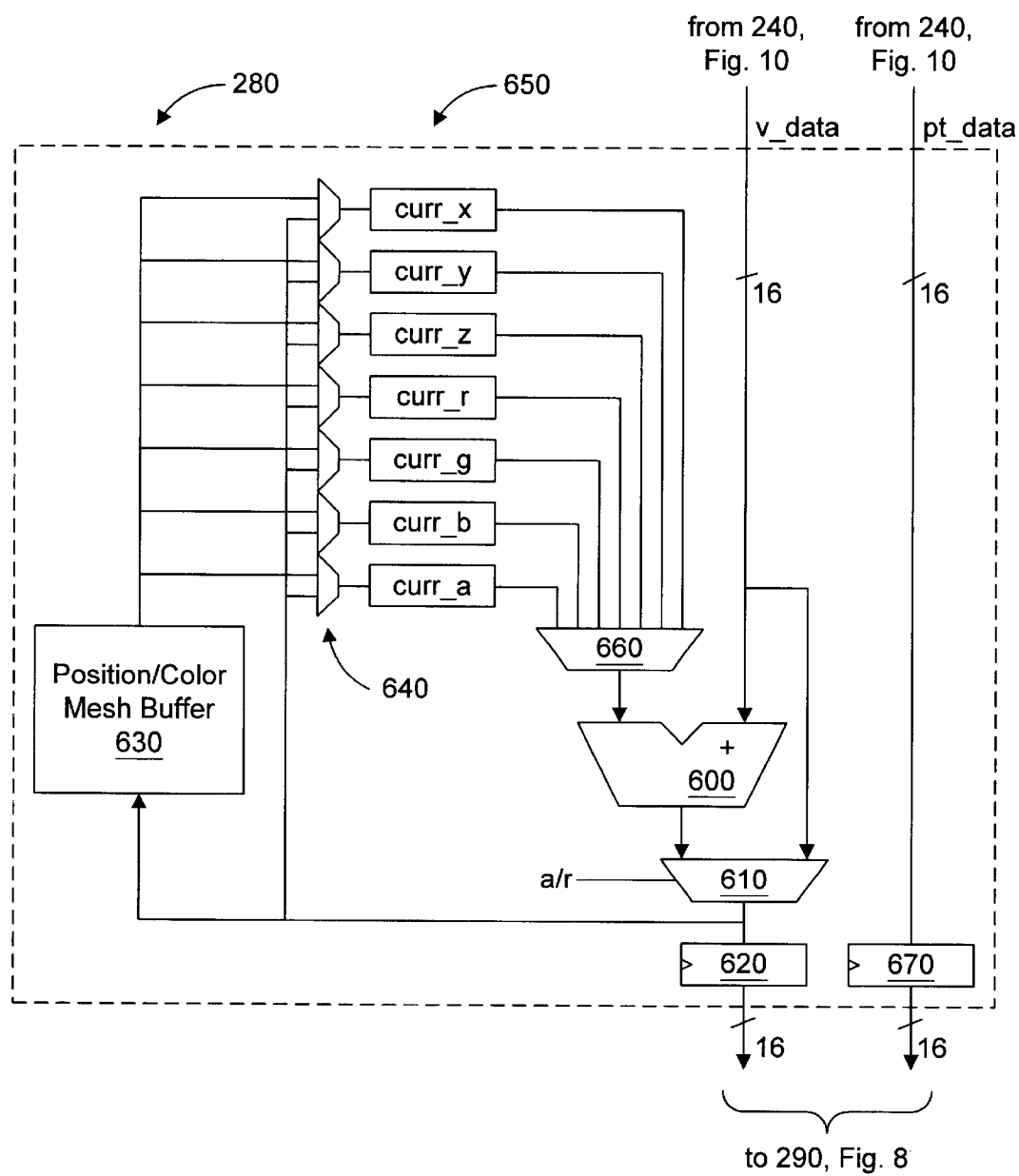
FIG. 17 is a detailed block diagram of one embodiment of the position/color processor unit shown in FIG. 14.

FIG. 17 depicts in greater block diagram detail the position/color processor unit 280, shown in FIG. 14. Processor unit 280 generates final position or color component values. As shown in FIGS. 8 and 10, processor unit 280 receives a preferably 16-bit value (v_data) from the barrel shifter unit 240, specifically mask unit 510 therein. If the abs_rel bit from the Huffman table 230 is set to relative, the incoming data are added by combiner unit 600 to the appropriate current stored data. The new value passes through multiplexer 610, and is stored back into the register 620, and is sent along to the output multiplexer 290, shown in FIG. 14. However, if the abs_rel bit is set to absolute, the incoming data bypasses adder 600, is latched into the register 620, and is also sent out to the output multiplexer 290.

As shown in FIG. 17, the position/color processor unit 280 further includes a position/color mesh buffer 630 that is coupled to receive the input to register 620. The output from mesh buffer 630 is coupled to multiplexer gates, collectively 640, whose outputs reflect current values of x, y, z, r, g, b and α. A register set, collectively shown as 650, provides these current values to the input of a multiplexer 660, whose output is coupled to the adder 600. Processor unit 280 further includes a register 670 that receives and outputs pt_data from barrel shifter unit 240.

Figure 18A:
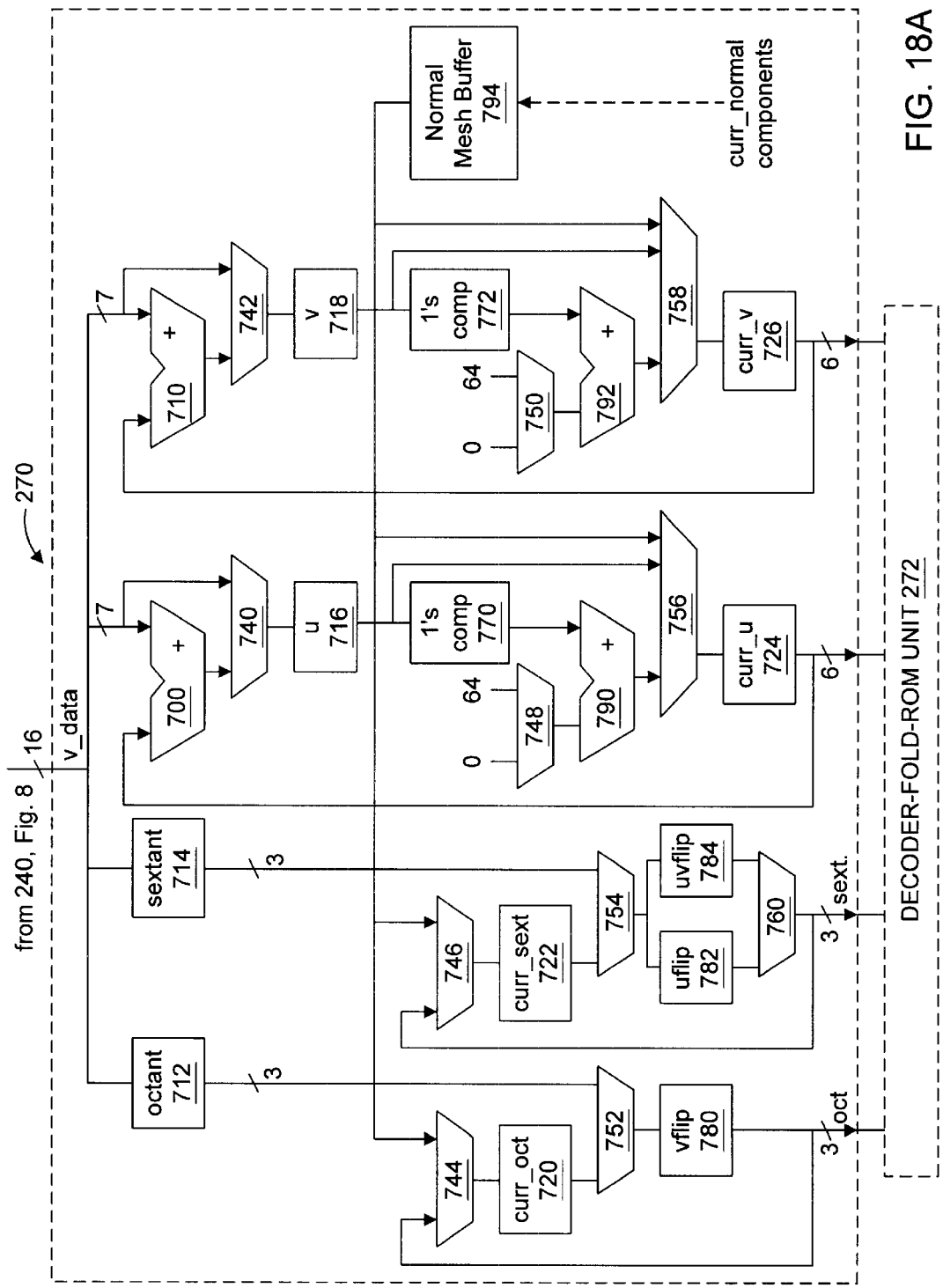
FIG. 18A is a detailed block diagram of one embodiment of the normal processor unit shown in FIG. 14.

As shown in FIG. 14, normal processor unit 270 also outputs data to the output multiplexer 290. FIG. 18A depicts in detail the sub-units comprising normal processor unit 270. As seen in FIG. 14 and FIG. 16, the normal processor unit 270 receives an 18-bit normal index as three separate components: sextant/octant, u and v, or encoded Δu and Δv components from mask unit 510 in barrel shifter unit 240. If the value is a Δ-value (relative), the Δu and Δv are added to the current u and v values by respective adders 710. The intermediate values are stored and are also passed on to a fold unit 800 associated with decoder-fold-rom unit 272 (see FIG. 18B).

As shown in FIG. 18A, the normal processor unit 270 further includes registers 712, 714, 716, 718, 720, 722, 724, 726 which hold respective octant, sextant, u and v values, curr_oct, curr_sext, curr_u and curr_v values. Also present in unit 270 are multiplexers 740, 742, 744, 746, 748, 750, 752, 754, 756, 758 and 760, 1's complementing units 770, 772, latch-flipflop units 780, 782, 784 for holding respective v, u, and uv information, further adders 790, 792, and a normal mesh buffer 794 coupled to receive curr_normal input components.

Figure 18B:
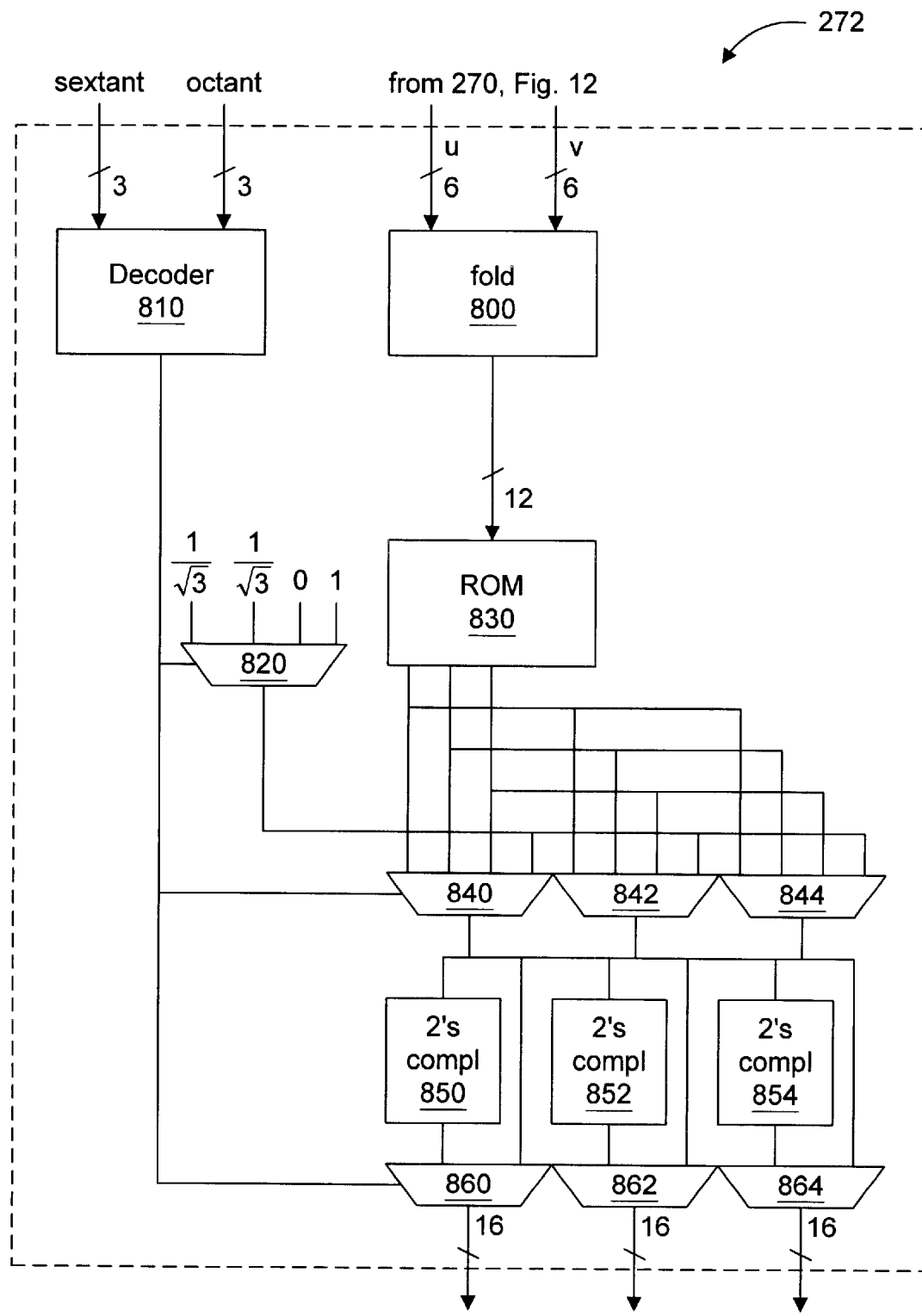
FIG. 18B is a detailed block diagram showing the decoder, fold, and ROM look-up components associated with the normal processor unit of FIG. 14.

With reference to FIGS. 18A and 18B, for an absolute reference, the u and v values are passed directly to fold unit 800. The octant and sextant portions of the index are sent to decoder 810, within unit 272. Decoder 810 controls multiplexer 820 (which select constants), as well as multiplexers 840, 842, 844, 860, 862, 864, which reorder components, and invert signs (using 2's complement units 850, 852, 854).

Fold unit 800 uses the u and v components of the normal index, from unit 270, to calculate the address into the normal look-up table ROM 830. The octant and sextant fields, from unit 270, drive a decoder 810 that determines sign and ordering of components output from the ROM look-up table 830. Decoder 810 also handles special case normals not included in the normal ROM look-up table 830.

Figure 19:
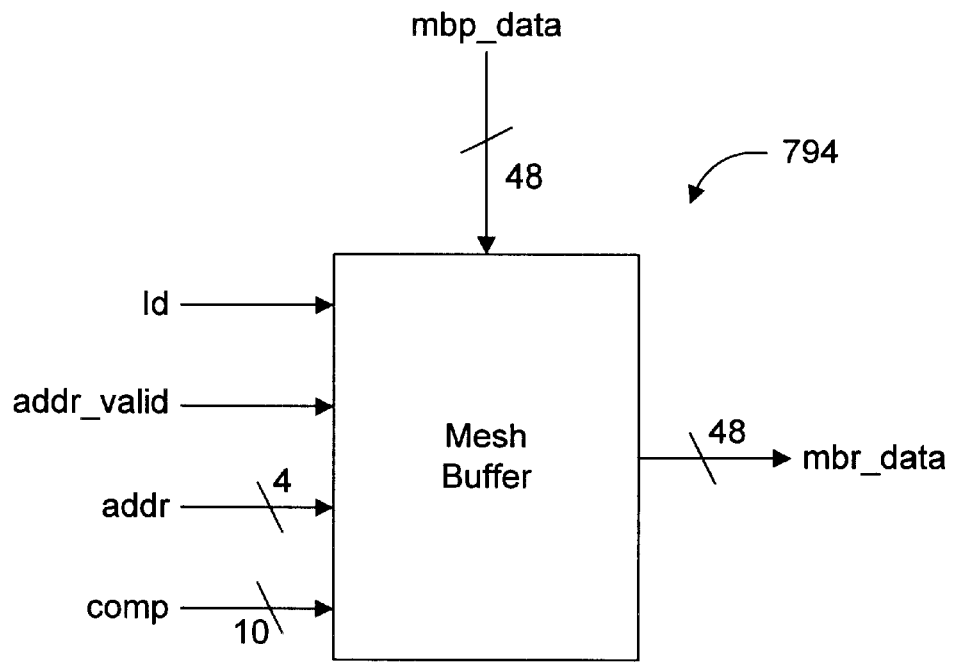
FIG. 19 is a block diagram showing one embodiment of the interfaces to a mesh buffer, as shown in FIG. 17 and/or FIG. 18A.

FIG. 19 depicts interfaces to a mesh buffer, as shown in FIG. 17 and/or FIG. 18A Preferably, mesh buffer 794 is implemented as a register file and a pointer to the current location. Data is input to the mesh buffer FIFO at the position of the current location pointer. However, random access to any of the 16 locations is allowed when reading the data out of the FIFO by indexing off this pointer: address= (curr_loc_tr−index) mod 16.

Figure 20A:
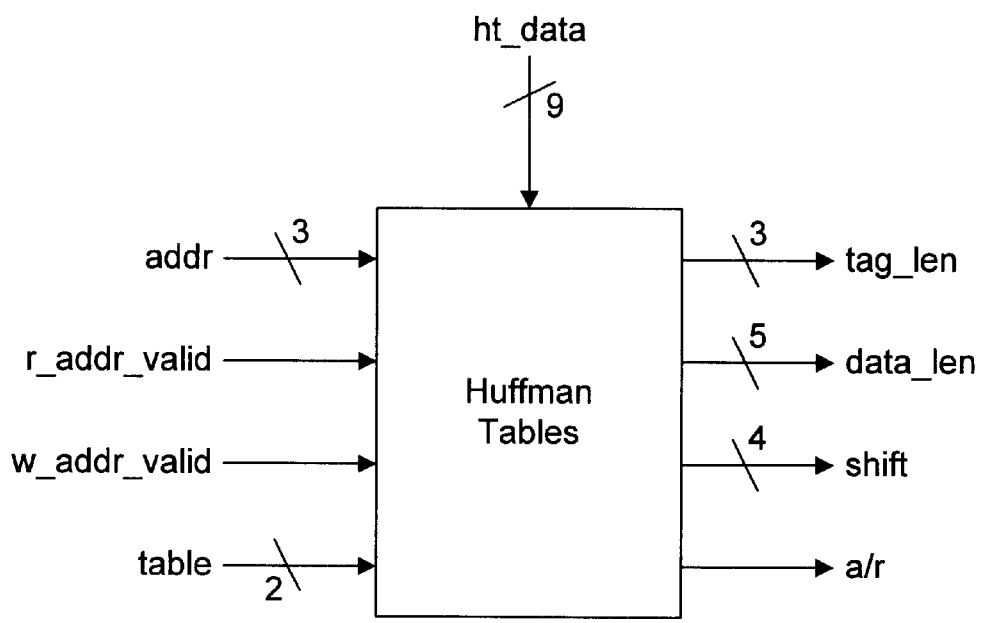
FIG. 20A depicts interfaces to Huffman tables.
Figure 20B:
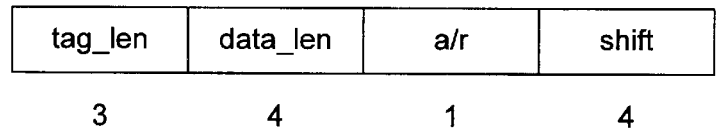
FIG. 20B depicts one embodiment for entry of the Huffman table data.

FIG. 20A depicts interfaces to Huffman tables, e.g., tables 230 in FIG. 14. Huffman tables are used to decode the Huffman tags preceding the compressed data Three Huffman tables are used: one for position, for color, and for normal data, with each table preferably holding 64 entries, FIG. 20B depicts a preferred format for entry of position and color data in the Huffman tables, while FIG. 20C depicts the preferred format for normal table entries.

The instruction format for loading the Huffman tables in the compressed data stream is described later herein.

Several instructions generate data for the format converter 292, shown in FIG. 14, and appropriate tags are generated for this data so the format converter can correctly process the data. Table 4, below, shows one embodiment of tags generated for the different data components. The components that show two tags may set the launch bit, and the second tag shows the value with the launch bit set.

TABLE 4

| COMPONENTS | TAG |
|---|---|
| Header | 0x020 |
| X | 0x011 |
| Y | 0x012 |
| Z | 0x013/0x413 |
| Nx/Ny/Nz | 0x018/0x418 |
| R | 0x014 |
| G | 0x015 |
| B | 0x016/0x416 |
| A | 0x017/0x417 |
| U | 0x0c0/0x4c0 |
| V | 0x01c/0x41c |

Input block state machine 220 (see FIG. 14) preferably includes a state register that holds information about the processing state of the decompression unit. For example, the state information may include a bnv bit (indicating whether normal information is bundled with vertices), a bcv bit (indicating whether color information is bundled with vertices), and a cap bit (indicating that alpha (α) information is included in the color information).

Position/Color processor unit 280 (see FIGS. 14 and 17) preferably includes three 16-bit registers, curr_x, curr_y, and curr_z, which contain the current position components, X, Y, and Z, and are only updated by vertex instructions.

Normal processor unit 270 (see FIGS. 14 and 18A) preferably includes three six-bit registers, curr_oct, curr_ sext, curr_u, curr_v) that contain the current normal. The first register holds the 3-bit sextant and octant fields, and the remaining two registers contain the u and v coordinates for the normal. These values are written using the set normal instruction, or they are updated by the vertex instruction if the bnv bit is set in the state register.

Position/color processor 280 further preferably includes four 16-bit registers, curr_r, curr_g, curr_b, curr_a, which contain the current color components, red, green, blue and alpha ($\alpha$). These components are set using the set color instruction, or they are updated by the vertex instruction if the bcv bit is set in the state register. Preferably, alpha is valid only if the cap bit is set in the state register. The test bit is set when processing texture components, in which case only red and green are valid.

Figure 21A:
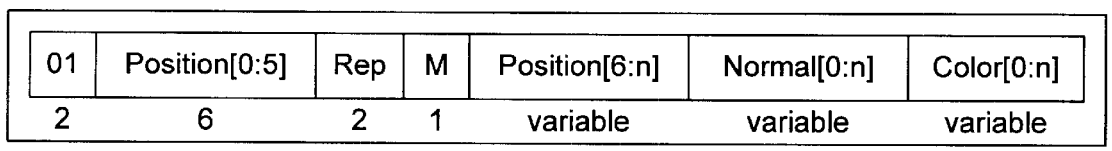
FIG. 21A depicts one embodiment of a vertex instruction.

One possible instruction set implementing decompression of compressed geometry data will now be described. FIG. 21A depicts the vertex instruction format, an instruction that uses variable-length Huffman encoding to represent a vertex. Position information is always present in this instruction.

(REP) The vertex replacement policy is as follows:
  00—Restart clockwise
  01—Restart counter-clockwise
  10—Replace middle
  11—Replace oldest
(M)—mesh buffer push:
  0—No push
  1—Push With reference to FIG. 21A, the position data consists of a variable-length Huffman tag (0 to 6 bits) followed by three data fields of equal length for the X, Y, and Z components, which are either $\Delta$-values or absolute values. The data_len field for the entry in the position Huffman table gives the length of each of the X, Y, and Z fields, the tag_len entry gives the length of the tag, and the abs_rel entry tells whether the data is absolute data or is relative to the previous vertex. The shift entry from the Huffman table gives the quantization level (number of trailing zeroes) for the data If the bnv bit is set in the state register, a normal is included. The encoded normal has a Huffman tag followed by either two variable-length data fields for $\Delta u$ and $\Delta v$, or a fixed-length field for the sextant and octant (6 bits) followed by two variable-length fields for u and v. The former encoding is for delta encodings of normals, while the latter encoding is for absolute encodings. The data_len, tag_len, abs_rel, and shift fields from the normal Huffman table are used similarly as entries from the position table.

Figure 21B:
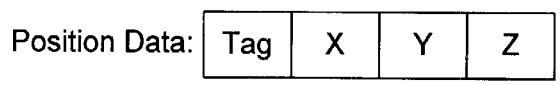
FIG. 21B depicts one embodiment of vertex component data formats.
Figure 21B:
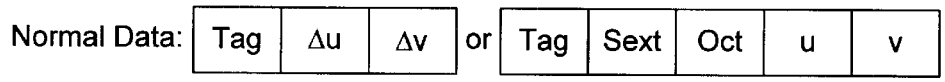
Figure 21B:
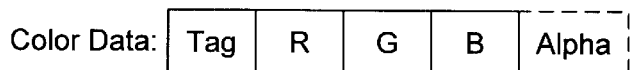

FIG. 21B depicts vertex component data formats. If the bcv bit in the state register is set, color is included with the vertex. The color is encoded similar the position, using three or four fields, but how the fields are used is determined by the tag table. If tagged absolute, then x, y, z, r, g, b data is used. Absolute normals are used with sextant and octant fields. However, if the tag table indicates relative, delta normals are used, and it suffices to send latitude and longitude data (e.g., $\Theta$ and $\Phi$, also referred to herein as u and v.

With further reference to FIG. 21B, a Huffman tag is followed by three equal length fields for R, G, and B. The cap bit in the state register indicates whether an additional field for $\alpha$ is included. The data_len, tag_len, abs_rel, and shift fields from the color Huffman table are used similarly as for entries from the position and normal tables.

The states of the vertex instruction set are as follows:
1. Latch next opcode; output X; shift barrel shift right unit 500 (see FIG. 16) by ptag_len+pdata_len−pquant+2.
2. Merge; output Header.
3. Output Y; shift barrel shift right unit 500 (see FIG. 16) by pdata_len−pquant.
4. Merge
5. Output Z; shift barrel shift right unit 500 (see FIG. 16) by pdata_len−pquant.
6. Merge.
   a. If (bnv)
      i. if (absolute normal), goto 7,
      ii. else goto 9. /*relative normal*/
   b. else If (rnt), goto 21,
   c. else If (bcv) goto 13,
   d. else If (rct) goto 22,
   e. else Merge; branch to next instruction.
7. Latch next opcode; output sextant/octant; shift barrel shift right unit 500 (see FIG. 16) by ntag_len+6.
8. Merge.
9. Output U.
   a If (absolute normal), shift barrel shift right unit 500 (see FIG. 16) by ndata_len−nquant.
   b. else/*relative normal*/, latch next opcode; shift Bs2 by ntag_len+ndata_len−nquant
10. Merge.
11. Output V.
12. Merge.
    a. If (bcv), goto 13,
    b. else If (rct), goto 22,
    c. else Merge; branch to next instruction.
13. Latch next opcode; output R; shift barrel shift right unit 500 (see FIG. 16) by ctag_len+cdata_len−cquant.
14. Merge
15. Output G; shift barrel shift right unit 500 (see FIG. 16) by cdata_len−cquant.
16. Merge; if (tex), branch to next instruction.
17. Output B; shift barrel shift right unit 500 (see FIG. 16) by cdata_len−cquant.
18. Merge; if (~cap) branch to next instruction.
19. Output A; shift barrel shift right unit 500 (see FIG. 16) by cdata_len−cquant.
20. Merge; branch to next instruction.
21. Output curr_normal.
    a. If (bcv), goto 13,
    b. else If (rct), goto 22,
    c. else Merge; branch to next instruction.
22. Output curr_r.
23. Output curr_g. If (tex), Merge; branch to next instruction
24. Output curr_b. If (~cap), Merge; branch to next instruction.
25. Output curr_a. Merge branch to next instruction.

Figure 21C:
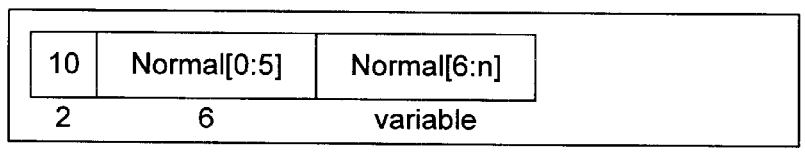
FIG. 21C depicts one embodiment of a format for the set normal instruction.

FIG. 21C depicts the format for the set normal instruction. The set normal instruction sets the value of the current normal registers. The normal data is encoded similarly as is normal data in the vertex instruction, described herein. The states of the set normal instruction are as follows:
If (absolute normal)
1. Latch next opcode; output sextant/octant; shift barrel shift right unit 500 (see FIG. 16) by ntag_len+8.
2. Merge.
3. Output U; shift barrel shift right unit 500 (see FIG. 16) by ndata_len−nquant.
4. Merge.

5. Output V; shift barrel shift right unit 500 (see FIG. 16) by ndata_len+nquant.
6. Merge; branch to next instruction. else/*relative normal*/
1. Latch next opcode; output dU; shift barrel shift right unit 500 (see FIG. 16) by n_tag_len+ndata_len−nquant.
2. Merge.
3. Output dV; shift barrel shift right unit 500 (see FIG. 16) by ndata_len−nquant.
4. Merge; branch to next instruction.

Figure 21D:
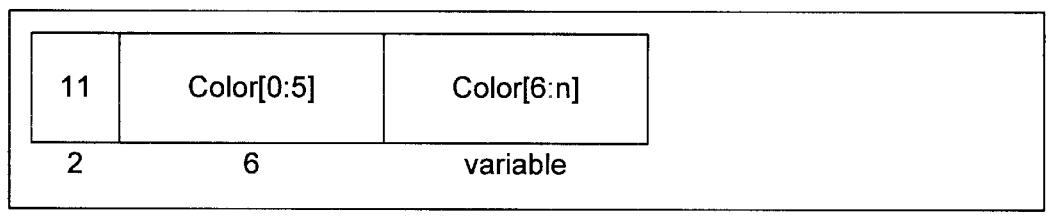
FIG. 21D depicts one embodiment of a set color instruction.

FIG. 21D depicts the set color instruction, an instruction that sets the value of the current color registers. Encoding of the color data is similar to encoding of the color data in the vertex instruction. The states of the set color instruction are as follows:

1. Latch next opcode; output R; shift barrel shift right unit 500 (see FIG. 16) by ctag_len+cdata_len−cquant+2.
2. Merge.
3. Output G; shift barrel shift right unit 500 (see FIG. 16) by cdata_len−cquant.
4. Merge. If (tex), branch to next instruction.
5. Output B; shift barrel shift right unit 500 (see FIG. 16) by cdata_len−cquant.
6. Merge. If (~cap) branch to next instruction.
7. Output A; shift barrel shift right unit 500 (see FIG. 16) by cdata_len−cquant.
8. Merge; branch to next instruction.

Figure 21E:
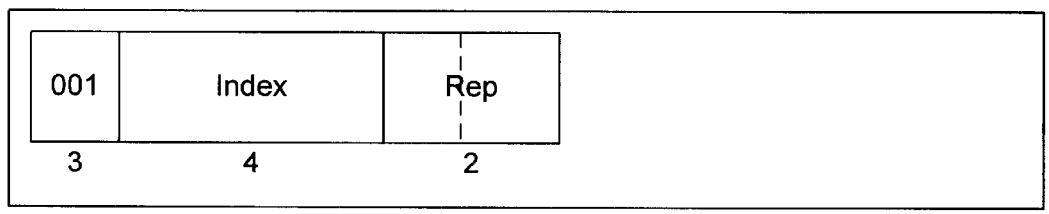
FIG. 21E depicts one embodiment of a mesh buffer reference instruction.

FIG. 21E is a preferred format for the mesh buffer reference instruction. This instruction causes data from an entry in the mesh buffer to be sent out to the format converter as the next vertex. With reference to FIG. 21E, the index indicates the entry from the mesh buffer to send. The newest entry in the mesh buffer has index 0, and the oldest has index 15. REP, the above-described replacement policy for the vertex instruction, is the same as used for the mesh buffer reference instruction. The states for the mesh buffer reference instruction are as follows:

1. Latch next opcode; output Header; shift barrel shift right unit 500 (see FIG. 16) by 9.
2. Output X from mesh buffer.
3. Output Y from mesh buffer.
4. Output Z from mesh buffer.
   a. If (bnv or rnt) goto 5,
   b. else If (bcv or rct) goto 6,
   c. else Merge; branch to next instruction.
5. If (bnv), output Normal from mesh buffer, else if (tnt) output curr_normal.
   a. If (bnv or rct) goto 6,
   b. else Merge; branch to next instruction.
6. If (bcv), output R from mesh buffer, else if (rct) output curr_r.
7. If (bcv), output G from mesh buffer, else if (rct) output curr_g. If (tex), Merge; branch to next instruction.
8. If (bcv), output B from mesh buffer, else if (rct) output curr_b. If (~cap), Merge; branch to next instruction.
9. If (bcv), output A from mesh buffer, else if (rct) output curr_a Merge; branch to next instruction.

Figure 21F:
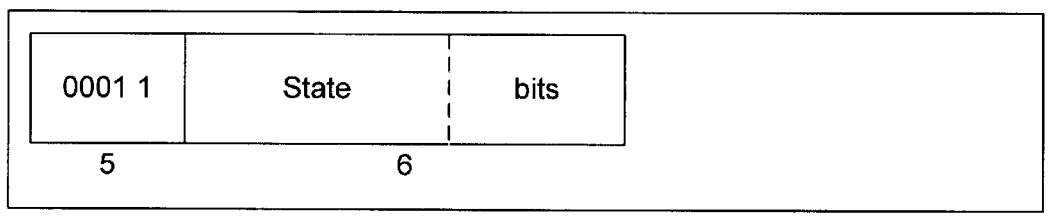
FIG. 21F depicts one embodiment of a set state instruction.
Figure 21G:
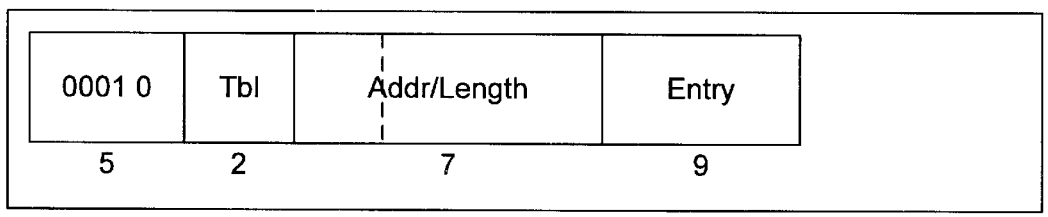
FIG. 21G depicts one embodiment of a set table instruction.

FIG. 21F depicts the set state instruction, which sets the bits the decompression unit state register. The states for the set state instruction are as follows:

1. Latch next opcode; shift barrel shifter 2 by 11 bits.
2. Merge; branch instruction FIG. 21G depicts the set table instruction, which sets Huffman table entries. The table selection is as follows:

00—Position table
01—Color table
10—Normal table
11—Texture table

The tag length is derived from the address. The nine bits in the entry field correspond to the absolute/relative bit, data length, and shift amount fields of the Huffman table entries. (The preferred format of the Huffman table entries has been described earlier herein.) The states of the set table instruction are as follows:

1. Latch next opcode, send address and entry to Huffman tables; shift barrel shift right unit 500 (see FIG. 16) by 23.
2. Merge; branch to next instruction.

Table 5, below, shows the preferred Huffman Table Fill Codes.

TABLE 5

| Address | Entries Filled | Tag Length | Fill Range |
|---|---|---|---|
| 0tttttt | 1 | 6 | tttttt |
| 10ttttt | 2 | 5 | ttttt0–ttttt1 |
| 110tttt | 4 | 4 | tttt00–tttt11 |
| 1110ttt | 8 | 3 | ttt000–ttt111 |
| 11110tt | 16 | 2 | tt0000–tt1111 |
| 111110t | 32 | 1 | t00000–t11111 |
| 1111110 | 64 | 0 | Entire table |

Figure 21H:
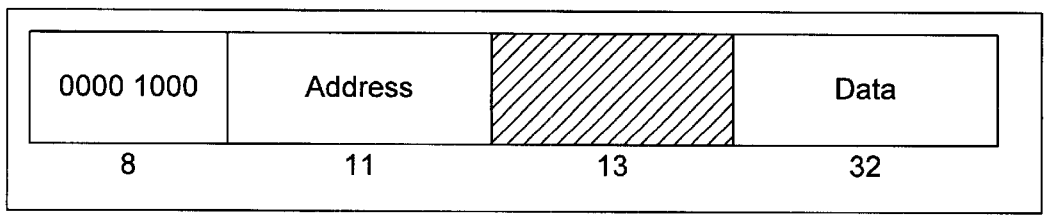
FIG. 21H depicts one embodiment of a passthrough instruction.

FIG. 21H depicts the passthrough instruction, which allows passthrough data to be encoded in the compressed-data stream. The length of the instruction preferably is 64-bits. Aligning successive passthrough instructions to a 64-bit boundary allows for patching of passthrough data in the encoded stream. The states for the passthrough instruction are as follows:

1. Latch next opcode; read address, shift barrel shift right unit 500 (see FIG. 16) by 32 bits.
2. Merge.
3. Output data, shift barrel shift right unit 500 (see FIG. 16) by 32 bits.
4. Merge; branch to next instruction.

Figure 21I:
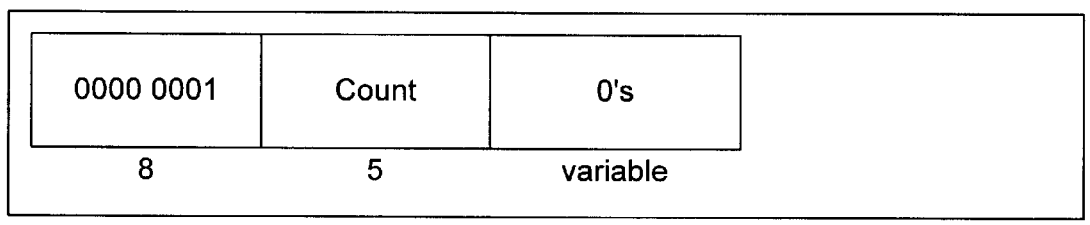
FIG. 21I depicts one embodiment of a variable-length NOP instruction.

FIG. 21I depicts the variable-length NOP ("VNOP) instruction, which encodes a variable number of 0 bits in the data stream. The five-bit count shown in FIG. 21I designates the number of 0 bits that follow. This instruction is implicitly used for the start of the data stream This instruction may also be used to pad the data stream to 32-bit or 64-bit boundaries, or encoding regions, for later patching. The states for this instruction are:

1. Latch next opcode; read count; barrel shift right unit 500 (see FIG. 16) by 13 bits;
2. Merge.
3. Barrel shift right unit reads "count" positions;
4. Merge; branch to next instruction.

Figure 21J:
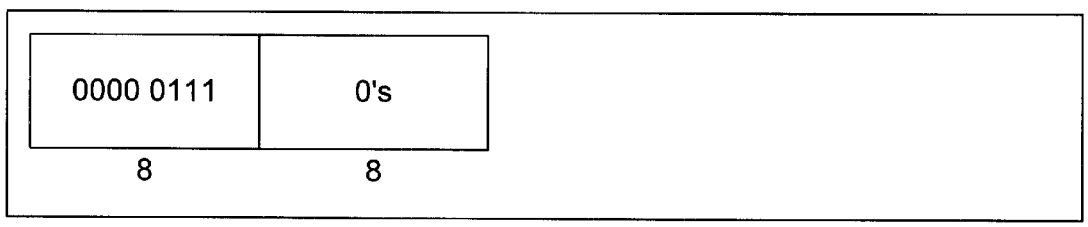
FIG. 21J depicts one embodiment of a skip instruction.

FIG. 21J shows the skip 8 instruction, whose states are:

1. Latch next opcode; shift barrel shift right unit 500 (see FIG. 16) by 16 bits;
2. Merge; branch to next instruction.

Vertex Raster Format

Figure 22:
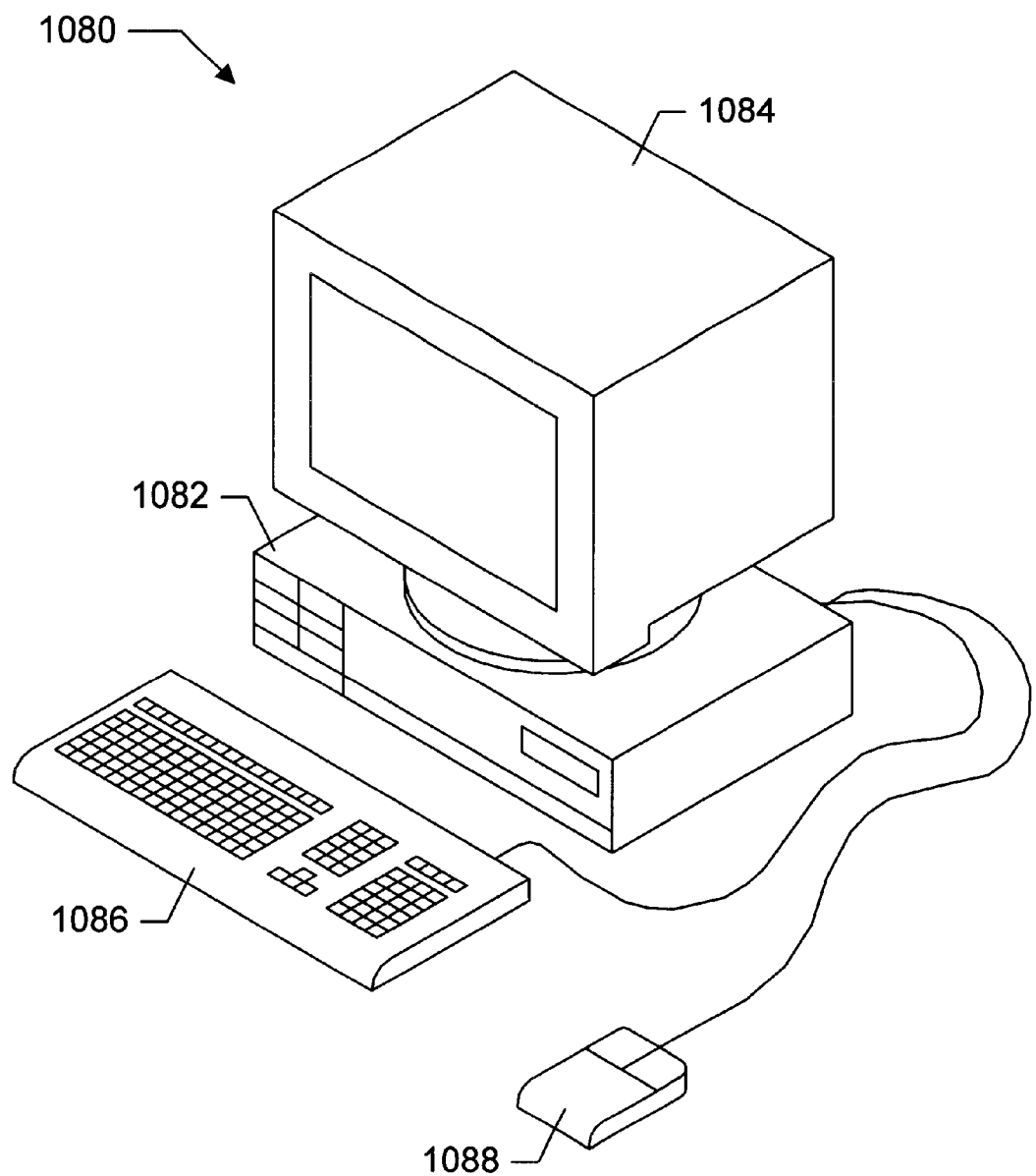
FIG. 22 illustrates one embodiment of a computer system which includes geometry compression capabilities.

FIG. 22—Computer System

Referring now to FIG. 22, a computer system 1080 is depicted which includes three-dimensional geometry compression and/or decompression capabilities according to one embodiment of the present invention. As shown, the computer system 1080 comprises a system unit 1082 and a video monitor or display device 1084 coupled to the system unit 1082. Various input devices may be connected to the computer system, including a keyboard 1086 and/or a mouse 1088, or other input.

Application software may be executed by the computer system 1080 which generates three-dimensional geometry data describing graphical objects to be rendered on display device 1084. As will be described further below, computer system 1080 is configured to compress the three-dimensional geometry data. The compressed 3D geometry data may then be stored in the memory of computer 1080. The compressed 3D geometry data stored in the memory may then be later transferred over a network or transferred to a 3D graphics accelerator within computer system 1080 for decompression and rendering. Alternatively, the compressed 3D geometry data is used to create a medium, such as a CD-ROM, which may be used for applications such as games. The compression may advantageously result in decreased transmission time of the compressed geometry data over a network or to a graphics accelerator, as well as reduced memory requirements for storing the compressed geometry.

When the computer system 1080 is configured for geometry decompression, the computer 80 receives compressed 3D geometry data This data may be received from a network, the host CPU of computer 1080, or from a memory medium (such as a CD-ROM) coupled to the computer system.

Figure 23:
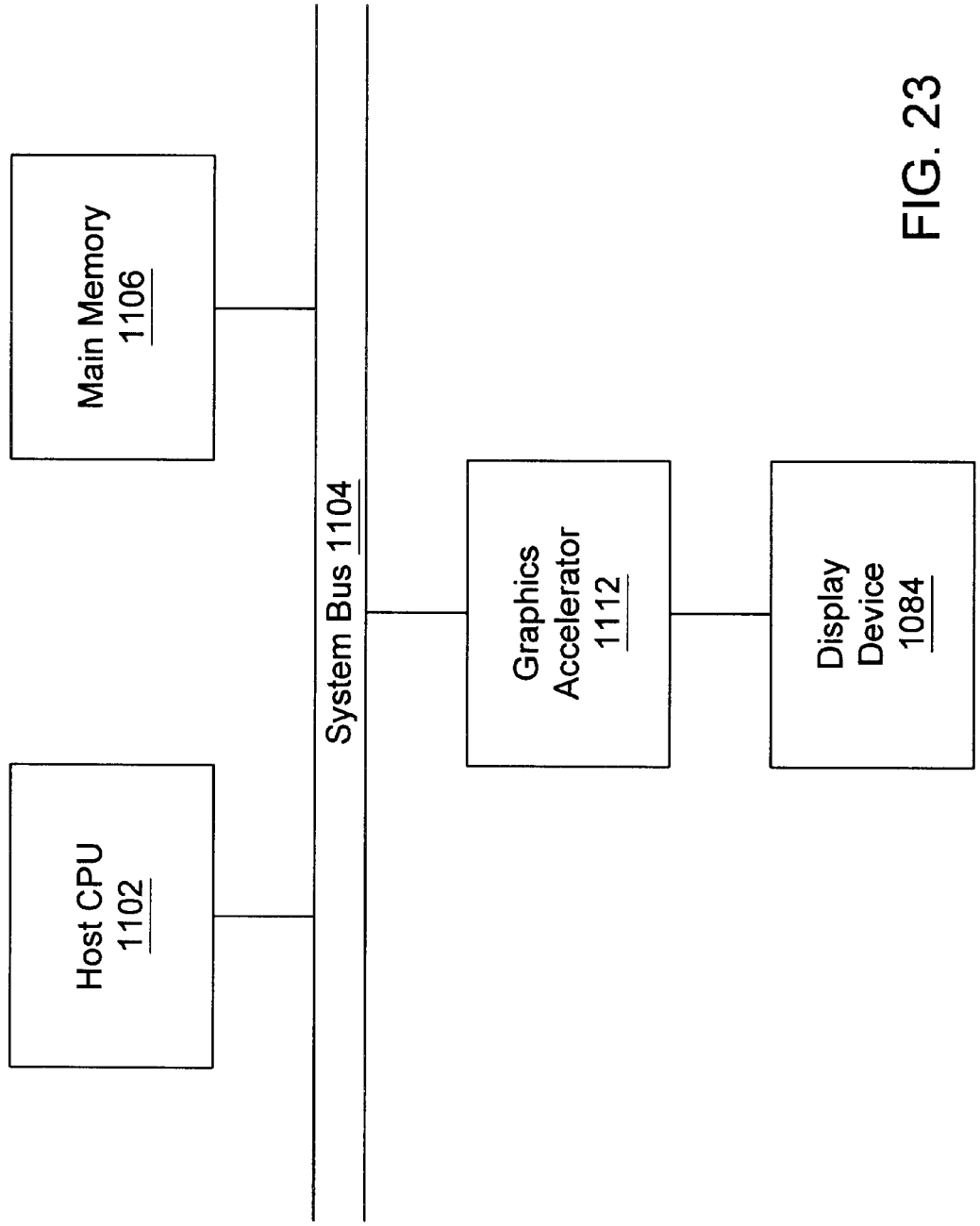
FIG. 23 is a simplified block diagram of the computer system of FIG. 22.

FIG. 23—Computer System Block Diagram

Referring now to FIG. 23, a simplified block diagram illustrating the computer system 1080 of FIG. 22 is shown. Elements of the computer system 1080 which are not necessary for an understanding of the present invention are not shown for convenience. As shown, the computer system 1080 includes a central processing unit (CPU) 1102 coupled to a high speed bus or system bus 1104. A system memory 1106 is also preferably coupled to the high speed bus 1104.

The host processor 1102 may be any of various types of computer processors, multi-processors and CPUs. The system memory 1106 may be any of various types of memory subsystems, including random access memories and mass storage devices. The system bus or host bus 1104 may be any of various types of communication or host computer buses for communication between host processors, CPUs, and memory subsystems, as well as specialized subsystems.

A 3D graphics accelerator 1112 is coupled to the high speed memory bus 1104. The 3D graphics accelerator 1112 may be coupled to the bus 1104 by, for example, a cross bar switch or other bus connectivity logic. It is assumed that various other peripheral devices, or other buses, may be connected to the high speed memory bus 1104, as is well known in the art. Further, the graphics accelerator 1112 may be coupled through one or more other buses to bus 1104.

The host processor 1102 may transfer information to and from the graphics accelerator 1112 according to a programmed input/output (I/O) protocol over the host bus 1104. In one embodiment, the graphics accelerator 1112 accesses the memory subsystem 1106 according to a direct memory access (DMA) protocol, or through intelligent bus mastering.

In one embodiment, three-dimensional geometry data is generated by a graphics application program executing on computer system 1080. The resulting 3D geometry data is compressed prior to or subsequent to storage in system memory 1106. The geometry data may be compressed by host CPU 1102 executing a software compression program from system memory 1106, or transferred to a specialized hardware unit within system unit 1082 for compression. If the computer system 1080 is also being used to render the 3D geometry data the compressed data is transferred from system memory 1106 to graphics accelerator 1112 over system bus 1104.

Graphics accelerator 1112 decompresses the transferred compressed geometry data, rendering the resulting primitives accordingly on display device 1084. The compressed 3D geometry data may also be transferred over a network for subsequent decompression (as discussed with reference to FIG. 24), or stored to a removable medium such as a CD-ROM. It is noted that 3D graphics accelerator 1112 may not be necessary if computer system 1080 is used strictly for compression purposes. This may be the case if computer system 1080 is used to store the compressed data to a memory medium or transfer the data over a network.

As described below, the compression system and method described herein is preferably directed toward compression of surface portions of three-dimensional objects which are regularly tiled. As also described below, the decompression system and method described below operate to decompressed compressed 3D geometry data which has been compressed to take advantage of regular tiling of primitives included in the geometry data. In one embodiment, the compression system and method selectively performs different types or levels of compression on surface portions of 3D geometry data, depending on whether the portion being compressed is regularly or irregularly tiled. Correspondingly, the decompression system and method selectively may perform different types of decompression depending on the particular surface portion being decompressed.

Figure 24:
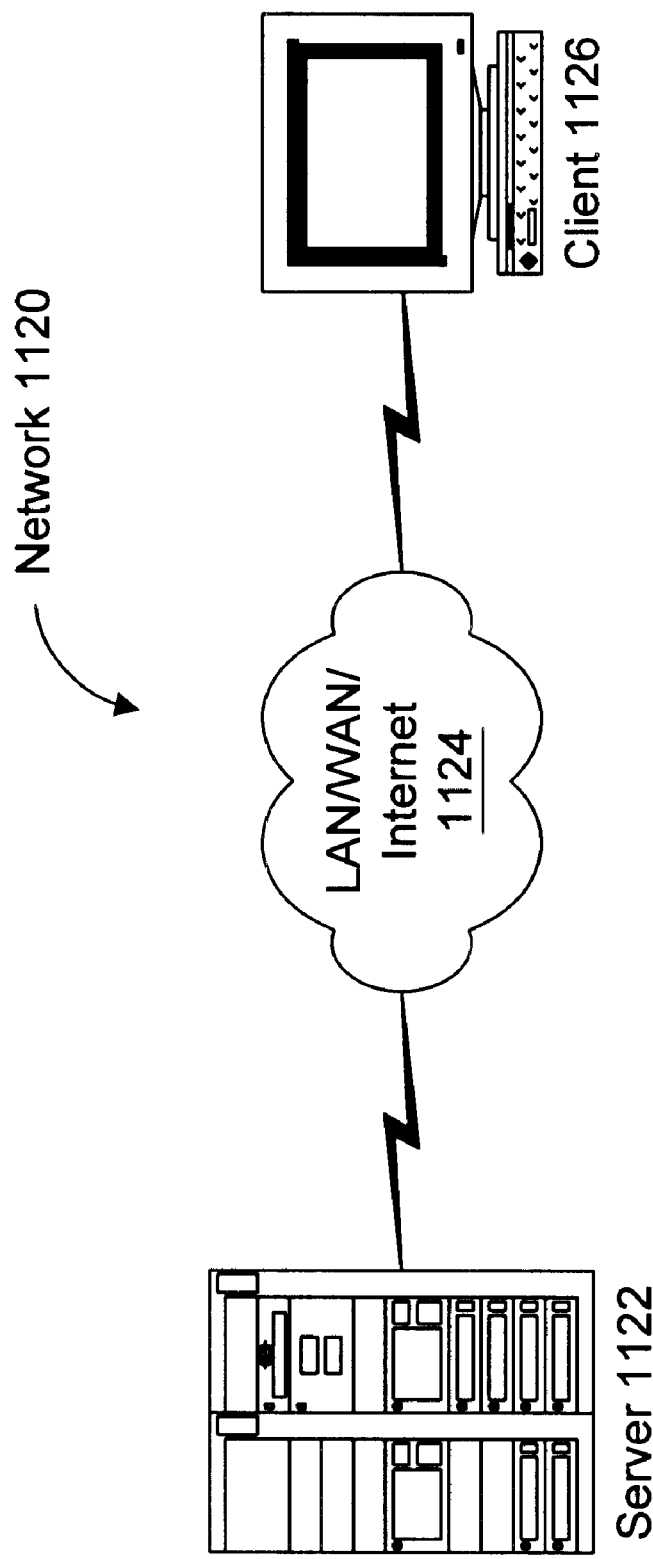
FIG. 24 illustrates one embodiment of a client-server network which transfers compressed geometry data.

FIG. 24—Computer Network

Referring now to FIG. 24, a computer network 1120 is shown comprising at least one server computer 1122 and one or more client computers 1126. (In the embodiment shown in FIG. 24, client computers 1126A-B are depicted). Server 1122 and client(s) 1126 may be joined through a variety of connections 1124, such as a local-area network (LAN), a wide-area network (WAN), or an Internet connection. In one embodiment, server 1122 stores pre-compressed 3D geometry data. Clients 1126A-B may connect to server 1122 to download the compressed geometry. One or more of clients 1126 receive the compressed 3D geometry data and then decompress the compressed geometry data for rendering. Alternately, one or more of clients 1126 may generate 3D geometry data, perform compression, and transfer the compressed geometry to server 1122 for storage. In still another embodiment, the compressed 3D geometry data may be transferred between client computers 1126.

FIGS. 25–33—Geometry Compression of a Regularly Tiled Surface Portion

Figure 25:
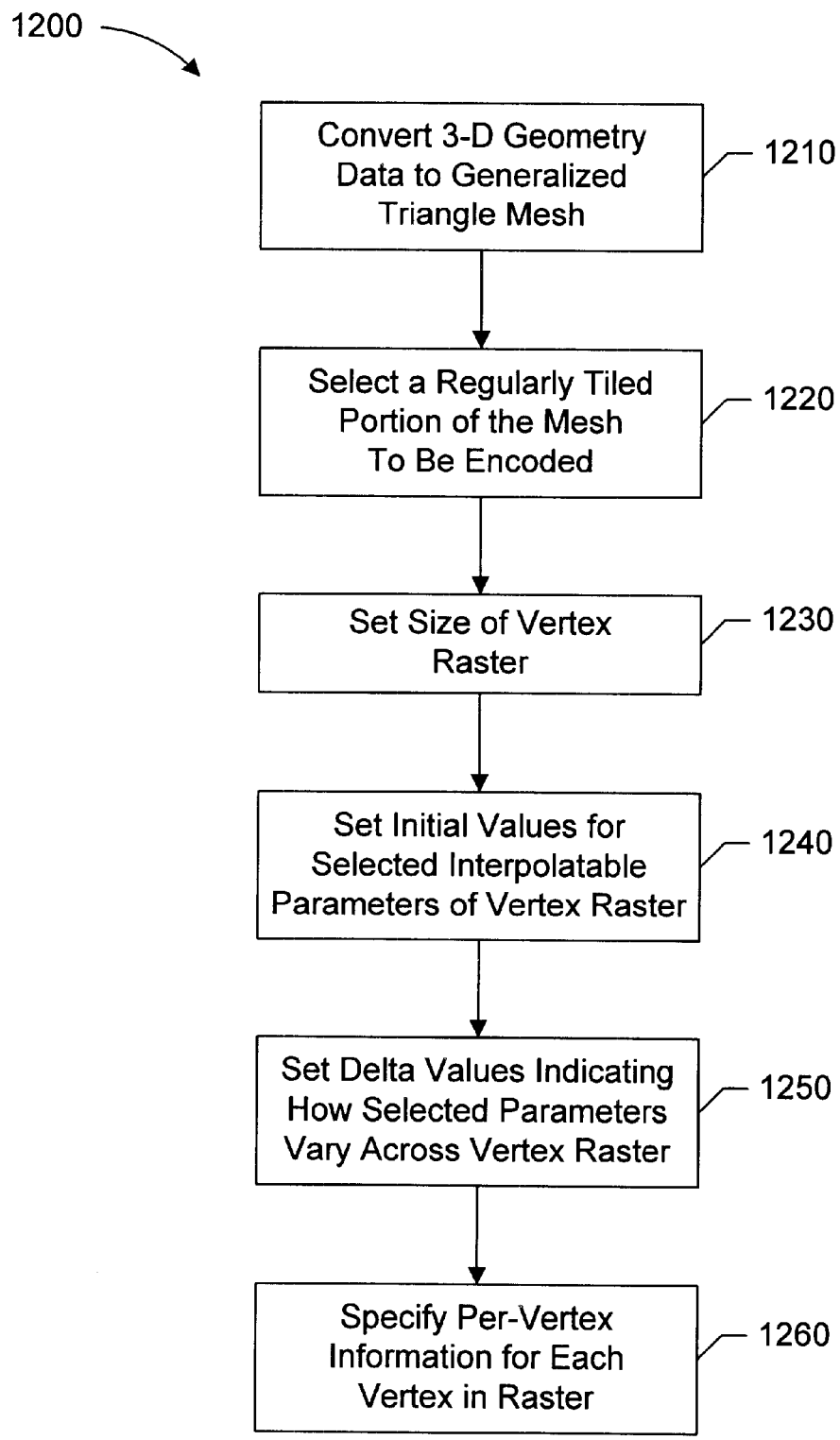
FIG. 25 depicts one embodiment of a method for compressing geometry data.

FIG. 25 illustrates a compression method 1200 for data defining a regularly tiled surface portion of a three-dimensional object. As shown, method 1200 first includes step 1210, in which the three-dimensional geometry data is tiled. In one embodiment, the geometry data may be represented as a generalized triangle strip. In another embodiment, the geometry data may be represented in generalized triangle mesh format. As described in U.S.

patent application Ser. No. 08/511,294, a generalized triangle mesh format encodes position and connectivity of the geometry data, and utilizes space efficiently by allowing vertex information to be reused. One algorithm that may be utilized to generate a generalized triangle mesh representation is described in "Optimized Geometry Compression for Real-time Rendering" by Michael Chow in the proceedings of *IEEE Visualization 97*.

Figure 26:
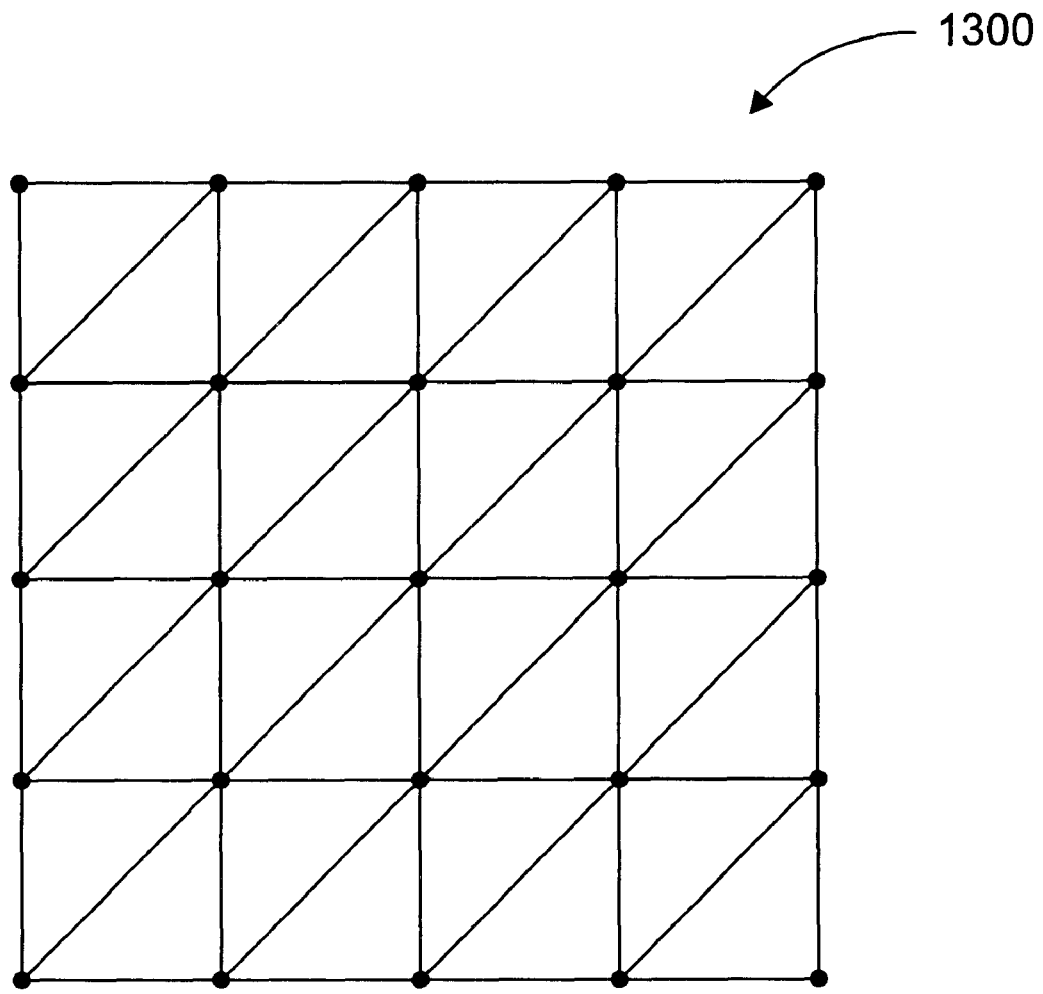
FIG. 26 illustrates a surface portion including a 5×5 grid of vertices which may be represented as a vertex raster.

In step 1220, a regularly tiled surface portion is selected to be represented in compressed format. This compressed format is referred to herein as a "vertex raster". Generally speaking, a vertex raster includes an associated extent and sufficient information to determine one or more vertex parameter values within the specified extent. As will be described below, the extent portion of the vertex raster may specific one of a plurality of predefined sizes or may specify an arbitrary size and shape of the surface portion and the vertices included therein. FIG. 26 depicts a regularly tiled surface portion 1300 which is to be represented as a vertex raster. Although a vertex raster may be of any given extent, the extent of the vertex raster shown in FIG. 26 is a 5×5 square grid of vertices.

In step 1230, the extent of the vertex raster is specified in the encoded data stream. In a preferred embodiment, the extent value of a vertex raster is encoded as a 2-bit value which is indicative of a square grid which is one of three defined sizes: 5×5 (25 vertices), 9×9 (81 vertices), or 17×17 (289 vertices). It is noted that various other predefined sizes may be used instead of, or in addition to, the predefined sizes recited above. For example, a regularly tiled surface portion may be represented as a 3×5 vertex raster in one embodiment.

In one embodiment, specifying an extent for a vertex raster also implicitly defines connectivity information for vertices within the regularly tiled surface portion represented by the vertex raster. Consider surface portion 1300 in FIG. 26. In one embodiment, an extent value for surface portion 1300 specifies that the vertices are to be connected into squares (or, more generally, quadrilaterals or "quads"). Each quad is typically split (or "tessellated") into a pair of triangles which are then encoded in a compressed geometry data stream. It is noted that a given quad may be tessellated in one of two directions: from the lower left corner to the upper right corner or from the upper left corner to the lower right corner. In one embodiment, if no explicit tessellation information is specified on a quad-by-quad basis, all quads are assumed to be split in a default direction (such as the default direction shown for all quads in FIG. 26). As will be described below, explicit connectivity information may also be supplied within a vertex raster.

Furthermore, the vertices of a surface portion do not necessarily have to be grouped as quadrilaterals in order to be represented as a vertex raster. For example, consider a surface portion which is tiled in a hexagonal manner. A vertex raster may be defined for such a surface portion which specifies vertices which are to be assembled into hexagons rather than quads or triangles. Also, a vertex raster may also be defined for an irregularly tiled surface portion which is semi-regular (i.e., irregular in a predictable fashion). For example, small groups of vertices having regular attributes may be present in an irregular pattern, or large groups of vertices may have attributes that generally vary in a regular pattern, but vary irregularly on a vertex-by-vertex basis. In other words, the graphics data may appear regular from a macroscopic point of view, but irregular from a more detailed, microscopic point of view.

In one embodiment, it is noted that adjacent surface portions of a graphical object may each be represented as a vertex raster. In such an embodiment, each surface portion may share vertices along the common edge(s). Accordingly, the vertices in the vertex rasters representing the adjacent surface portions may also each include information on the common vertices.

Figure 27:
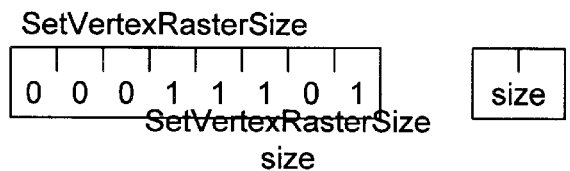
FIG. 27 depicts one embodiment of a command to set the size of a surface portion.

As will be described below, the extent of the vertex raster is used during decompression to determine parameter values for each of the vertices within the surface portion represented by the vertex raster. One embodiment of a format for a "SetVertexRasterSize" command is shown in FIG. 27. Two bits are used in the command to specify one of the three predefined raster sizes. In an alternate embodiment, the vertex raster may be of an arbitrary size. This arbitrary size may be given explicitly, or may be encoded in the per-vertex data stream as "stop codes" which indicate the end of a row or data or of the entire raster.

In addition to specifying an extent of a surface portion, a vertex raster also includes sufficient information to decompress vertex parameter values of vertices within the surface portion represented by the vertex raster. As will be described below, the vertex parameter values of the regularly tiled surface portion may be specified per-vertex (explicitly), by interpolation values, or using a combination thereof. In one embodiment, the vertex parameter values specified within a vertex raster include (i) position values, (ii) color values, (iii) normal values, (iv) texture map coordinates, (v) bump/displacement mapping values, and (vi) surface material properties.

In one embodiment, initial values of selected parameters may be specified within a vertex raster along with an indication of how these values change across the vertex raster. For example, consider a surface portion of a graphical object in which positional coordinates vary in a regular fashion. For such a surface portion, initial position values may be specified which correspond to a predetermined vertex within the surface portion. Then, positional delta values may be specified which indicate how position values change from vertex-to-vertex within the surface portion represented by the vertex raster. Interpolation may also be performed upon other vertex parameter values, such as those listed above. Values encoded in this manner are also referred to as being globally specified values.

Vertex parameter values may also be specified explicitly, on a per-vertex basis. In one such embodiment, a vertex raster may include an extent, an encoding specifying what parameters are included in the vertex raster, followed by a stream of per-vertex data The size of this vertex data is determinable from the extent of the surface portion and the size of the data specified for each vertex. While this technique may not achieve the compression possible using the interpolation values described above, compression still results from not having to explicitly encode connectivity information for the regularly tiled surface portion. Values encoded in this manner are also referred to as being locally specified values.

These two techniques (interpolation and per-vertex data) may also be combined within a single vertex raster. That is, certain vertex parameter values may be specified by interpolation, while others may be specified on a per-vertex basis. For example, a vertex raster representing a given surface portion of a graphical object may include position values which are specified by interpolation and color values which are specified on a per-vertex basis. In yet another embodiment, a given vertex parameter value may be computed using global and local values. One example of this technique is the use of locally specified z-displacement values to perturb globally specified normal values.

In the flowchart of method 1200 shown in FIG. 25, both techniques for specifying vertex data are utilized. Interpolated values are encoded in steps 1240–1250, while per-vertex data is encoded in step 1260. These steps are described in further detail below.

In step 1240, initial values of selected parameters are specified for vertices in the surface portion represented by the vertex raster. These selected parameters correspond to an initial vertex, which is typically in a predefined location within the surface portion. The values of the remaining vertices are interpolated across the raster during the decompression process based on the initial values set in step 1240. Since these parameters are interpolated for each vertex in the surface portion, these parameters do not have to be specified on a per-vertex basis in the compressed data stream, thereby saving memory and bus bandwidth. The initial parameter values are specified, in one embodiment, using a "SetVertexRasterStart" command in a preferred embodiment of the invention. One possible format for this command is shown in FIG. 28.

Figure 28:
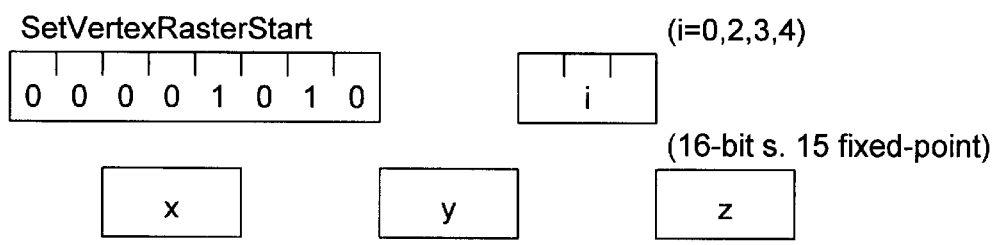
FIG. 28 depicts the format of one embodiment of a command to initialize parameters to be interpolated across the surface portion.
Figure 28:
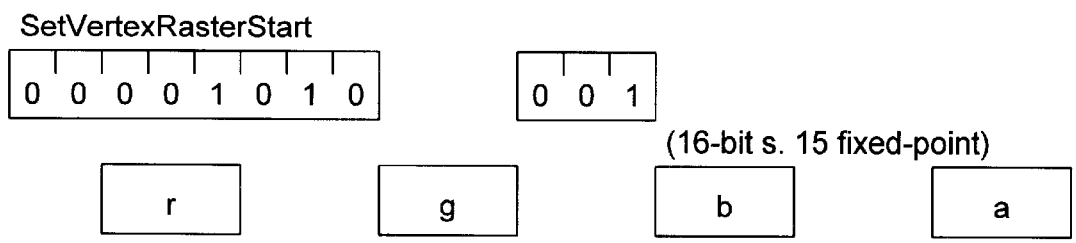

As shown in FIG. 28, the "SetVertexRasterStart" command specifies one of five vector registers (i=0 to 4). Each of these vector registers includes a different interpolatable parameter. The assignment of these vector registers in a preferred embodiment is shown below in Table 6.

TABLE 6

| Vector Register | Parameter |
| --- | --- |
| 0 | Position |
| 1 | Global Color |
| 2 | Global Normal |
| 3 | Bump/Displacement Mapping Basis Vector 0 |
| 4 | Bump/Displacement Mapping Basis Vector 1 |

Vector register 0 (VR0) includes initial position data, and is configured in a preferred embodiment to store 16-bit fixed point values for x, y, and z coordinates. VR1 is configured to store 4 16-bit color values in a preferred embodiment: red, blue, green, and alpha The alpha value is optional depending on the state of a mode bit discussed below. VR2 stores the x-y-z components of a global normal value, while VR3–4 store basis vectors used to assist in bump and displacement mapping. In a different embodiment, the vector registers may be configured differently. For example, a different number or a different size per register may be used. Similarly, other attributes relating to the vertices may be stored in the vector registers in place of or in addition to the parameters shown above. In one embodiment, a vertex raster representation may include zero to five SetVertexRasterStart commands, one for each vector register. In this embodiment, if no vector registers are specified, vertex parameter values are specified on a per-vertex basis.

Figure 29:
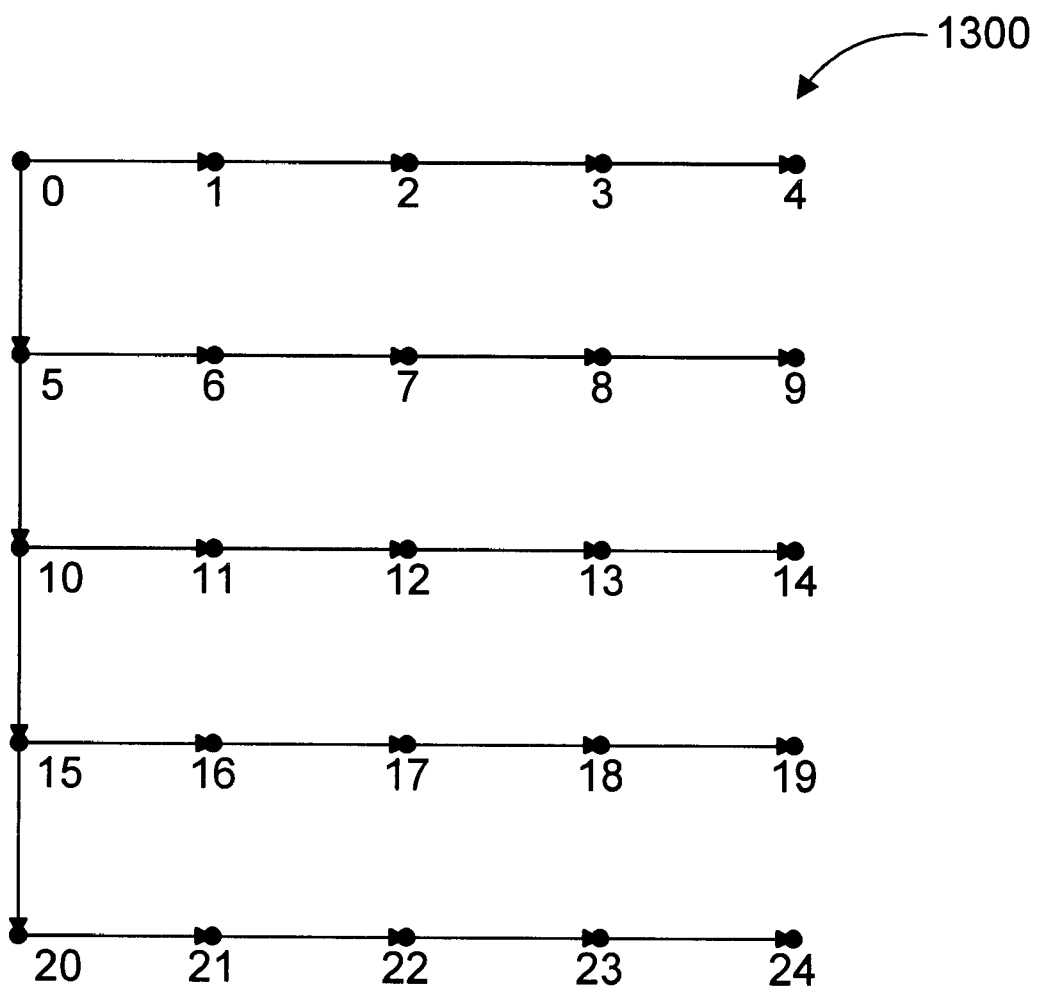
FIG. 29 illustrates one embodiment of a traversal order of the vertices of a surface portion.

In step 1250, delta values are set for the parameters selected in step 1240, indicating how these parameters vary across the surface portion represented by the vertex raster. In a preferred embodiment, these delta values may be specified in both the U and V directions (not to be confused with the names sometimes used for texture mapping coordinates). The U and V directions are shown for one embodiment of a regularly tiled surface portion in FIG. 29. FIG. 29 also depicts the vertices within surface portion 1300 labeled according to the order in which the vertices are processed during decompression (and hence the order in which interpolation is performed). Similarly, the order shown in FIG. 29 also refers to the order in which per-vertex data is stored within the vertex raster representation of surface portion 1300. As shown in FIG. 29, the U direction, in one embodiment, refers to the direction between vertices on a particular row. Conversely, the V direction, in one embodiment, refers to the direction between successive rows.

Figure 30A:
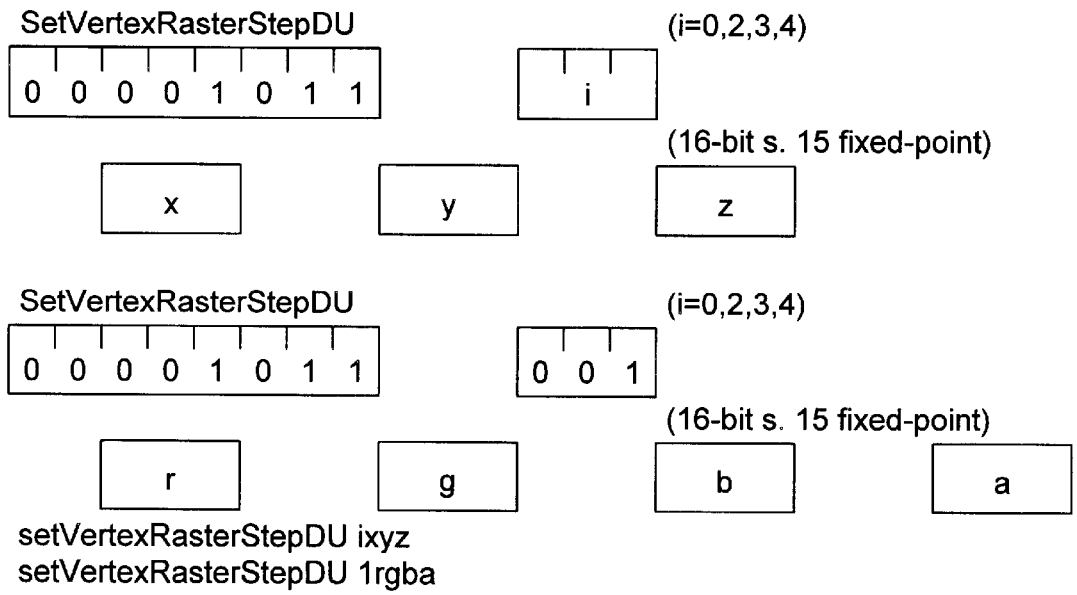
FIGS. 30A–B depict one embodiment of a format for commands to vary parameters to be interpolated across the surface portion.
Figure 30B:
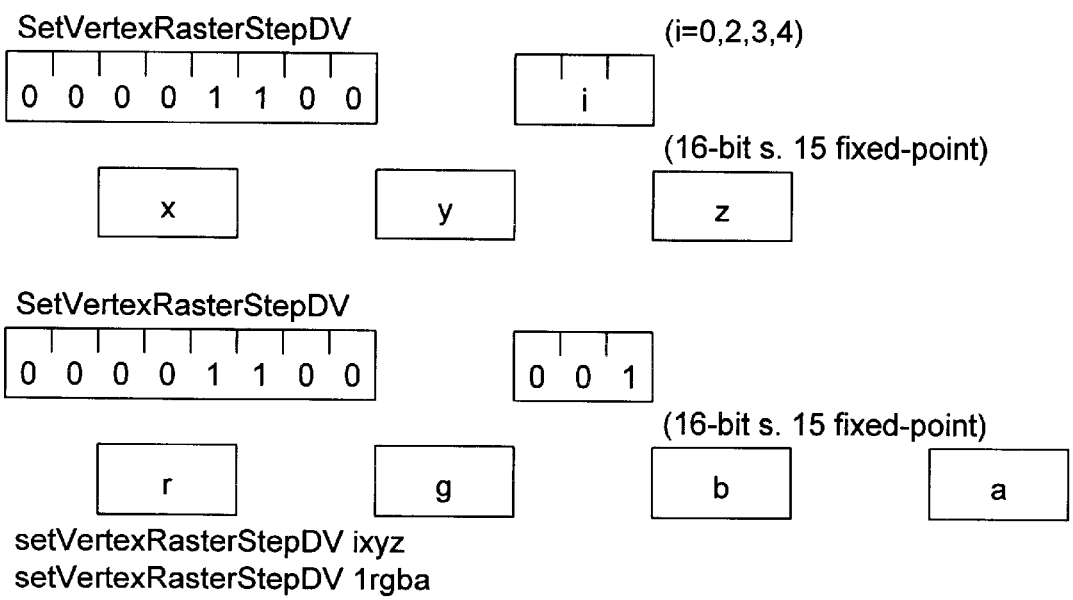
Figure 31A:
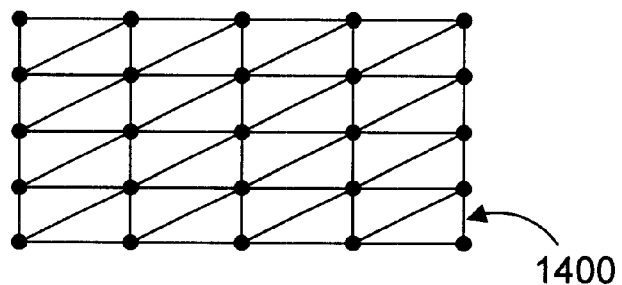
FIGS. 31A–C illustrate surface portions with various delta U and delta V position values.
Figure 31B:
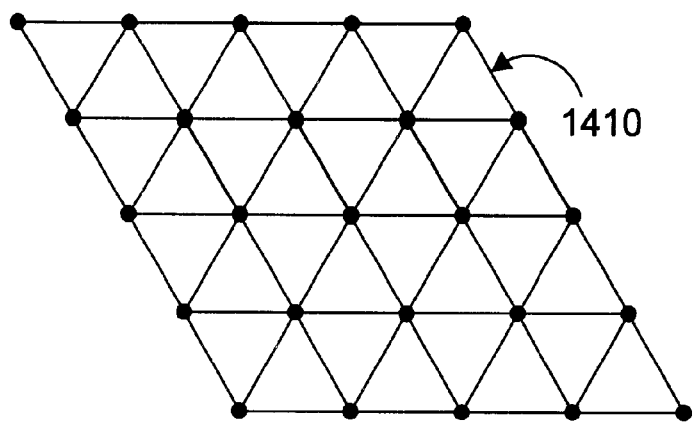
Figure 31C:
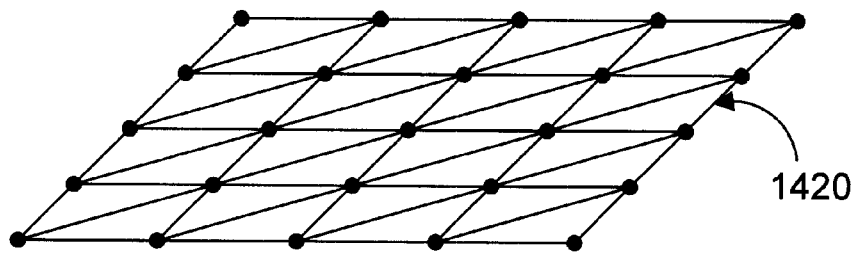

Referring now to FIGS. 30A and 30B, the formats for commands which, in one embodiment, set the delta values for the parameters selected in step 1240 are shown. FIG. 30A depicts the format of the "SetVertexRasterStepDU" command, while the "SetVertexRasterStepDV" command format is depicted in FIG. 30B. The Vertex Raster Delta-U vector registers are configured to store three (four, in the case of VRDU1) fixed point values which indicate the change between each vertex in the raster in the U direction for a particular quantity. For example, the x-y-z values in VRDU0 indicate the position difference ($\Delta x$, $\Delta y$, and $\Delta z$) between any two adjacent vertices in FIG. 29 within the same row. The Vertex Raster Delta-V registers are configured similarly (VRDV0 values specify the position difference between any two adjacent vertices in FIG. 29 within the same column). In one embodiment, these delta registers allow position, global color, global normal, and bump/displacement vectors to be specified once (by the "SetVertexRasterStart" command), with the remaining values for the vertices of the raster interpolated during decompression, thereby reducing the size of the encoded data stream. The values specified by the "SetVertexRasterStep" commands are effectively the derivative of the value represented by VRi (i=0–4) with respect to the U or V planar coordinate.

Note that all of the vector registers are optional with respect to the vertex raster; that is, none, some, or all of them may be set. Even with no values interpolated in the vertex raster, the connectivity information is still inherent in the vertex raster representation. This eliminates the need for mesh buffer push and reference bits which are used explicitly in generalized triangle mesh format. The use of the vector registers VR0–4 is advantageous where applicable, however, since greater compression ratios may be achieved.

Although the vertices of surface portion 1300 are arranged in a square grid, the formats of the vertex raster step commands described above allow specification of surface portions that have vertices arranged in alternate fashions. This is facilitated by having separate step commands for the U and V direction, which both allow changes in each of the x, y, and z coordinates. By appropriate encodings of the SetVertexRasterStepDU and SetVertexRasterStepDV commands, surface portions such as 1400, 1410, and 1420, depicted in FIGS. 31A–C, may be compressed. Surface portion 1400 includes vertices organized as a rectangular grid, while surface portions 14 and 1420 are organized as rhombuses (with no right angles) and parallelograms (with unequal adjacent sides and unequal interior angles), respectively.

In step 1260, optional per-vertex is specified for vertices in the surface portion represented by the vertex raster. In one embodiment, this information is specified using one of the commands shown in FIGS. 32A–C. FIG. 32A depicts the format of an "ExecuteVertexRaster" command according to one embodiment of the invention. This command is followed by a stream of per-vertex data. In one embodiment, the format of the per-vertex data is pre-specified using an additional command described below. In this manner, the end of the stream of per-vertex data may be determined by multiplying the number of vertices by the data size for a given vertex. This allows another geometry command to immediately follow the per-vertex data without necessitating stop bits for the execute command. There area also other techniques which obviate the need for stop bits in the per-vertex data stream One such technique that uses header-body pairs is described in greater detail below. Because the per-vertex data follows in-line with the command, no other opcodes are needed until all data points corresponding to each of the vertices in the raster have been read. In a preferred embodiment, the execute command includes per-vertex data for 25, 81, or 289 vertices.

Alternately, the vertex raster data may be specified starting at a memory address by the "ExecuteVertexRasterIndirect" command shown in FIG. 32B. This allows the same per-vertex data to be used for different rasters while changing the interpolation parameters as described above. Compression efficiency is advantageously increased by use of this command.

The "ExecuteVertexRaster32Indirect" command shown in FIG. 32C is used for vertex rasters with a special memory format: 32-bit RGBα pixels. The vertex raster data starts at the address specified, but after 5, 9, or 17 pixels (depending on the size value), the raster data continues at address+stride, where stride is the width of the raster in bytes. Both the address and stride are 32-bit word-aligned in a preferred embodiment of the invention.

As described above, various vertex parameter values may be specified on a per-vertex basis. In a preferred embodiment, the per-vertex attributes which are specified as part of a given vertex raster is determined by the state of mode bits set by the most recent "SetState" and "SetState2" commands. The format of these commands in one embodiment is shown in FIGS. 33A and 33B. A description of the operand fields of the SetState command is given in Table 7.

TABLE 7

| Bit Field | Description |
| --- | --- |
| dde | Delta-delta encoding enabled for some vertices of vertex raster |
| bnv | bundle normals with per-vertex data |
| bcv | bundle colors with per-vertex data |
| cap | color values include alpha component |
| qsp | quad split tessellation bits included with per-vertex data |

The "dde" bit enables delta-delta encoding and is discussed further below. The "bnv" and "bcv" bits, when set, specify that normals and colors, respectively, are part of the per-vertex data which follows the "ExecuteVertexRaster" command. If the "cap" bit is set, the per-vertex color values include an alpha value in addition to RGB components. Finally, if the "qsp" bit is set, a tessellation bit is specified for each quadrilateral in the vertex raster. These separate tessellation bits are used for anti-aliasing purposes and are discussed further below.

A description of bit fields in the SetState2 command is given in Table 8 below.

TABLE 8

| Bit Field | Description |
| --- | --- |
| scp | Specular color present in per-vertex data |
| tex | Interpret specular color as texture map coordinate |
| tx2 | Interpret specular color as second texture map coordinate |

TABLE 8-continued

| Bit Field | Description |
| --- | --- |
| psrc | Position source:<br>00-xyz positions in per-vertex data; VR0 not used<br>01-xyz positions not in per-vertex data; VR0 used<br>10-xyz positions not in per-vertex data; VR0 used; z-displacement in per-vertex data<br>11-reserved |
| vr1 | Enable output of VR1 values |
| vr2 | Enable output of VR2 values |
| vr3 | Enable output of VR3 values |
| vr4 | Enable output of VR4 values |

The SetState2 command is an extension of the mode bits set by the SetState command described above. The "scp" bit indicates that specular color values are present in the per-vertex information. This specular color values is interpreted as a texture map coordinate if the "tex" bit is set. Likewise, the local color value (controlled by the "bcv" bit) is interpreted as a coordinate from an alternate texture map if the "tx2" bit is set.

The "psrc"0 bits determine how the vertex positions are computed between successive vertices in the surface portion being represented as a vertex raster. If psrc=00, the xyz positions are explicitly specified for each vertex in the surface portion (even if VR0 has been initialized). Although this does not take full advantage of the vertex raster symmetry, the connectivity information is still implicitly defined by the raster. Hence, there is no need for the explicit mesh buffer pushes and references that are used in a generalized triangle mesh with no vertex raster command.

If psrc=01, the initial value for the xyz position data is interpolated across the vertices of the vertex raster according to the predefined U and V delta values. Referring again to FIG. 29, the initial position values (as specified by the SetVertexRasterStart command) are applied to vertex 0. The delta U value is then applied to vertex 0 to obtain the position data for vertex 1. The same procedure is followed for vertices 2, 3, and 4. To determine the position of vertex 5, the delta V value is applied to vertex 0. The delta U is then applied to vertex 5 to calculate vertex 6 (and subsequently, vertices 7, 8, and 9). In this mode, greater compression efficiency may be achieved relative to psrc setting '00', in which position data is explicitly specified for every vertex.

When psrc=10, xyz positions are interpolated from VR0 as described above. Additionally, z displacement values are present in the per-vertex data. The z displacement values are used to perform displacement texturing, in which the surface is offset by a small amount in order to simulate a wrinkle or a bump. In many cases, this is more effective than bump mapping (in which the surface normal is perturbed), particularly near the silhouette of a shaded object. The psrc=11 encoding is not currently used in a preferred embodiment of the invention.

Bit fields vr1, vr2, vr3, and vr4 in the SetState2 command are used by the decompression unit to determine if the various vector register quantities are enabled for a particular raster. If a bit is not sent for a particular quantity, the decompression unit does not forward on a value for that quantity (e.g., a local normal) to a subsequent stage of the rendering hardware. In one embodiment, the vr state bits correspond to those attributes which are initialized by the SetVertexRasterStart command.

In alternate embodiments, additional state bits are employed which specify additional data to be included in the per-vertex data of the raster. It is further noted that the per-vertex data of the raster may be encoded in a variety of manners, including the compression techniques disclosed in the parent patent application for positions, colors, and normals.

Figure 35:
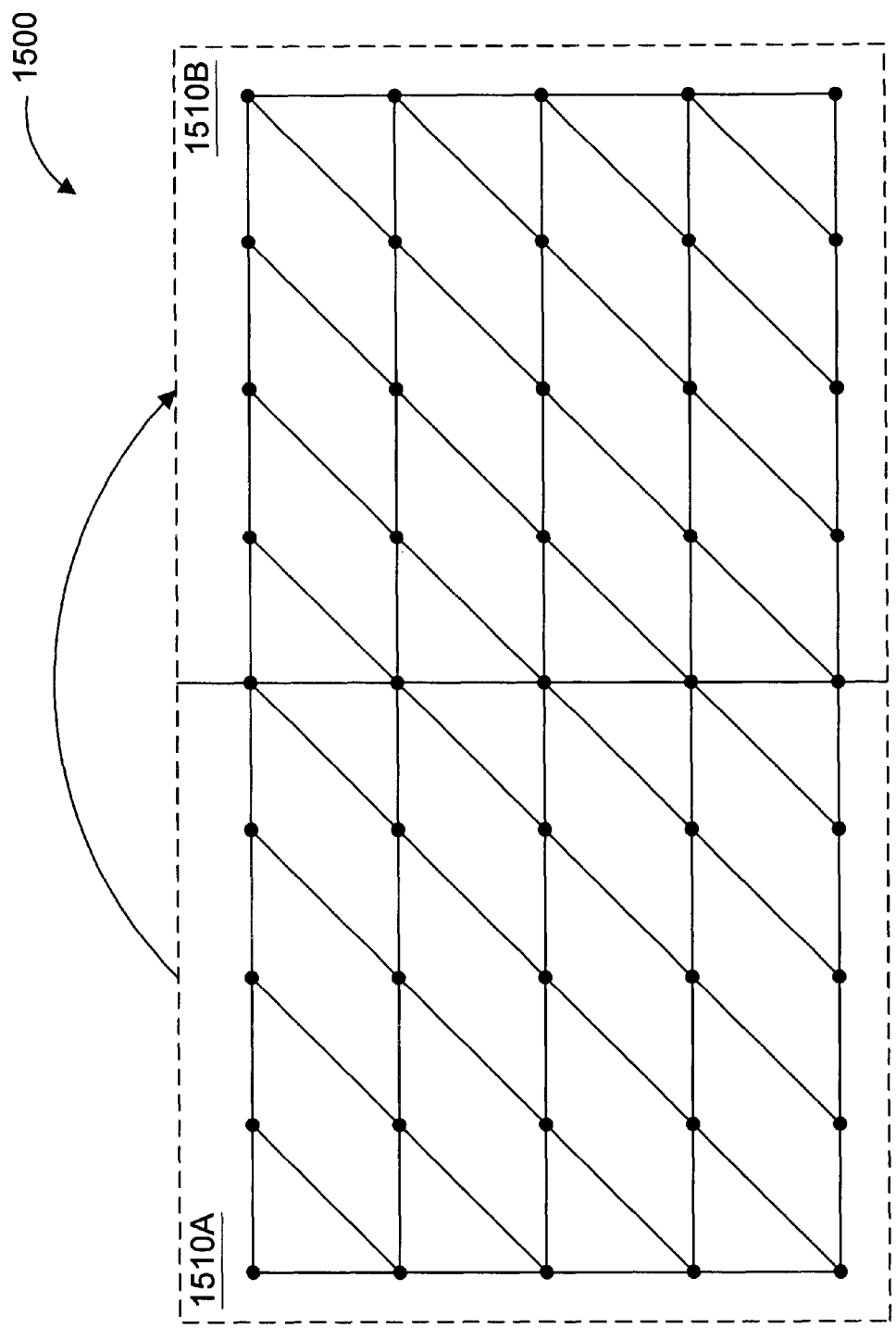
FIG. 35 illustrates a regularly tiled surface portion which may be compressed using the step vertex raster command.
Figure 36:
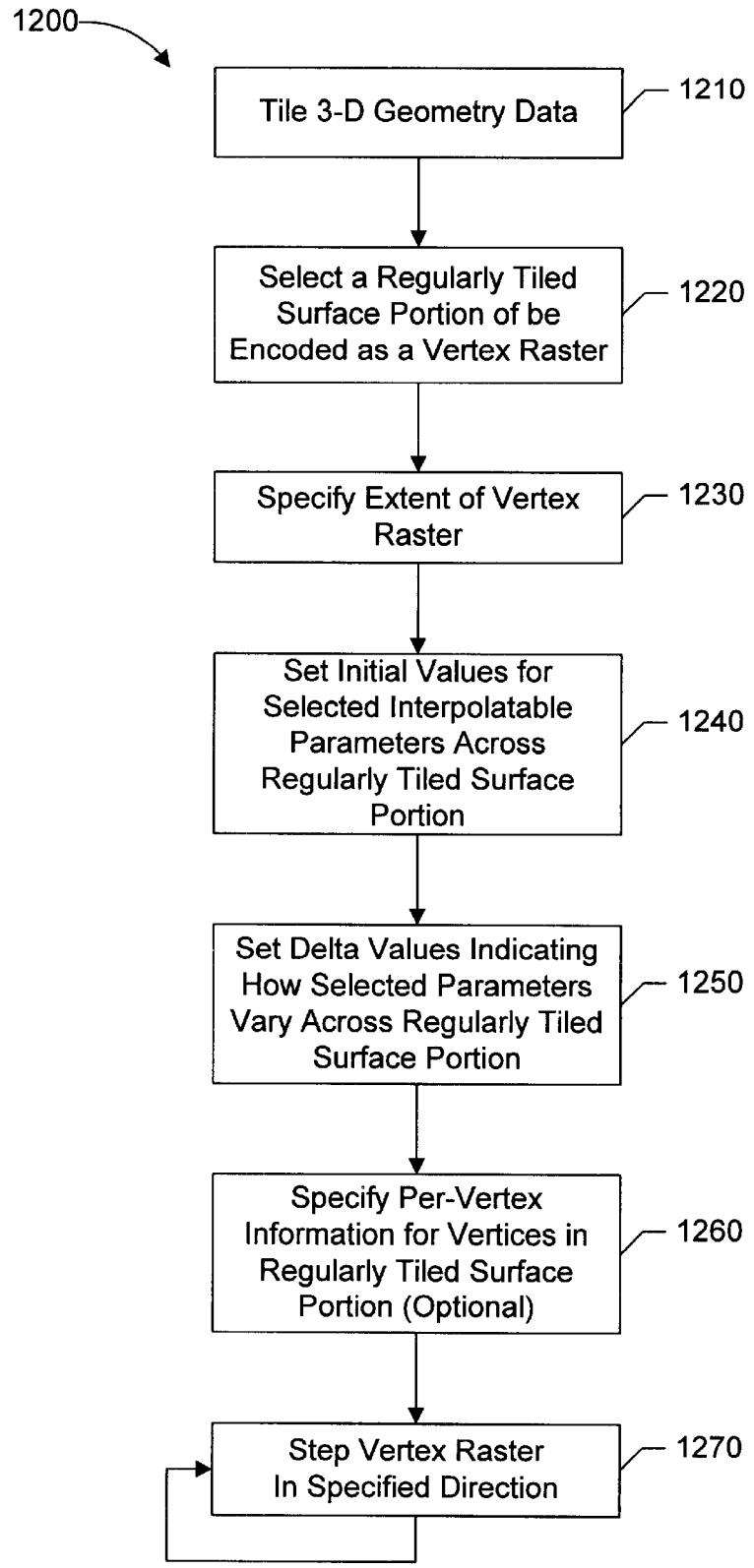
FIG. 36 depicts one embodiment of a method for compressing geometry data using the step vertex raster command.

FIGS. 34–36—StepVertexRaster Command

As described above, vertex rasters may be defined to represent regularly tiled surface portions having vertices arranged in square grids that are one of three predetermined sizes: 5×5, 9×9, and 17×17. The grids are limited to these sizes in a preferred embodiment in order to simplify the decompression hardware. As a result, however, an entire regularly tiled surface portion may not be able to be represented by a single vertex raster structure in some instances. In these cases compression efficiency would be compromised if all the vertex raster data had to be re-specified.

In order to circumvent this limitation while still maintaining a manageable vertex raster size, a "StepVertexRaster" command may be used. One possible format for this command is shown in FIG. 34, but other formats are possible. The stepVertexRaster command takes a single argument, "dir". In this embodiment, the three bit field encodes one of three possible directions in which to move the current vertex raster. A sample of one possible method for encoding the dir field is shown in Table 9 below:

TABLE 9

| Bit Field | Direction |
|---|---|
| 000 | +U |
| 001 | +U, +V |
| 010 | +V |

It is noted that eight directions may be encoded using the three-bit field. For example, in some embodiments the encoding of the dir field may be expanded to represent additional directions to move the current raster (e.g., +U, −U, +V, −V, etc.).

An example of a use for the StepVertexRaster command is illustrated in FIG. 35. FIG. 35 depicts a 9×5 regularly tiled surface portion 1500 of a three-dimensional object. In a preferred embodiment as described above, this size surface portion is not able to be represented as a single vertex raster. In one embodiment, surface portion 1500 may be divided into two 5×5 surface portions 1510A–B and efficiently compressed using a combination of the method described with reference to FIG. 25 and the StepVertexRaster command of FIG. 34. A method 1600 for compressing surface portion 1500 is shown in FIG. 36.

As shown, method 1600 proceeds according to method 1200 described above. Surface portion 1500 is tiled and selected to be encoded a vertex raster in steps 1210 and 1220. In step 1230, the extent of the first vertex raster (1510A) is set as a 5×5 square grid. Next, initial values are set up in the VR registers for the vertex 0 of raster 1510A in step 1240. In step 1250, delta U and delta V values are stored specifying how the parameters initialized in step 1240 vary across the raster. In step 1260, an execute vertex raster command is issued, followed by optional per-vertex data for the raster.

After vertex raster 1510A is specified by steps 1210–1260, a StepVertexRaster command is issued in step 1270. In the example shown in FIG. 35, vertex raster 1510B is the next to be encoded. With respect to vertex raster 1510A, raster 1510B is located in the +U direction. The StepVertexRaster command in step 1270 therefore includes a dir bit field value of '000' in a preferred embodiment.

In one embodiment, execution of the StepVertexRaster command causes the values of the active vector registers to be interpolated in the direction specified by the 'dir' value. In the example above, the delta U values are multiplied by 4 and added to the initial active VR values to obtain the initial values for raster 1510B. No change is calculated in the V direction. Furthermore, the stepVertexRaster command causes the per-vertex data specified by the previous vertex raster command to be re-executed with respect to the new values in the VR registers.

As shown in FIG. 36, step 1270 may be repeatedly executed. Upon execution of each step command, new values are calculated for the VR registers. These new values are then used as a basis for interpolation across vertices of the newly-specified surface portion. Upon issuance of yet another step command, the most recently calculated VR register starting values are used as a basis for calculating new VR register starting values.

Because interpolation values do not have to be redundantly specified for raster 1510B, the compression efficiency is advantageously increased for surface portion 1500. In a different embodiment, the command(s) to step the vertex raster may be supplied by additional data in the per-vertex information or as additional operands to the execute raster command. The specification of a step function for vertex rasters effectively allows compression of the compressed geometry data, advantageously reducing the amount of data encoding.

Figure 37A:
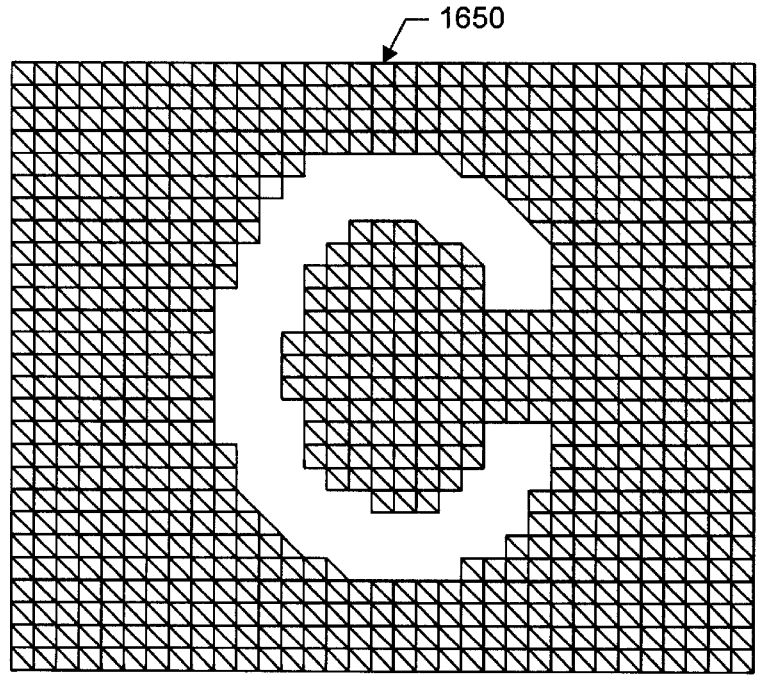
FIG. 37A depicts aliasing effects caused by splitting surface portion quadrilaterals in only one direction.
Figure 37B:
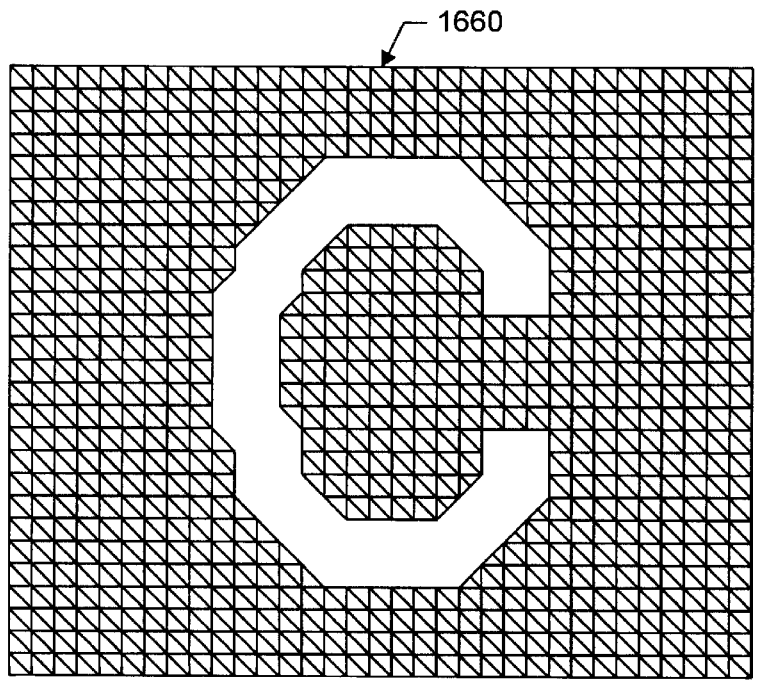
FIG. 37B depicts reduced aliasing effects exhibited by one embodiment of the present invention which allows designation of split direction on a per-quadrilateral basis.
Figures 38, 39:
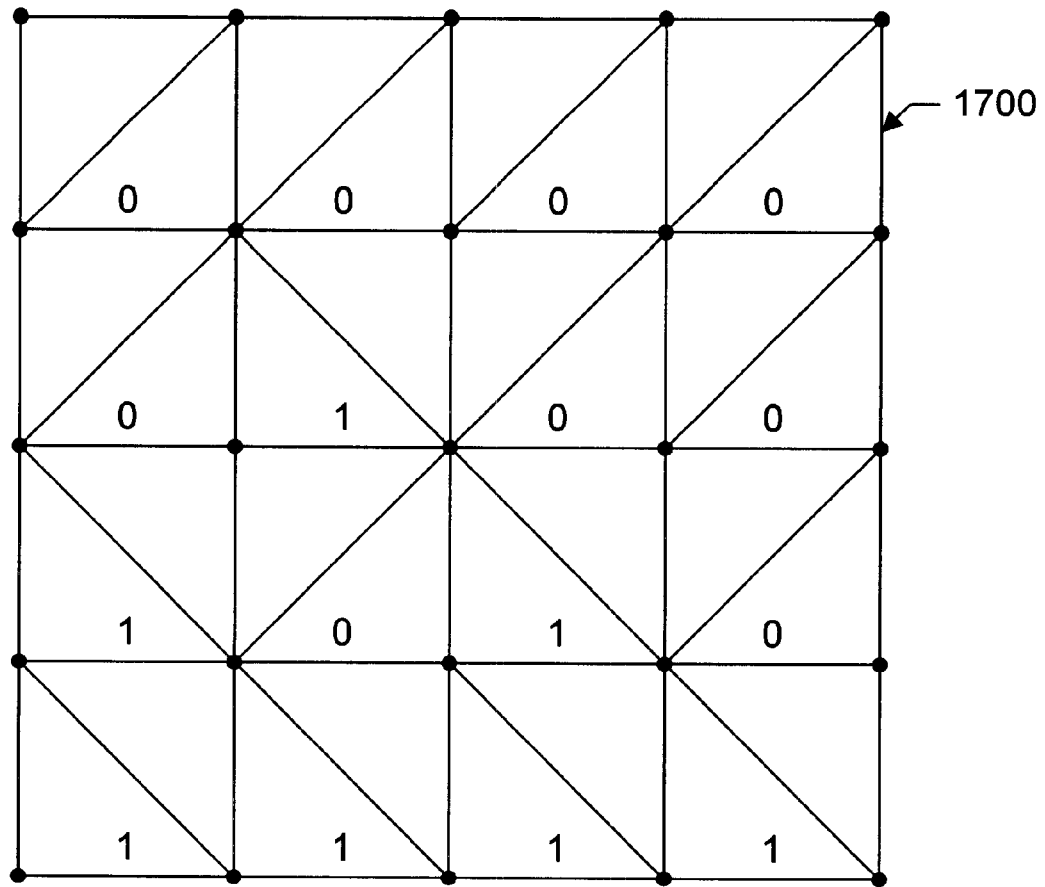
FIG. 38 illustrates a surface portion tessellated with quad split bits according to one embodiment of the present invention.
FIG. 39 depicts the format of a set edge half resolution command according to one embodiment of the invention.

FIGS. 37–38—Quad Split Tesssellation

In the surface portions depicted above, the quadrilaterals formed by the intersection of row and column lines are shown as all being tessellated in the same (default) direction. Regardless of which direction is chosen as a default, undesirable visual artifacts may result. Consider the representation of the letter "C" 1650 shown in FIG. 37A. For letter 1650, each quad in the surface portion is tessellated in the same direction (upper left to lower right corner). This results in portions of letter 1650 having jagged edges.

In contrast, the representation of the letter "C" 1660 is formed using selective splitting of quadrilaterals. That is, each quadrilateral in the surface portion of FIG. 37B is split in a manner most befitting the object being drawn. Accordingly, letter 1660 has a reduced degree of "jagginess" with respect to letter 1650.

Objects may thus exhibit serrated edges if the split direction does not match the strongest color change within a given quadrilateral. Quad tessellation direction may be specified using values in the encoded data stream, or, alternatively, through the use of a quad split difference function calculated dynamically during decompression. The use of either method advantageously results in fewer artifacts in the final rendered image.

The qsp field of the SetState command is set in order to enable explicit specification of quad tessellation in the vertex raster. That is, when the qsp field is set, the per-vertex data stream following the ExecuteVertexRaster command includes a bit value for each quadrilateral, indicating the split direction. An example of tessellation performed on a per-quadrilateral basis is shown in FIG. 38.

Referring now to FIG. 38, surface portion 1700 includes a 5×5 grid of vertices divided into 16 quadrilaterals. Each of the quadrilaterals is labeled by its corresponding split bit. Quadrilaterals labeled with a '0' (the default direction) are split from the lower left corner to the upper right, while quadrilaterals labeled with a '1' are split from the upper left to lower right corners.

In a preferred embodiment, when the qsp bit is not set by the SetState command, a difference function may be used to automatically determine the quad split direction during rendering. In one embodiment, this difference function is given by the following equation:

$$diff(A, B) = \left| \frac{(r_A - r_B)}{2} + (g_A - g_B) + \frac{(b_A - b_B)}{4} \right|.$$

This equation may be applied to opposing vertices within a given quadrilateral in order to determine which pair has the "strongest" color change. Using this technique requires no additional data to be transferred during encoding since the split bit is calculated as a function of the color values (which are sent anyway). Compression efficiency is advantageously increased. It is noted, however, that while this technique is appropriate for color determination, it may be incorrect for lighting computations. That is, the split direction may produce a "smoother" color flow, but may produce a less realistic lighting effect. For this reason, in an alternate embodiment, the correct split direction may be determined after lighting.

As an example of the use of the difference function, consider a 5×5 mesh with vertices 0 to 24. A particular quadrilateral is denoted by vertex n, where n is the upper right vertex in the quadrilateral (hence n may take the values 6–9, 11–14, 16–19, and 21–24). The difference equation may thus be applied to pairs (n−6, n) and (n−5, n-1). If the (n-5, n-1) pair has the greater difference function, the quadrilateral is split in the default tessellation direction (lower left vertex to upper right). Alternatively, the quadrilateral is split from the upper left to lower right vertex if the (n−6, n) pair has the greater difference function. It is noted that the above equation is an approximation of red-green-blue to black and white color space conversion.

It is noted that in a different embodiment, an alternative difference function ay be used. Similarly, encodings of split direction may also differ in other embodiments. It is further noted that the automatic split determination may be enabled/disabled through the use of a mode bit in one embodiment.

Figure 40A:
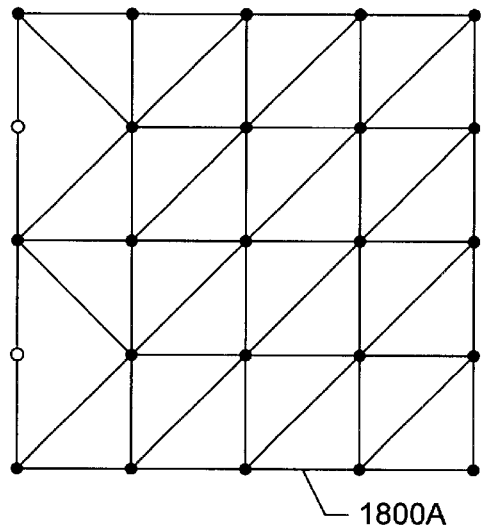
FIGS. 40A–D depict surface portions with each of the half-rez edge bits set.
Figure 40B:
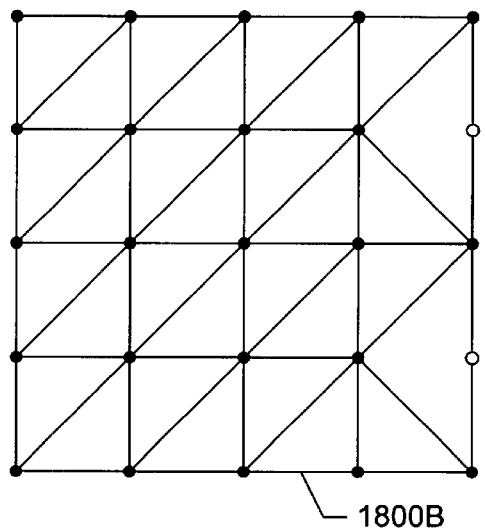
Figure 40C:
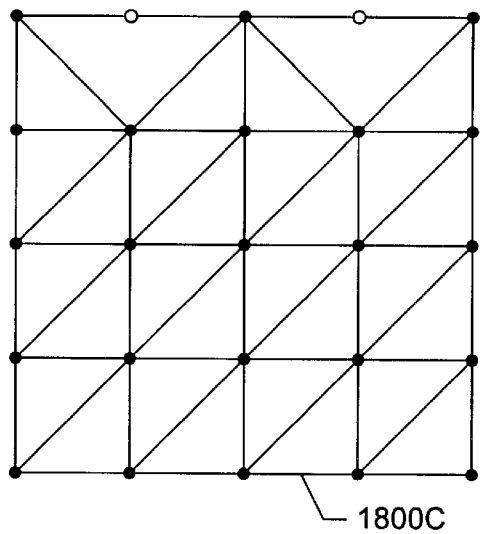
Figure 40D:
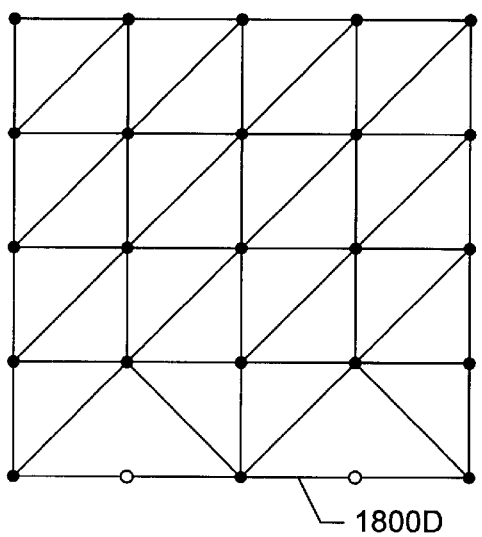
Figure 41:
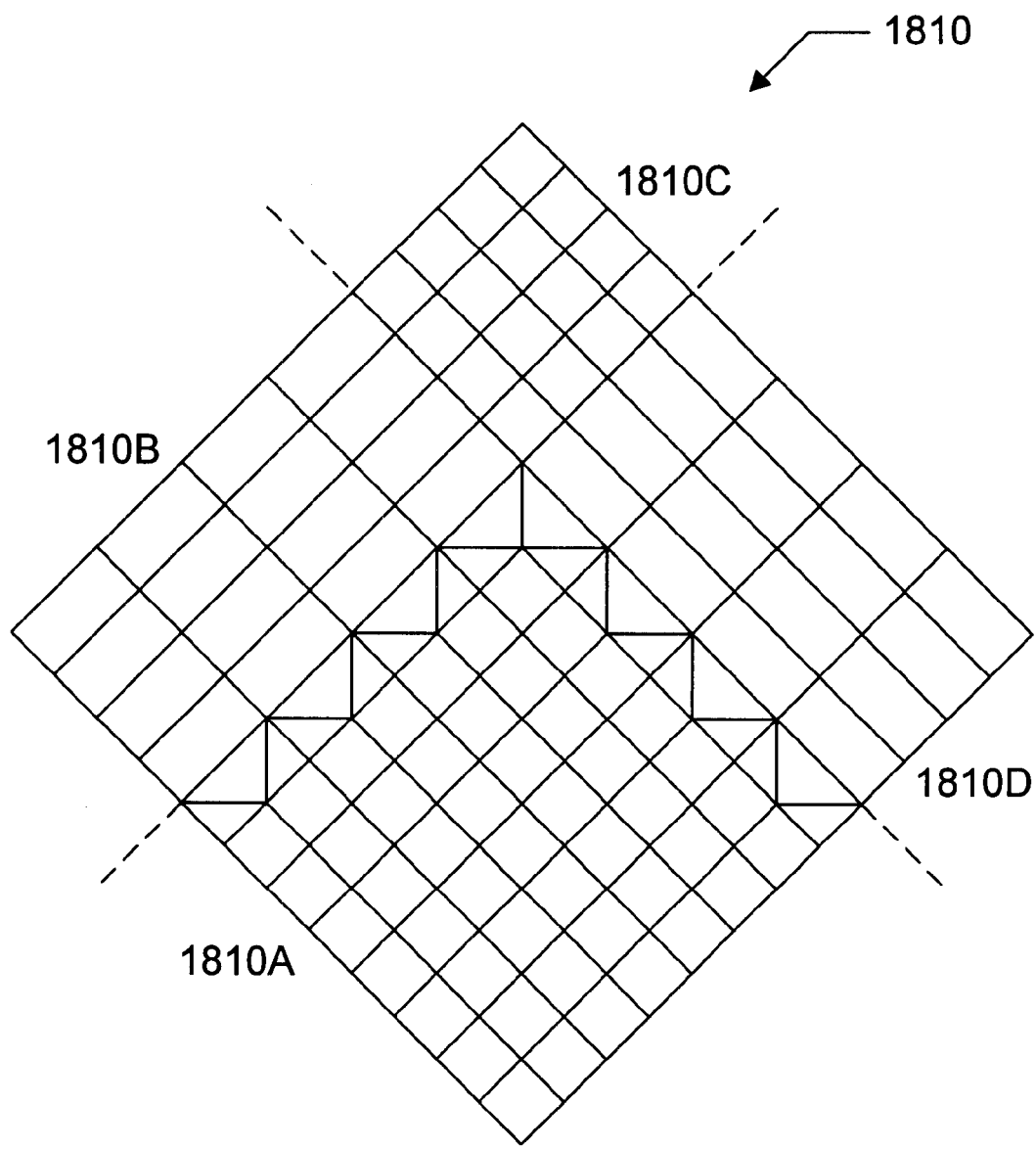
FIG. 41 depicts a surface portion that utilizes half-rez mode in order to reduce aliasing effects for a given object.

FIGS. 39–41—Half-resolution Mode

One common artifact in 3D graphics is when an object in the background of a scene (represented in low resolution) moves to the foreground of a scene (into high resolution). Typically this transition from low to high resolution occurs as a heavyweight switch, resulting in an unappealing (and unrealistic) visual effect. One solution to this problem is to represent the edge (or edges) of a surface portion of an object in an intermediate resolution during the transition from low to high resolution. This representation is referred to as "half-resolution", or "half-rez", mode. The use of this mode is described below as it relates to vertex rasters, although half-rez mode is also applicable to generalized triangle mesh formats.

Referring now to FIG. 39, the format of the "SetEdge-HalfRez" command is shown. As depicted, the command includes four one-bit operands (el, et, er, and eb), which may be used to independently set half-rez mode for each of the four sides of the current vertex raster. (Note that when half-rez mode is used without vertex raster mode, only the top and bottom bits are applicable in one embodiment).

FIGS. 40A–D illustrate surface portions with each of the four bits turned on. For example, surface portion 1800A shown in FIG. 40A has the "el" (left edge) bit turned on. Surface portions 1800B–D shown in FIGS. 40B–D have the "er", "et", "eb" bits set respectively. Note that any combination of the four bits may be set (that is, a surface portion may have more than one edge represented in half-rez mode).

The use of half-rez mode allows more realistic visual effects. As an object moves from low-resolution to high-resolution (or vice-versa), surface portions may be intermediately represented as half-resolution. In this manner, a "patch" may adapt its tessellation to what is needed in the area.

An example of half-rez mode is given by surface portion 1810 in FIG. 41. As shown, surface portion 1810 includes sub-portions 1810A–D. Sub-portion 1810A, being closest to the viewer, is represented as a 9×9 square grid of vertices, while sub-portions 1810B–D (which are farther away) are represented as 5×5 arrays of vertices. In order to lessen the abruptness of the resolution change between surface sub-portions 1810, two edges of sub-portion 1810A are represented in half-rez mode.

Figure 42:
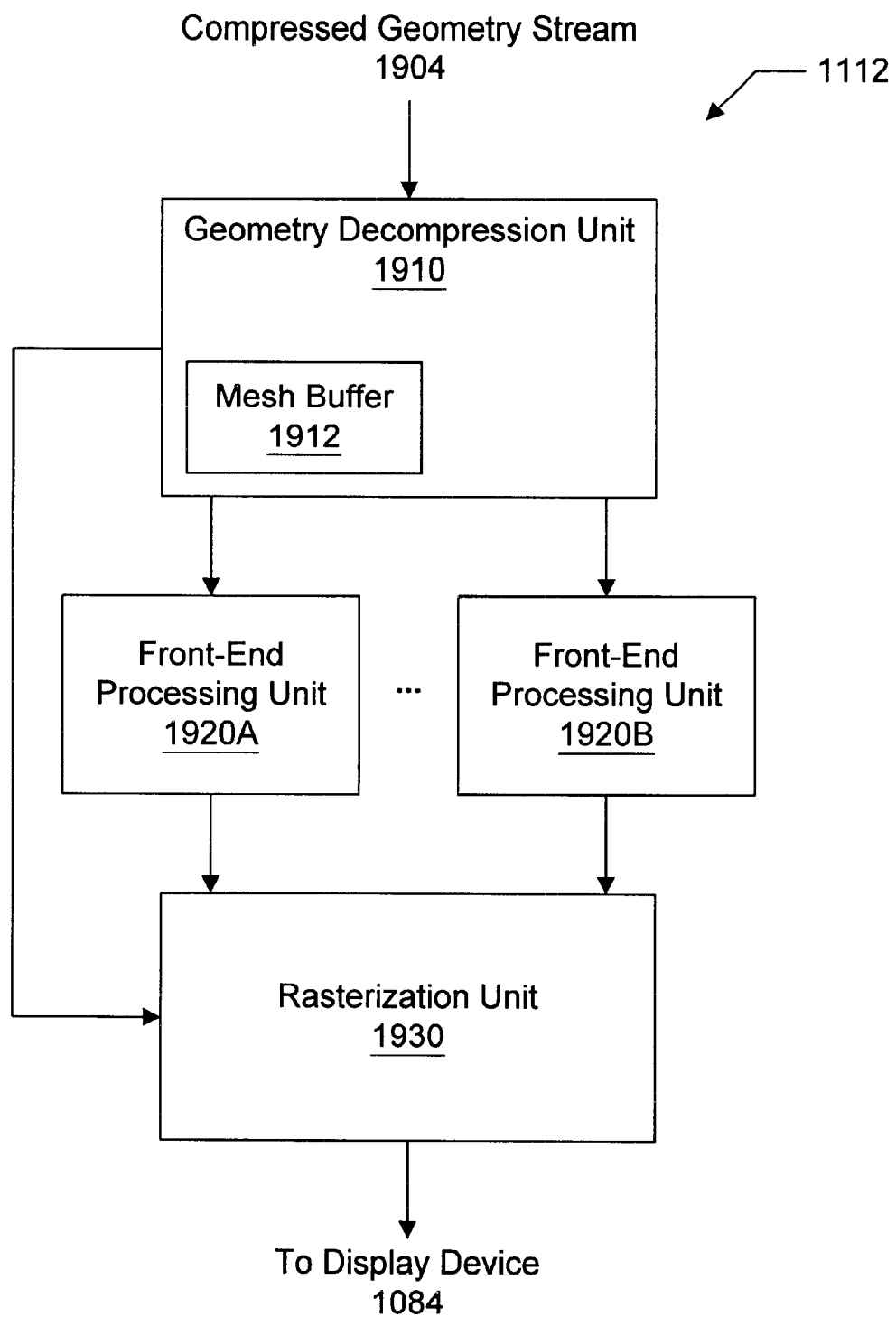
FIG. 42 depicts a block diagram of one embodiment of a graphics sub-system.

FIG. 42—Decompression Hardware

A block diagram of one embodiment of graphics accelerator 1112 depicted in FIG. 23 is shown with reference to FIG. 42. As shown, graphics accelerator 1112 receives a compressed geometry stream 1904. Stream 1904 may be conveyed from main memory via a system bus, or from a separate computer system via a network. Compressed geometry stream 1904 may include 3D geometry data compressed using a variety of different techniques, such as those disclosed herein and in the Applicant's parent patent application. Compressed geometry stream 904 may also include uncompressed 3D geometry data. Both the compressed and uncompressed geometry data describes vertices (and associated attributes) which are usable for assembling into drawing primitives (typically triangles) which may then be rendered by a graphics pipeline. Stream 904 also typically includes control information for the corresponding data The data in geometry stream 1904 is conveyed to a geometry decompression unit (GDU) 1910. In one embodiment, GDU 1910 receives stream 1904, compresses any compressed geometry data, and assembles a plurality of drawing primitives using connectivity information specified in stream 1904. As will described below, GDU 1910 includes a mesh buffer 1912, which is usable for decompression of geometry data represented in vertex raster or generalized triangle mesh format. The primitives assembled by GDU 1910 are then conveyed to one or more front-end processing units 1920. Although two units (1920A–B) are shown in FIG. 42 for simplicity, graphics accelerator 1112 may include other configurations in alternative embodiments.

In one embodiment, mesh buffer 1912 includes a fixed number of storage locations usable for storing parameter values associated with one or more vertices. In this manner, vertices (and corresponding parameters values) which are used in forming multiple primitives may be pushed into mesh buffer 1912 upon first use. When later needed, these values may be accessed from mesh buffer 1912 which avoids the need to re-specify these vertices in compressed stream 1904. In one embodiment, mesh buffer 1912 is organized as a stack, and is accessed by providing an offset into the stack.

Generally speaking, front-end processing units 1920 are responsible for transforming vertices from a model space coordinate system (typically defined by the graphics program which generated the geometry data) to a coordinate system specified by the display device. This series of steps, commonly referred to as the front-end of the graphics pipeline, includes such operations as modeling transformation, perspective division, clipping, trivial rejection of primitives, and screen space transformation. The drawing primitives generated by processing units 1920 are represented in a coordinate system (screen or device space) which may easily be drawn by rasterization unit 1930.

In one embodiment, rasterization unit 1930 receives drawing primitives represented in device space coordinates.

Rasterization unit 1930 then renders these primitives on display device 1084 using processes such as edge interpolation, span interpolation, and texture mapping. Unit 1930 may optionally include a z-buffer unit for performing hidden surface removal.

Figure 43:
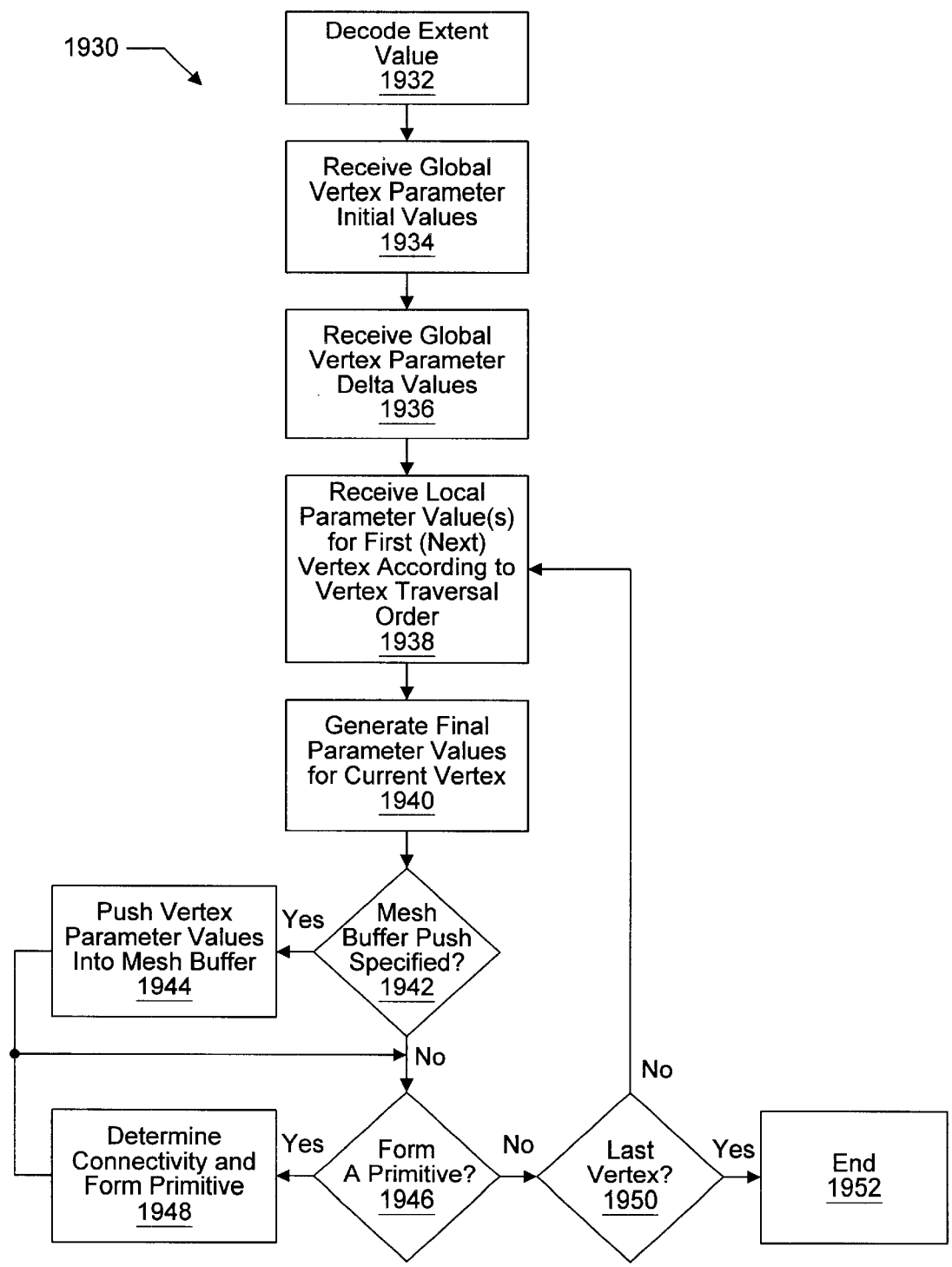
FIG. 43 illustrates a generalized flowchart illustrating one embodiment of a method for performing decompression of regularly tiled surface portions.
Figure 44:
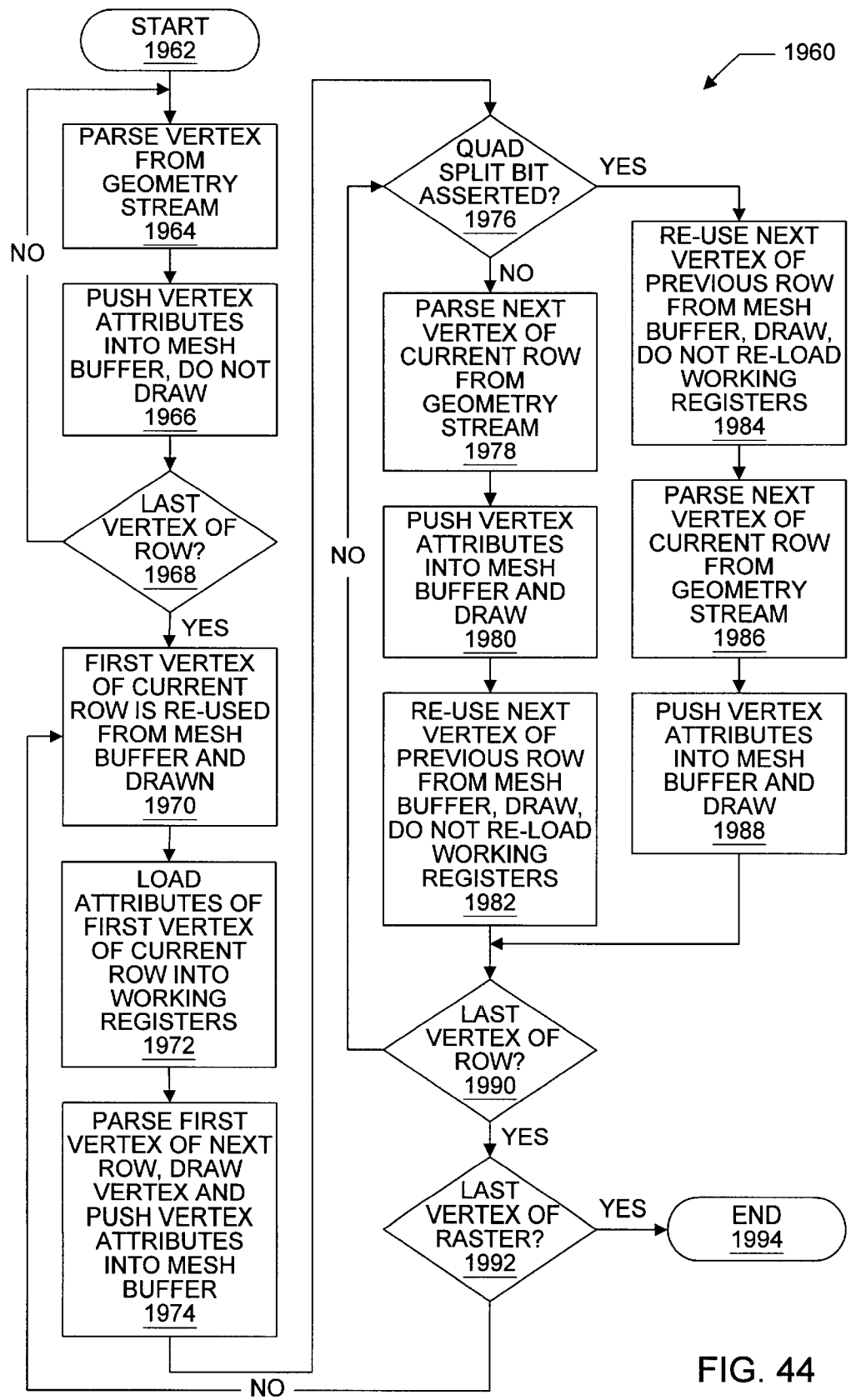
FIG. 44 illustrates a flowchart illustrating one embodiment of a method for performing decompression of regularly tiled surface portions which include quad split bits.
Figure 45:
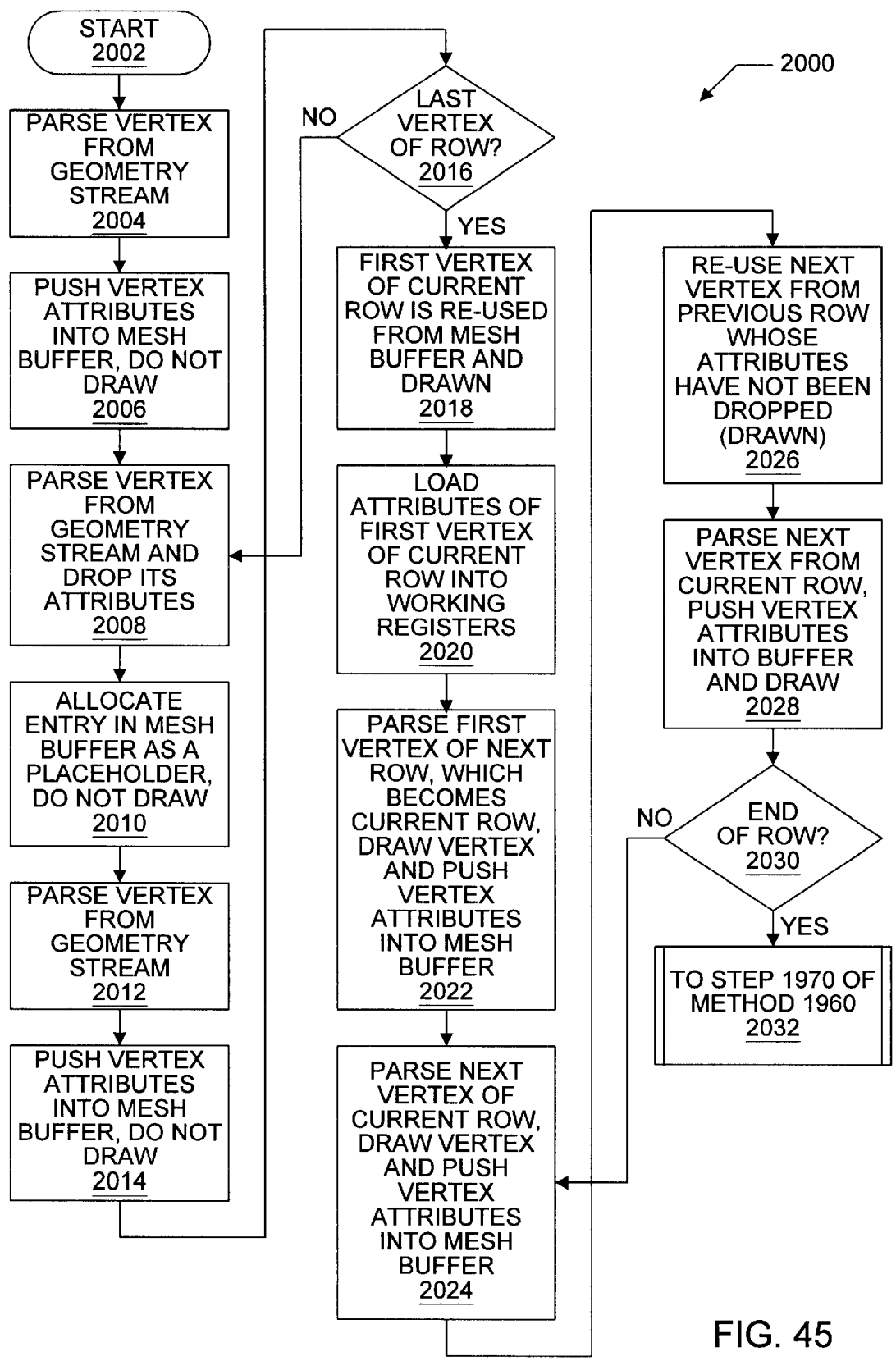
FIG. 45 illustrates a flowchart illustrating one embodiment of a method for performing decompression of regularly tiled surface portions which include a bottom edge represented in a half-resolution mode.

FIGS. 43–45—Decompression Flowcharts

A generalized flowchart depicting one embodiment of a decompression method 1930 is shown with reference to FIG. 43. As shown, method 1930 first includes a step 1932, in which an extent of the surface portion being represented is set within a decompression unit, such as GDU 1910 shown in FIG. 42. In one embodiment, the extent of a surface portion may be encoded using a format such as the "SetVertexRasterSize" command described above with reference to FIG. 27. Other encodings for the extent value may be utilized as well in other embodiments.

The extent value indicates to the decompression hardware the arrangement of vertices within the surface portion. This allows the decompression hardware to properly connect a stream of vertex data into the correct drawing primitives. In different embodiments, the extent value may indicate the shape of a surface portion, the number of vertices within the surface portion, or both. The extent value may also be a value which indicates that the vertices of the surface portion being represented are arranged according to one of a pre-defined number of arrangements recognized by GDU 1910. As described above, the "SetVertexRasterSize" command specifies that the surface portion includes either 25, 81, or 289 vertices arranged in a regular grid with an equal number of rows and columns. In a different embodiment, this command nay specify that the grid is organized in an alternate fashion.

Method 1930 next includes steps 1934 and 1936, in which global parameter values and corresponding delta values are initialized. In one embodiment, step 1934 includes decoding the "SetVertexRasterStart" command described above with reference to FIG. 28. Execution of this command, in one embodiment, sets initial values in vector registers 0–4. Each of the 5 vector registers is predefined to represent a specific vertex parameter. In alternate embodiments, other vertex parameters may be added as well. These initial values of the vertex parameters typically correspond to values of the vertex parameters at the first vertex traversed within the surface portion (see FIG. 29).

In one embodiment, step 1936 includes decoding the "SetVertexRasterStep" commands described above with reference to FIGS. 30A–B. Execution of this command, in one embodiment, sets delta values for the predetermined vertex parameters corresponding to the registers. It is noted that even though a register is reserved for a particular vertex parameter (e.g., color), for a given surface portion, that vertex parameter may not necessarily be specified in a given geometry stream.

As described above, there may be two "step" commands specified depending upon the implementation. One step command sets delta values for components of a specified vertex parameter along a first direction (such as the direction taken when traversing vertices along a given row of the surface portion). A second step command sets delta values similarly along a second direction (such as between columns) within the surface portion.

As described above, specifying vertex parameter values in the manner described above (steps 1934 and 1936) is referred to as global parameter specification. This is in contrast to the per-vertex (or local) specification of vertex parameter values that may also be employed. Global parameter specification may be performed differently in other embodiments. For example, changes in a vertex parameter may be specified through initial values and one or more equations which define the parameter relative to its position within the vertex traversal order. Other techniques are also possible. It is further noted that it is possible to represent a surface portion as a vertex raster without encoding any globally specified parameters. Compression is still achieved since the connectivity (and, hence, the mesh buffer push bits) are specified implicitly by the extent value.

Method 1930 next includes step 1938, in which GDU 1910 (or other decompression unit) begins accessing the stream of per-vertex data which includes local values for the vertex parameters. As described above, in one embodiment, specification of an extent value implies a predefined vertex traversal order. Furthermore, in one embodiment, it is known before receiving the per-vertex data, what parameters are specified for each vertex. (In one embodiment, this information is determined by control commands such as those described with references to FIGS. 33A–B). With the number of vertices known, as well as the number of parameters per-vertex, the stream of per-vertex data may be accurately processed.

Consider a given surface portion with two parameters (color and normals) specified locally. If it is known that only two parameters are specified for each vertex, GDU 1910 can correctly determine that after accessing two values at the beginning of the stream of per-vertex data, subsequent parameter values are associated with the next vertex in the vertex traversal order. In such a manner, GDU 1910 is able to access local parameter values for the first (or next) vertex specified by the current vertex raster representation.

The stream of per-vertex data may be encoded using a variety of different techniques. In one embodiment, each of the parameters in the per-vertex stream is of a predetermined length, facilitating the retrieval of data. In a preferred embodiment, the per-vertex stream is encoded using the header-body technique described in the Applicant's parent patent application. Generally speaking, the per-vertex data includes fixed-length header portions which are usable to determine a length of a corresponding variable-length body portions. Each header-body pair includes a data portion that includes one or more local data values. The data portion may be included wholly in the fixed-length header (indicating a zero-length body portion), wholly within the body portion, or in both the header and body. To implement a high-speed decompression unit, header and body pairs may be separated in the data stream by header and body pairs of other instructions.

For example, consider the following sequence of header-body pairs: H1, B0, H2, B1, H3, B2, etc. This indicates that header-body pair H1–B1 are separated within the per-vertex stream by the body portion of the previous pair (B0) and the header portion of the next pair (H2). This allows GDU 1910 sufficient time to determine the length of the corresponding body portion. In one embodiment, the body length is determined by presenting the fixed-length header portion to a decompression table. (In one embodiment, there is a separate decompression table for each type of parameter). In response, the decompression table returns one or more decompression parameters corresponding to the current header-body pair being processed. These decompression parameters may include, but are not limited to, the amount of the data portion present in the header portion, the length of the body portion, whether the values in the data portion are absolute or relative, and a normalization coefficient for the values in the data portion.

As described above, various decompression parameters are specified, in one embodiment, for each header-body pair (which includes a vertex parameter value for the current vertex being processed). In step 940, these decompression parameters and the globally specified values are utilized to generate a final vertex parameter value. In one embodiment, a final vertex parameter value may be generated a) solely from globally specified values, b) solely from the per-vertex stream, or c) using a combination of the globally specified values and the per-vertex data For case a), a final vertex parameter value is generated by applying the delta values to the current working value (which is either the initial value or the value for the previous vertex). For case b), the final parameter value is generated according to the manner in which the value is encoded. If the value is absolutely specified, the normalization coefficient (if any) is applied to the value in the data portion in order to generate the final value. If the per-vertex value is delta-encoded, the normalized data value is added to the value of the parameter at the previous vertex.

In some embodiments, geometry compression may also allow delta-delta encoding of values. This is useful if a certain vertex parameter changes in a slightly irregular fashion. (In many instances, the delta-delta value for a particular vertex may be zero, effectively indicating the last delta is to be applied again to generate the final parameter value for the particular vertex). In one embodiment, the use of delta-delta encoding is enabled through a control instruction such as the "SetState" command described above with reference to FIG. 33A. In this embodiment, setting of the dde bit alters the interpretation of the absolute/relative bit within the decompression table, causing an absolute setting within a decompression table to indicate relative (delta) encoding, with relative encoding now specifying delta-delta encoding. Note, to perform delta-delta encoding, one should already have a delta vector. Thus, assuming a rectangular vertex raster, delta-delta encoding may not be performed on the first or starting vertices. These are stored as absolute data to provide a starting point. Similarly, the second vertex is used to generate the first delta. Thus, the third vertex may be first to actually use delta-delta encoding. Because delta-delta values may in some instances be smaller than delta values, compression efficiency is enhanced through the use of this technique. Thus, to generate a final vertex parameter for case c), the parameter value for the previous vertex, the previous delta, and the delta-delta value for the current vertex are all added.

With the final parameter values generated for a particular vertex in step 1940, a determination is made whether to perform a mesh buffer push in step 1942. This determination is made using the previously specified extent value as well as the current vertex position For example, in one embodiment, it is predetermined that the entire first row of vertices are all pushed into the mesh buffer for later use. This push operation is performed in step 1944. In one embodiment, the vertex and all associated parameters are all pushed into the mesh buffer.

In step 1946, a determination is made whether or not a primitive is to be assembled. For example, in one embodiment, no primitives are assembled until vertices on the second row are accessed. For the vertices on the first row, then, step 1950 is performed subsequent to step 1946. If the determination is made that a primitive is to be assembled, method 1930 next proceeds with step 1948.

In step 1948, connectivity information is analyzed in order to determine which vertices are to be used (in addition to the current vertex) in order to assemble the drawing primitive. In one embodiment, connectivity information includes that implicitly defined by the extent value as well as quad split information. It is noted that after processing a given vertex, a plurality of primitives may be formed. Accordingly, after execution of step 1948, method 1930 returns to the determination step of 1946.

Once all primitives have been assembled for the current vertex, a determination is made in step 1950 whether the current vertex is the last vertex (as specified by the previously specified vertex traversal order) within the surface portion. If the current vertex is not the last vertex, the next vertex is processed in step 938 and execution of method 1930 continues. If the current vertex is the last vertex, however, method 1930 concludes with step 1952.

If a step vertex raster command is executed subsequent to completion of method 1930, the next surface portion may be processed by using the values of the global parameters from the last vertex of the previous raster representation and proceeding to step 1938 of method 1930. The next stream of per-vertex data may then be processed as described above.

Method 1930 described above gives a general overview of one embodiment of the decompression process. Method 1960, shown in FIG. 24, provides a more detailed implementation which handles both implicit and explicit connectivity information. Method 1960 is first described with reference to surface portion 1300 depicted in FIG. 26, in which the quadrilaterals formed by neighboring vertices are all split in the same (default) direction. For purposes of the following examples, the vertex traversal order is assumed to be that shown in FIG. 29 (beginning from the lower left corner). Accordingly, the vertex numbers utilized in the following examples may be understood from FIG. 29. For instance, vertex 2 is the middle vertex on the bottom row in each of the examples given below. It is noted that many other vertex traversal orders are also possible. It is further noted that any of the procedures for generation of final parameter values may be employed within method 1960.

FIG. 43 describes the notion of forming a primitive. With reference to FIG. 44, a primitive is considered to be formed when all of its vertices are "drawn" (passed to units 1920 for processing). In one embodiment, replacement codes such as those used in generalized triangle strip format dictate how drawn vertices are combined to form triangle primitives.

Proceeding from initial state 1962, method 1960 proceeds to step 1964, in which a vertex and its associated parameters are accessed from compressed geometry stream 1904 by GDU 1910. For the first row of vertices in surface portion 1300 (vertices 0–4), all vertex parameter values are pushed into mesh buffer 1912 in step 1966. These vertices are not drawn, however, indicating that no primitives are formed. A determination is made in step 1968 as to whether the current vertex is the last vertex of the first row. If the current vertex is not the last vertex of the first row, method 1960 returns to step 1964 and processes the next vertex.

If the current vertex is at the end of the first row, however, the first vertex of the current row (vertex 0 in FIG. 29) is accessed from mesh buffer 1912 and drawn in step 1970. The attributes of this vertex are next loaded into GDU 1910 registers in step 1972. These loaded values are used, if needed, to calculate parameters values of the first vertex of the next row (vertex 5), which are accessed in step 1974. The parameters of vertex 5 are also pushed into mesh buffer 1912 and then drawn in step 1974.

In step 1976, a determination is made as to whether a quad split bit is set for the current quadrilateral within compressed geometry stream In one embodiment, a de-asserted quad split bit indicates that a quadrilateral should be tessellated in the default direction (upper right corner to lower left). If this bit is set, however, the quad is split from the upper left corner to lower right. If a quad split bit is not specified, the quad is tessellated in a predetermined default direction in one embodiment.

In one embodiment of a vertex raster representation of surface portion 1300, no quad split bits are set. Accordingly, method 1960 proceeds to step 1978, in which parameters of the next vertex of the current row (vertex 6) are accessed. These parameters are pushed into mesh buffer 1912 and the vertex is drawn in step 1980. A first triangle primitive within surface portion 1300 is now formed, with vertices 0, 5, and 6 all being drawn. The next triangle primitive is formed in step 1982, in which the next vertex of the previous row (vertex 1) is drawn. This steps effectively forms the primitive defined by vertices 5, 6, and 1.

In step 1990, the current vertex is tested to determine if it is the last vertex in the current row. If the vertex is not the last in the current row, method 1960 returns to step 1976 to check the next quad split bit. Method 1960 continues as described above, forming the remaining triangle primitives between the bottom two rows of vertices. When the last vertex in the second row is detected in step 1990, a further check is made in step 1992 to determine if the current vertex is the last in the surface portion. Since this is not the case in this example, method 1960 proceeds with step 1970, in which the first vertex of the current row (vertex 5) is accessed from mesh buffer 1912 and drawn (again). Then vertex 10 of the third row is drawn in step 1974. The quad split bit for this vertex is checked in step 1976, and formation of triangle primitives continues as described above. Method 1960 eventually exits at step 1994 when vertex 24 is detected in step 1992.

Next, method 1960 is described using surface portion 1700 as input. Method 1960 begins as described above, accessing vertex parameter values for vertices 0–4 and pushing these values into mesh buffer 1912 in steps 1964–1966. When vertex 4 is detected in step 1968, vertex 0 is retrieved from mesh buffer 1912 in step 1970. Then the attributes of vertex 5 are accessed from stream 1904 and drawn in step 1976. So far, the steps for surface portion 1700 correspond to those taken for surface portion 1300, with vertices 0 and 5 both being drawn.

Since the quad split bit for the first quadrilateral in surface portion 1700 is split, however, method 1960 next proceeds to step 1984, in which the next vertex of the previous row (vertex 1) is accessed from mesh buffer 1912 and drawn. This forms a triangle defined by vertices 0, 5, and 1. In steps 1986 and 1988, a second triangle is formed from vertices 5, 1, and 6. Method 1960 then returns to step 1976, where the next quad split bit is checked. Based on the result of this determination, two more triangles are formed and the method returns to step 1976. When all triangles are formed for the current row, method 1960 returns to step 1970. Decompression of the remainder of surface portion 1700 proceeds as described above.

FIG. 45 depicts a method for decompressing a surface portion in which a bottom edge is designated as being half-rez (as described above with reference to FIG. 39). One example of such a surface portion is portion 1800D in FIG. 40D. As depicted in FIG. 40D, some vertices on a half-rez edge are not utilized in forming any of the triangle primitives within surface portion 1800D. Method 2000 shown in FIG. 45 accounts for this fact.

From initial state 2002, method 2000 proceeds to step 2004, in which the first vertex (vertex 0) is accessed from stream 1904. Vertex 0 and its attributes are pushed into mesh buffer 1912 in step 2006. Vertex 1 and associated parameters are accessed in step 2008. Because vertex 1 is not utilized for triangle formation, however, the attributes accessed in step 2008 are not used. In spite of the fact that these attributes are not used, a dummy mesh buffer push is performed in step 2010. This is done so that subsequent rows may access mesh buffer 1912 in the same fashion whether or not the bottom edge is represented in half-rez mode or not.

In steps 2012–2014, vertex 2 and its attributes are retrieved from stream 904 and pushed into mesh buffer 1912. Since vertex 2 is not the last vertex in the row, method 2000 returns to step 2008. This results in vertex 3 being allocated a dummy position in mesh buffer 1912, and vertex 4 having its attributes pushed into an "actual" position within mesh buffer 1912.

At this point, vertices 0–4 are pushed into mesh buffer 1912 with either placeholder or actual entries. Method 2000 next proceeds to steps 2018–2020, in which vertex 0 is accessed from mesh buffer 1912 and drawn. In step 2022, vertex 5 is accessed from stream 1904, drawn, and pushed into mesh buffer 1912. Next, vertex 6 is accessed, drawn, and pushed in step 2024. This completes formation of the triangle primitive defined by vertices, 0, 5, and 6.

Method 2000 continues with step 2026, in which the next vertex from the previous row whose attributes have not been dropped is drawn. This corresponds to vertex 2, since vertex 1 is not used in triangle formation This step also completes formation of the triangle defined by vertices 0, 2, and 6. (These vertices are used instead of three most recently drawn vertices since half-rez edges correspond to "star" triangle strips. These formations are drawn in generalized triangle strip format using the "replace middlest" vertex command). Next, in step 2028, the next vertex from the current row, vertex 7, is accessed, pushed, and drawn, forming a primitive from vertices 6, 2, and 7.

In step 2030, a determination is made that the end of the row has not been reached. Thus, method 2000 continues with step 2024. Steps 2024–2028 repeat, forming three primitives using vertex groups (2, 7, 8), (2, 8, ,4) and (8, 4, 9), respectively. With the first row of primitives drawn, method 2000 continues processing by executing steps 1970–1994 of method 1960 until the last vertex of surface portion 1800D is reached.

Method 2000 is usable to perform decompression on a regularly tiled surface portion in which the bottom edge is represented in half resolution. Decompression of surface portions in which other edges are represented in half-rez is performed similarly. It is noted that in alternate embodiments, quad split bits and half-rez edges may be processed differently.

Although the system and method of the present invention have been described in connection with the described embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A computer-implemented method for compressing 3D geometric data representing one or more 3D objects, comprising: examining the 3D geometric data to detect the presence of regularly tiled surface portions, and compressing the 3D geometric data by:
encoding one or more regularly tiled surface portions using a first encoding method, and
encoding one or more irregularly tiled surface portions using a second encoding method, wherein the second encoding method is different from the first encoding method.

2. The method as recited in claim 1, wherein the first encoding method encodes the regularly tiled surface portions as vertex rasters.

3. The method as recited in claim 2, further comprising encoding an extent value for each regularly tiled surface portion, wherein the extent values each define an arrangement of the vertices to be compressed.

4. The method as recited in claim 3, wherein the first encoding method further comprises:

specifying the initial values for selected interpolatable parameters within the regularly tiled surface's geometric data, and specifying delta values indicative of how the selected parameters vary across the regularly tiled surface.

5. The method as recited in claim 3, wherein the first encoding method further comprises specifying per-vertex information for vertices which deviate from the specified delta values.

6. The method as recited in claim 5, wherein the first encoding method further comprises specifying per-vertex information for vertexes that do not deviate from the specified delta values but have additional information not represented by the delta values.

7. The method as recited in claim 6, wherein the per-vertex information is compressed by reducing the number of bits used to represent the constituent vertex parameter values.

8. The method as recited in claim 7, wherein the vertex parameter values are selected from the group consisting of position, normal, color, texture, material, and lighting information.

9. The method as recited in claim 2, wherein the second encoding method encodes the irregularly tiled surfaces as a generalized triangle mesh.

10. The method as recited in claim 2, wherein the examining comprises detecting pluralities of vertexes above a predetermined size in which at least one vertex parameter varies in predictable manner within a predetermined tolerance.

11. The method as recited in claim 2, wherein the examining comprises detecting pluralities of vertexes above a predetermined size that share at least one vertex parameter that is mathematically related within a predetermined maximum variance, and wherein the at least one vertex parameter is selected from the group consisting of:

position, normals, colors, texture map coordinates, texture information, material information, lighting information and surface material properties.

12. The method as recited in claim 2, wherein the examining comprises detecting pluralities of vertexes above a predetermined size that share at least one vertex parameter that is amenable to delta encoding with a predetermined maximum delta.

13. The method as recited in claim 2, wherein the examining comprises detecting pluralities of vertexes above a predetermined size that that share at least one vertex parameter that is capable of delta-delta encoding with a predetermined maximum delta.

14. The method as recited in claim 1, further comprising embedding opcodes within the compressed 3D geometric data indicative of whether the following vertex is encoded using the first encoding method or the second encoding method.

15. The method as recited in claim 1, further comprising embedding opcodes within the compressed 3D geometric data indicative of whether the following surface is encoded using the first method or the second method.

16. The method as recited in claim 11, wherein the opcodes each comprise a header and a body, wherein the header comprises a variable-length tag providing length information about the opcodes.

17. The method as recited in claim 12, further comprising generating error checking and correction information for the compressed 3D geometric information.

18. The method as recited in claim 13, further comprising storing the compressed 3D geometry information and error checking and correction information on computer-readable media for distribution and future decoding.

19. The method as recited in claim 13, further comprising transmitting the compressed 3D geometry information and error checking and correction information across a computer network.

20. The method as recited in claim 1, wherein the first encoding method encodes the regularly tiled surfaces as vertex rasters, and wherein the second encoding method encodes the irregularly tiled surfaces as a generalized triangle mesh.

21. The method of claim 1, wherein said encoding one or more regularly tiled surface portions using a first encoding method comprises encoding any regularly tiled surface portions using the first encoding method, and wherein said encoding one or more irregularly tiled surface portions using a second encoding method comprises encoding any irregularly tiled surface portions using the second encoding method.

22. A computer-implemented method for compressing 3D geometry data, the method comprising:

receiving the 3D geometry data;

examining the 3D geometric data to detect the presence of groups of vertices that each have one or more parameters that change in a predictable manner, wherein said examining determines that a first portion of the 3D geometry data comprises at least one group of vertices such that each of the vertices in the group has one or more parameters that change in a predictable manner;

encoding the first portion of the 3D geometry data using a first compression technique, wherein the encoding the first portion generates an encoded first surface portion;

encoding a second portion of the 3D geometry data using a second compression technique, wherein the second portion is different than the first portion, wherein the encoding the second portion generates an encoded second surface portion; and storing the encoded first surface portion and the encoded second surface portion.

23. The method as recited in claim 21, wherein the 3D geometry data includes information describing a plurality of vertices representing at least one surface of a 3D graphics object, wherein the first portion represents a first surface portion of the 3D graphics object, and wherein the second portion represents a second surface portion of the 3D graphics object.

24. The method as recited in claim 21, wherein the encoded first surface portion and the encoded second surface portion are compressed at independent compression rates.

25. The method as recited in claim 21, wherein the first compression technique comprises:

encoding an extent value which defines an arrangement of the vertices within the first surface portion, and encoding vertex parameter values corresponding to the vertices within the first surface portion.

26. A computer-implemented method for compressing 3D geometry data, the method comprising:
receiving the 3D geometry data;
examining the 3D geometric data to detect the presence of groups of vertices that each have one or more parameters that change in a predictable manner,
wherein said examining determines that a first portion of the 3D geometry data comprises at least one group of vertices such that each of the vertices in the group has one or more parameters that change in a predictable manner;
encoding connectivity information for the first portion of the 3D geometry data using a first compression method;
encoding connectivity information for a second portion of the 3D geometry data using a second compression method;
encoding vertex parameter values of the first portion and the second portion of the 3D geometry data using a third compression method; and
storing the encoded connectivity information of the first portion of the 3D geometry data, the encoded connectivity information of the second portion of the 3D geometry data, and the encoded vertex parameters of the first portion and the second portion of the 3D geometry data.

27. The method as recited in claim 25, wherein the first portion comprises a regular polygon mesh, and wherein the first compression method comprises encoding a beginning position of the regular polygon mesh and encoding a size of the regular polygon mesh.

28. A computer-implemented method for compressing a data stream of geometry data representing a 3D object, the method comprising:
converting the geometry data into a mesh format, wherein the mesh format includes at least one irregular polygonal mesh portion and at least one regular polygonal mesh portion, wherein the at least one regular polygonal mesh portion is characterized by a regular arrangement of vertices defining polygons;
examining the 3D geometric data to detect the presence of groups of vertices that each have one or more parameters that change in a predictable manner,
wherein said examining detects the at least one regular polygonal mesh portion as comprising at least one group of vertices such that each of the vertices in the group has one or more parameters that change in a predictable manner;
compressing the at least one irregular polygonal mesh portion using a first compression method, wherein the first compression method achieves a first level of compression; and
compressing the at least one regular polygonal mesh portion using a second compression method, wherein the second compression method utilizes the regular arrangement of the vertices to achieve a second level of compression greater than the first level of compression achieved by the first compression method.

29. The method of claim 27, wherein the irregular polygonal mesh portion is characterized by an irregular arrangement of vertices defining polygons.

30. The method of claim 28, further comprising compressing the compressed regular polygon mesh and irregular polygonal mesh portions using a third compression method.

31. The method of claim 29, further comprising compressing the compressed regular polygon mesh using the second compression method.

32. The method of claim 30, wherein the at least one regular polygonal mesh portion is characterized by a regular arrangement of quadrilaterals of a same type.

33. The method of claim 31, wherein the at least one regular polygonal mesh portion is characterized by a regular arrangement of polygons selected from the group consisting of rectangles, rhombuses, triangles, hexagons and parallelograms.

34. The method of claim 32, wherein the at least one regular polygon mesh and the at least one irregular polygon mesh each comprise a lattice of vertices.

35. The method of claim 27, further comprising transmitting the compressed data over a network.

36. A software program for compressing three-dimensional graphics data, wherein the software program is embodied on computer-readable media and comprises:
a first plurality of instructions configured to detect regular surface portions within the three-dimensional graphics data, wherein said regular surface portions have vertices with one or more properties that change in a predictable manner;
a second plurality of instructions configured to compress irregular surface portions using a first compression method and achieve a first level of compression; and
a third plurality of instructions configured to compress irregular surface portions using a second compression method, wherein said second compression method differs from said first compression method.

37. The software program as recited in claim 35, wherein said second compression method utilizes the predictable manner of change in vertex properties with said regular surface portions to achieve a second level of compression greater than the first level of compression achieved by the first compression method.

38. The software program as recited in claim 35, further comprising a fourth plurality of instructions configured to store the compressed three-dimensional graphics data on computer-readable media.

39. The software program as recited in claim 37, further comprising a fifth plurality of instructions configured to generate opcodes that are embedded within the compressed three-dimensional graphics data, wherein the opcodes are indicative of which type of compression was used on corresponding surface portions.

40. A method for compressing 3D geometric data representing one or more 3D objects, comprising:
programmatically examining the 3D geometric data to detect the presence of regularly tiled surface portions, and
programmatically compressing the 3D geometric data by:
encoding one or more regularly tiled surface portions using a first encoding method, wherein the first encoding method comprises encoding a first value for each regularly tiled surface portion, wherein the first value defines an arrangement of the vertices to be compressed, and
encoding one or more irregularly tiled surface portions using a second encoding method, wherein the second encoding method is different from the first encoding method.

41. A method for compressing 3D geometric data representing one or more 3D objects, comprising:
examining the 3D geometric data to detect the presence of regularly tiled surface portions; and
compressing the 3D geometric data by:
encoding one or more regularly tiled surface portions using a first encoding method, wherein the first encoding method comprises:

encoding a value for each regularly tiled surface portion, wherein the value defines an arrangement of the vertices to be compressed;

specifying values indicative of how selected parameters of the vertices vary across the regularly tiled surface; and specifying per-vertex information for vertices which deviate from said specified values; and encoding one or more irregularly tiled surface portions using a second encoding method, wherein the second encoding method is different from the first encoding method.

42. The method as recited in claim 41, wherein the first encoding method encodes the regularly tiled surface portions as vertex rasters.

43. The method as recited in claim 41, wherein said encoding a value for each regularly tiled surface portion comprises encoding an extent value for each regularly tiled surface portion, wherein the extent values each define an arrangement of the vertices to be compressed.

44. The method as recited in claim 41, wherein the second encoding method encodes the irregularly tiled surfaces as a generalized triangle mesh.

45. The method as recited in claim 41, wherein said specifying values comprises:

specifying initial values for selected interpolatable parameters within the regularly tiled surface's geometric data; and specifying delta values indicative of how the selected parameters vary across the regularly tiled surface.

46. The method as recited in claim 45, wherein said specifying per-vertex information comprises specifying per-vertex information for vertices which deviate from the specified delta values.

47. The method as recited in claim 46, wherein said specifying per-vertex information comprises specifying per-vertex information for vertexes that do not deviate from the specified delta values but have additional information not represented by the delta values.

48. The method as recited in claim 41, wherein the first encoding method further comprises:

compressing the per-vertex information by reducing the number of bits used to represent the constituent vertex parameter values.

49. The method as recited in claim 41, wherein the vertex parameter values are selected from the group consisting of: position, normal, color, texture, material, and lighting information.

50. The method as recited in claim 41, further comprising embedding opcodes within the compressed 3D geometric data indicative of whether the following vertex is encoded using the first encoding method or the second encoding method.

51. The method as recited in claim 41, further comprising embedding opcodes within the compressed 3D geometric data indicative of whether the following surface is encoded using the first method or the second method.

52. The method as recited in claim 51, wherein the opcodes each comprise a header and a body, wherein the header comprises a variable-length tag providing length information about the opcodes.

53. The method as recited in claim 41, further comprising generating error checking and correction information for the compressed 3D geometric information.

54. The method as recited in claim 53, further comprising storing the compressed 3D geometry information and error checking and correction information on computer-readable media for distribution and future decoding.

55. The method as recited in claim 53, further comprising transmitting the compressed 3D geometry information and error checking and correction information across a computer network.

56. The method as recited in claim 41, wherein the examining comprises detecting pluralities of vertexes above a predetermined size in which at least one vertex parameter varies in a predictable manner within a predetermined tolerance.

57. The method as recited in claim 41, wherein the examining comprises detecting pluralities of vertexes above a predetermined size that share at least one vertex parameter that is mathematically related within a predetermined maximum variance, and wherein the at least one vertex parameter is selected from the group consisting of: position, normals, colors, texture map coordinates, texture information, material information, lighting information and surface material properties.

58. The method as recited in claim 41, wherein the examining comprises detecting pluralities of vertexes above a predetermined size that share at least one vertex parameter that is amenable to delta encoding with a predetermined maximum delta.

59. The method as recited in claim 41, wherein the examining comprises detecting pluralities of vertexes above a predetermined size that that share at least one vertex parameter that is capable of delta-delta encoding with a predetermined maximum delta.

60. The method as recited in claim 41, wherein the first encoding method encodes the regularly tiled surfaces as vertex rasters, and wherein the second encoding method encodes the irregularly tiled surfaces as a generalized triangle mesh.

61. A method for compressing 3D geometry data, the method comprising receiving the 3D geometry data;

encoding a first portion of the 3D geometry data using a first compression technique wherein the first portion includes a regularly tiled surface portion, wherein the encoding the first portion generates an encoded first surface portion, wherein said encoding the first portion comprises:

encoding a value for the regularly tiled surface portion, wherein the value defines an arrangement of the vertices to be compressed;

specifying values indicative of how selected parameters of the vertices vary across the regularly tiled surface portion; and specifying per-vertex information for vertices which deviate from said specified values; and encoding a second portion of the 3D geometry data using a second compression technique, wherein the encoding the second portion generates an encoded second surface portion; and storing the encoded first surface portion and the encoded second surface portion.

62. The method as recited in claim 61, wherein the 3D geometry data includes information describing a plurality of vertices representing at least one surface of a 3D graphics object, wherein the first portion represents a first surface portion of the 3D graphics object, and wherein the second portion represents a second surface portion of the 3D graphics object.

63. The method as recited in claim 61, wherein the encoded first surface portion and the encoded second surface portion are compressed at independent compression rates.

64. A method for compressing 3D geometry data, the method comprising:

receiving the 3D geometry data;

encoding connectivity information for a first portion of the 3D geometry data using a first compression method, wherein the first portion comprises a regular polygon mesh, and wherein the first compression method comprises encoding a beginning position of the regular polygon mesh and encoding a size of the regular polygon mesh;

encoding connectivity information for a second portion of the 3D geometry data using a second compression method;

encoding vertex parameter values of the first portion and the second portion of the 3D geometry data using a third compression method; and storing the encoded connectivity information of the first portion of the 3D geometry data, the encoded connectivity information of the second portion of the 3D geometry data, and the encoded vertex parameters of the first portion and the second portion of the 3D geometry data.

65. A method for compressing a data stream of geometry data representing a 3D object, the method comprising:

converting the geometry data into a mesh format, wherein the mesh format includes at least one irregular polygonal mesh portion and at least one regular polygonal mesh portion, wherein the at least one regular polygonal mesh portion is characterized by a regular arrangement of vertices defining polygons;

compressing the at least one irregular polygonal mesh portion using a first compression method, wherein the first compression method achieves a first level of compression; and compressing the at least one regular polygonal mesh portion using a second compression method, wherein the second compression method utilizes the regular arrangement of the vertices to achieve a second level of compression greater than the first level of compression achieved by the first compression method;

compressing the compressed regular polygon mesh and irregular polygonal mesh portions using a third compression method.

66. The method of claim 65, wherein the irregular polygonal mesh portion is characterized by an irregular arrangement of vertices defining polygons.

67. The method of claim 65, further comprising compressing the compressed regular polygon mesh using the second compression method.

68. The method of claim 65, wherein the at least one regular polygonal mesh portion is characterized by a regular arrangement of quadrilaterals of a same type,"

69. The method of claim 65, wherein the at least one regular polygonal mesh portion is characterized by a regular arrangement of polygons selected from the group consisting of rectangles, rhombuses, triangles, hexagons and parallelograms.

70. The method of claim 65, wherein the at least one regular polygon mesh and the at least one irregular polygon mesh each comprise a lattice of vertices.

71. The method of claim 65, further comprising transmitting the compressed data over a network.

72. A software program for compressing three-dimensional graphics data, wherein the software program is embodied on computer-readable media and comprises:

a first plurality of instructions configured to detect regular surface portions within the three-dimensional graphics data, wherein said regular surface portions have vertices with one or more properties that change in a predictable manner;

a second plurality of instructions configured to compress irregular surface portions using a first compression method and achieve a first level of compression, a third plurality of instructions configured to compress regular surface portions using a second compression method, wherein said second compression method differs from said first compression method, wherein the third plurality of instructions are operable to:

encode a value for each regularly tiled surface portion, wherein the value defines an arrangement of the vertices to be compressed;

specify values indicative of how selected parameters of the vertices vary across the regularly tiled surface; and specify per-vertex information for vertices which deviate from said specified values.

73. The software program as recited in claim 72, wherein said second compression method utilizes the predictable manner of change in vertex properties with said regular surface portions to achieve a second level of compression greater than the first level of compression achieved by the first compression method.

74. The software program as recited in claim 72, further comprising a fourth plurality of instructions configured to store the compressed three-dimensional graphics data on computer-readable media.

75. The software program as recited in claim 72, further comprising a fourth plurality of instructions configured to generate opcodes that are embedded within the compressed three-dimensional graphics data, wherein the opcodes are indicative of which type of compression was used on corresponding surface portions.

76. A method for compressing 3D geometric data representing one or more 3D objects, comprising:

examining the 3D geometric data to detect the presence of regularly tiled surface portions;

compressing the 3D geometric data by:
encoding any regularly tiled surface portions using a first encoding method; and
encoding any irregularly tiled surface portions using a second encoding method, wherein the second encoding method is different from the first encoding method; and generating error checking and correction information for the compressed 3D geometric information.

77. A method for compressing 3D geometric data representing one or more 3D objects, comprising:

examining the 3D geometric data to detect the presence of regularly tiled surface portions, wherein the examining comprises detecting pluralities of vertexes above a predetermined size in which at least one vertex parameter varies in predictable manner within a predetermined tolerance;

compressing the 3D geometric data by:
encoding any regularly tiled surface portions using a first encoding method; and
encoding any irregularly tiled surface portions using a second encoding method, wherein the second encoding method is different from the first encoding method.

78. A method for compressing 3D geometric data representing one or more 3D objects, comprising:

examining the 3D geometric data to detect the presence of regularly tiled surface portions, wherein the examining comprises detecting pluralities of vertexes above a predetermined size that share at least one vertex parameter that is mathematically related within a predetermined maximum variance, and wherein the at least one vertex parameter is selected from the group consisting of: position, normals, colors, texture map coordinates, texture information, material information, lighting information and surface material properties;

compressing the 3D geometric data by:
 encoding any regularly tiled surface portions using a first encoding method; and
 encoding any irregularly tiled surface portions using a second encoding method, wherein the second encoding method is different from the first encoding method.

79. A method for compressing 3D geometric data representing one or more 3D objects, comprising:

examining the 3D geometric data to detect the presence of regularly tiled surface portions, wherein the examining comprises detecting pluralities of vertexes above a predetermined size that share at least one vertex parameter that is amenable to delta encoding with a predetermined maximum delta;

compressing the 3D geometric data by:
 encoding any regularly tiled surface portions using a first encoding method; and
 encoding any irregularly tiled surface portions using a second encoding method, wherein the second encoding method is different from the first encoding method.

80. A method for compressing 3D geometric data representing one or more 3D objects, comprising:

examining the 3D geometric data to detect the presence of regularly tiled surface portions, wherein the examining comprises detecting pluralities of vertexes above a predetermined size that that share at least one vertex parameter that is capable of delta-delta encoding with a predetermined maximum delta;

compressing the 3D geometric data by:
 encoding any regularly tiled surface portions using a first encoding method; and
 encoding any irregularly tiled surface portions using a second encoding method, wherein the second encoding method is different from the first encoding method.

81. A method for compressing 3D geometric data representing one or more 3D objects, comprising:

encoding one or more regularly tiled surface portions in the 3D geometric data using a first encoding method, wherein the first encoding method comprises:
 encoding a value for each regularly tiled surface portion, wherein the value defines an arrangement of the vertices to be compressed;
 specifying values indicative of how selected parameters of the vertices vary across the regularly tiled surface; and
 specifying per-vertex information for vertices which deviate from said specified values; and encoding one or more irregularly tiled surface portions in the 3D geometric data using a second encoding method, wherein the second encoding method is different from the first encoding method.

* * * * *

UNITED STATES PATENT AND TRADEMARK OFFICE
CERTIFICATE OF CORRECTION

PATENT NO. : 6,525,722 B1
DATED : February 25, 2003
INVENTOR(S) : Michael F. Deering It is certified that error appears in the above-identified patent and that said Letters Patent is hereby corrected as shown below:

Column 52,
Line 1, please change "11" to -- 15 --.
Line 5, please change "12" to -- 16 --.
Lines 8 and 12, please change "13" to -- 17 --.
Lines 52, 59 and 62, please change "21" to -- 22 --.

Column 53,
Line 26, please change "25" to -- 26 --.
Line 59, please change "27" to -- 28 --.
Line 62, please change "28" to -- 29 --.
Line 65, please change "29" to -- 30 --.

Column 54,
Line 1, please change "30" to -- 31 --.
Line 4, please change "31" to -- 32 --.
Line 9, please change "32" to -- 33 --.
Line 11, please change "27" to -- 28 --.
Line 28, please change "35" to -- 36 --.
Line 34, please change "35" to -- 36 --.
Line 38, please change "37" to -- 38 --.

Column 57,
Line 52, please change "type," to -- type. --.

Signed and Sealed this

Twenty-third Day of December, 2003

JAMES E. ROGAN
*Director of the United States Patent and Trademark Office*